(12) United States Patent
Zhang et al.

(10) Patent No.: US 11,178,477 B2
(45) Date of Patent: Nov. 16, 2021

(54) ACOUSTIC OUTPUT APPARATUS WITH A PLURALITY OF ACOUSTIC DRIVERS AND METHODS THEREOF

(71) Applicant: SHENZHEN VOXTECH CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN VOXTECH CO., LTD., Shenzhen (CN)

( * ) Notice: Subject to any disclaimer, the term of this patent is extended or adjusted under 35 U.S.C. 154(b) by 0 days.

(21) Appl. No.: 17/170,947

(22) Filed: Feb. 9, 2021

(65) Prior Publication Data

US 2021/0185421 A1    Jun. 17, 2021

Related U.S. Application Data

(63) Continuation of application No. PCT/CN2020/084161, filed on Apr. 10, 2020.

(30) Foreign Application Priority Data

Apr. 30, 2019  (CN) .......................... 201910364346.2
Sep. 19, 2019  (CN) .......................... 201910888067.6
Sep. 19, 2019  (CN) .......................... 201910888762.2

(51) Int. Cl.
  *H04R 1/10*   (2006.01)
  *H04R 1/24*   (2006.01)
  (Continued)

(52) U.S. Cl.
  CPC ........... *H04R 1/1016* (2013.01); *G02C 11/00* (2013.01); *G02C 11/10* (2013.01); *G06F 3/16* (2013.01);
  (Continued)

(58) Field of Classification Search
  CPC ........ H04R 1/105; H04R 1/1016; H04R 1/02; H04R 1/24; H04R 5/0335; H04R 1/2896;
  (Continued)

(56) References Cited

U.S. PATENT DOCUMENTS 5,327,506 A      7/1994 Stites, III
5,572,594 A  *  11/1996 Devoe .................. H04R 25/656
                                                381/328
(Continued)

FOREIGN PATENT DOCUMENTS

CN       1270488 A    10/2000
CN     101022678 A     8/2007
(Continued)

OTHER PUBLICATIONS

International Search Report in PCT/CN2020/084161 dated Jul. 6, 2020, 3 pages.
(Continued)

*Primary Examiner* — Brian Ensey
(74) *Attorney, Agent, or Firm* — METIS IP LLC

(57) ABSTRACT

The present disclosure provides an acoustic output apparatus. The acoustic output apparatus may include an acoustic output component and a supporting structure forming an acoustically open structure that allows the acoustic output component to acoustically communicate with the surroundings. The acoustic output component may include a plurality of acoustic drivers, each of which may be configured to output a sound with a frequency range. At least one of the acoustic drivers may include a magnetic system for generating a first magnetic field. The magnetic system may include a first magnetic component for generating a second magnetic field and at least one second magnetic component. A magnetic gap may be formed between the first magnetic component and the at least one second magnetic component.

(Continued)

A magnetic field intensity of the first magnetic field in the magnetic gap may be greater than that of the second magnetic field in the magnetic gap.

19 Claims, 25 Drawing Sheets

(51) Int. Cl.
| | |
|---|---|
| H04R 5/02 | (2006.01) |
| H04R 1/02 | (2006.01) |
| H04R 1/26 | (2006.01) |
| H04R 1/44 | (2006.01) |
| G06F 3/16 | (2006.01) |
| H04M 1/03 | (2006.01) |
| H04M 1/78 | (2006.01) |
| H04R 1/28 | (2006.01) |
| H04R 3/02 | (2006.01) |
| H04R 1/34 | (2006.01) |
| H04W 4/80 | (2018.01) |
| H04R 1/22 | (2006.01) |
| H04R 3/00 | (2006.01) |
| G10L 21/038 | (2013.01) |
| H04R 5/033 | (2006.01) |
| H04S 7/00 | (2006.01) |
| G02C 11/00 | (2006.01) |
| H04R 1/38 | (2006.01) |
| G02C 11/06 | (2006.01) |

(52) U.S. Cl.
CPC ............. *G06F 3/162* (2013.01); *G06F 3/165* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/105* (2013.01); *H04R 1/1008* (2013.01); *H04R 1/1025* (2013.01); *H04R 1/1041* (2013.01); *H04R 1/1075* (2013.01); *H04R 1/1083* (2013.01); *H04R 1/22* (2013.01); *H04R 1/24* (2013.01); *H04R 1/26* (2013.01); *H04R 1/28* (2013.01); *H04R 1/2803* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04S 7/304* (2013.01); *H04W 4/80* (2018.02); *G02C 11/06* (2013.01); *H04R 2201/103* (2013.01); *H04R 2420/07* (2013.01); *H04S 2400/11* (2013.01)

(58) Field of Classification Search
CPC ........ H04R 3/005; H04R 1/345; H04R 5/033; H04R 5/02; H04R 1/34; H04R 1/026; H04R 1/10; H04R 1/1008; G02C 11/10; H04M 1/035; H04S 7/304
See application file for complete search history.

(56) References Cited

U.S. PATENT DOCUMENTS

| | | | |
|---|---|---|---|
| 6,062,337 A | | 5/2000 | Zinserling |
| 6,817,440 B1 | | 11/2004 | Kim |
| 8,891,800 B1 | * | 11/2014 | Shaffer ................ H04R 1/1025 381/384 |
| 9,036,851 B2 | * | 5/2015 | Peng .................... H04R 1/1075 381/380 |
| 9,985,596 B1 | | 5/2018 | Litovsky et al. |
| 10,375,479 B2 | * | 8/2019 | Graber ................... H04R 9/025 |
| 10,499,140 B2 | * | 12/2019 | Gong ................... H04R 1/1091 |
| 2006/0113143 A1 | | 6/2006 | Ishida |
| 2007/0098198 A1 | | 5/2007 | Hildebrandt |
| 2007/0223735 A1 | | 9/2007 | LoPresti et al. |
| 2007/0291971 A1 | | 12/2007 | Halteren |
| 2008/0101589 A1 | | 5/2008 | Horowitz et al. |
| 2009/0147981 A1 | | 6/2009 | Blanchard et al. |
| 2010/0310106 A1 | | 12/2010 | Blanchard et al. |
| 2011/0170730 A1 | | 7/2011 | Zhu |
| 2012/0177206 A1 | | 7/2012 | Yamagishi et al. |
| 2012/0263324 A1 | | 10/2012 | Joyce et al. |
| 2013/0051585 A1 | | 2/2013 | Karkkainen et al. |
| 2013/0108068 A1 | | 5/2013 | Poulsen et al. |
| 2013/0169513 A1 | | 7/2013 | Heinrich et al. |
| 2015/0049893 A1 | | 2/2015 | Heidenreich et al. |
| 2016/0119721 A1 | | 4/2016 | Doshida et al. |
| 2016/0127841 A1 | | 5/2016 | Horii |
| 2017/0195795 A1 | | 7/2017 | Mei et al. |
| 2017/0201823 A1 | | 7/2017 | Shetye et al. |
| 2017/0208395 A1 | | 7/2017 | Wan et al. |
| 2017/0230741 A1 | | 8/2017 | Matsuo et al. |
| 2017/0238096 A1 | | 8/2017 | Nakagawa et al. |
| 2017/0353780 A1 | | 12/2017 | Huang et al. |
| 2017/0353793 A1 | | 12/2017 | Sun et al. |
| 2018/0048952 A1 | | 2/2018 | Hong et al. |
| 2018/0091883 A1 | | 3/2018 | Howes et al. |
| 2018/0167711 A1 | | 6/2018 | Lin |
| 2018/0227660 A1 | | 8/2018 | Azmi et al. |
| 2018/0271383 A1 | | 9/2018 | Lee |
| 2018/0367885 A1 | | 12/2018 | Gong et al. |
| 2018/0376231 A1 | | 12/2018 | Pfaffinger |
| 2019/0026071 A1 | | 1/2019 | Tamaoki et al. |
| 2019/0071011 A1 | | 3/2019 | Konno et al. |
| 2019/0104352 A1 | | 4/2019 | Ozawa et al. |
| 2019/0261080 A1 | | 8/2019 | Gerber et al. |
| 2020/0137476 A1 | | 4/2020 | Shinmen et al. |
| 2020/0169801 A1 | | 5/2020 | Zhu |
| 2020/0252708 A1 | | 8/2020 | Zhu |

FOREIGN PATENT DOCUMENTS

| | | |
|---|---|---|
| CN | 101098353 A | 1/2008 |
| CN | 201426167 Y | 3/2010 |
| CN | 103108268 A | 5/2013 |
| CN | 103179483 A | 6/2013 |
| CN | 103209377 A | 7/2013 |
| CN | 103260117 A | 8/2013 |
| CN | 203233520 U | 10/2013 |
| CN | 203301726 U | 11/2013 |
| CN | 204377095 U | 6/2015 |
| CN | 104869515 A | 8/2015 |
| CN | 104863635 A | 9/2015 |
| CN | 204810512 U | 11/2015 |
| CN | 204948328 U | 1/2016 |
| CN | 204948329 U | 1/2016 |
| CN | 205336486 U | 6/2016 |
| CN | 205510154 U | 8/2016 |
| CN | 205754812 U | 11/2016 |
| CN | 106231462 A | 12/2016 |
| CN | 106303779 A | 1/2017 |
| CN | 106341752 A | 1/2017 |
| CN | 106792304 A | 5/2017 |
| CN | 206193360 U | 5/2017 |
| CN | 107231585 A | 10/2017 |
| CN | 206575566 U | 10/2017 |
| CN | 206640738 U | 11/2017 |
| CN | 206865707 U | 1/2018 |
| CN | 107820169 A | 3/2018 |
| CN | 207075075 U | 3/2018 |
| CN | 207340125 U | 5/2018 |
| CN | 108650597 A | 10/2018 |
| CN | 108712695 A | 10/2018 |
| CN | 207939700 U | 10/2018 |

(56) References Cited

FOREIGN PATENT DOCUMENTS

| | | |
|---|---|---|
| CN | 109032558 A | 12/2018 |
| CN | 109151680 A | 1/2019 |
| CN | 208572417 U | 3/2019 |
| CN | 208675298 U | 3/2019 |
| CN | 208783039 U | 4/2019 |
| EP | 2765788 A2 | 8/2014 |
| EP | 3404931 A1 | 11/2018 |
| JP | H0993684 A | 4/1997 |
| JP | 2004343286 A | 12/2004 |
| KR | 20080103334 A | 11/2008 |
| WO | 0225990 A1 | 3/2002 |
| WO | 2005053351 A1 | 6/2005 |
| WO | 2015087093 A1 | 6/2015 |
| WO | 2016206764 A1 | 12/2016 |
| WO | 2018107141 A1 | 6/2018 |

OTHER PUBLICATIONS

Written Opinion in PCT/CN2020/084161 dated Jul. 6, 2020, 3 pages.
International Search Report in PCT/CN2019/130880 dated Apr. 1, 2020, 6 pages.
International Search Report in PCT/CN2019/130884 dated Mar. 20, 2020, 6 pages.
International Search Report in PCT/CN2019/130886 dated Mar. 31, 2020, 6 pages.
International Search Report in PCT/CN2019/130944 dated Mar. 26, 2020, 6 pages.
International Search Report in PCT/CN2019/130921 dated Apr. 1, 2020, 6 pages.
International Search Report in PCT/CN2019/130942 dated Mar. 26, 2020, 6 pages.
International Search Report in PCT/CN2020/070540 dated Apr. 2, 2020, 6 pages.
International Search Report in PCT/CN2020/070550 dated Mar. 27, 2020, 6 pages.
International Search Report in PCT/CN2020/070545 dated Apr. 15, 2020, 6 pages.
International Search Report in PCT/CN2020/070551 dated Mar. 27, 2020, 7 pages.
International Search Report in PCT/CN2020/070542 dated Mar. 27, 2020, 6 pages.
International Search Report in PCT/CN2020/070539 dated Apr. 7, 2020, 6 pages.
International Search Report in PCT/CN2020/088190 dated Jul. 30, 2020, 6 pages.
International Search Report in PCT/CN2020/106759 dated Oct. 28, 2020, 6 pages.
International Search Report in PCT/CN2020/116319 dated Dec. 11, 2020, 6 pages.
International Search Report in PCT/CN2020/087002 dated Jul. 14, 2020, 4 pages.
Written Opinion in PCT/CN2020/087002 dated Jul. 14, 2020, 5 pages.
International Search Report in PCT/CN2020/087526 dated Jul. 23, 2020, 5 pages.
Written Opinion in PCT/CN2020/087526 dated Jul. 23, 2020, 4 pages.
International Search Report in PCT/CN2020/083631 dated Jun. 29, 2020, 4 pages.
Written Opinion in PCT/CN2020/083631 dated Jun. 29, 2020, 4 pages.
International Search Report in PCT/CN2020/087034 dated Jul. 22, 2020, 4 pages.
Written Opinion in PCT/CN2020/087034 dated Jul. 22, 2020, 5 pages.
Written Opinion in PCT/CN2020/088482 dated Aug. 5, 2020, 4 pages.
International Search Report in PCT/CN2020/088482 dated Aug. 5, 2020, 4 pages.

* cited by examiner

ACOUSTIC OUTPUT APPARATUS WITH A PLURALITY OF ACOUSTIC DRIVERS AND METHODS THEREOF

CROSS-REFERENCE TO RELATED APPLICATIONS

This application is a Continuation of International Application No. PCT/CN2020/084161, filed on Apr. 10, 2020, and claims priority to Chinese Patent Application No. 201910888067.6, filed on Sep. 19, 2019, Chinese Patent Application No. 201910888762.2, filed on Sep. 19, 2019, and Chinese Patent Application No. 201910364346.2, filed on Apr. 30, 2019, the contents of each of which are hereby incorporated by reference.

TECHNICAL FIELD

The present disclosure generally relates to acoustic devices, and more particularly, relates to an open acoustic output apparatus and methods thereof.

BACKGROUND

With the development of acoustic technology, an acoustic output apparatus has been widely used. An open binaural acoustic output apparatus is a portable audio apparatus that facilitates sound conduction within a specific range of a user. In this case, the user may hear sound in the ambient environment when the acoustic output apparatus delivers sound (e.g., a piece of music, a news broadcast, a weather forecast, etc.) to the user. However, an open structure of the open binaural acoustic output apparatus may also lead to a sound leakage to a certain extent. Therefore, it is desirable to provide an acoustic output apparatus and/or method for reducing sound leakage and enhancing sound from certain acoustic sources effectively, thereby improving an audio experience of the user.

SUMMARY

According to an aspect of the present disclosure, an acoustic output apparatus is provided. The acoustic output apparatus may include an acoustic output component and a supporting structure for supporting the acoustic output component proximate to a user's ear. The supporting structure may form an acoustically open structure that allows the acoustic output component to acoustically communicate with the surroundings. The acoustic output component may include a plurality of acoustic drivers. Each of the plurality of acoustic drivers may be configured to output a sound with a frequency range. The frequency ranges of the sounds outputted by different acoustic dividers may be different. At least one of the plurality of acoustic drivers may include a magnetic system for generating a first magnetic field. The magnetic system may include a first magnetic component for generating a second magnetic field and at least one second magnetic component surrounding the first magnetic component. A magnetic gap may be formed between the first magnetic component and the at least one second magnetic component. A magnetic field intensity of the first magnetic field in the magnetic gap may be greater than that of the second magnetic field in the magnetic gap.

BRIEF DESCRIPTION OF THE DRAWINGS

FIG. 52 is a schematic diagram illustrating a top view of another exemplary magnetic connector according to some embodiments of the present disclosure; and.

DETAILED DESCRIPTION

Figure 1:
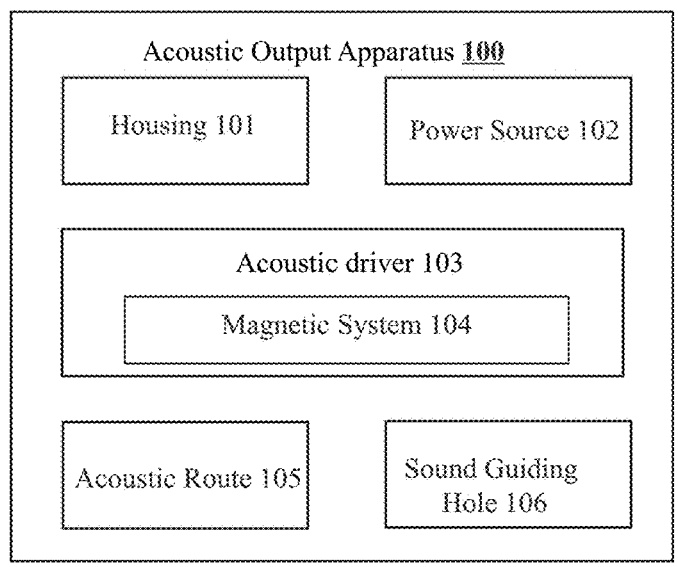
FIG. 1 is a schematic diagram illustrating an exemplary component acoustic output apparatus according to some embodiments of the present disclosure.

FIG. 1 is a schematic diagram illustrating an exemplary acoustic output apparatus 100 according to some embodiments of the present disclosure. As used herein, an acoustic output apparatus 100 refers to a device having a sound output function. In practical applications, the acoustic output apparatus 100 may be implemented by products of various types, such as an earphone, a bracelet, a glass, a helmet, a watch, clothing, or a backpack, or the like, or any combination thereof. For illustration purposes, an earphone with a sound output function may be provided as an example of the acoustic output apparatus.

As shown in FIG. 1, the acoustic output apparatus 100 may include a housing 101, a power source 102, an acoustic driver 103, an acoustic route 105, and a sound guiding hole 106.

The housing 101 may be configured to protect one or more components of the acoustic output apparatus 100 (e.g., the power source 102, the acoustic driver 103, and/or the acoustic route 105). For example, the housing 101 may form an accommodating space, and one or more components of the acoustic output apparatus 100 (e.g., the power source 102, the acoustic driver 103, the acoustic route 105) may be placed in the accommodating space. In some embodiments, the housing 101 may include one or more non-magnetic metal materials (e.g., copper, aluminum, and/or aluminum alloy), a plastic material, or the like, or any combination thereof. The housing 101 may include one or more rigid materials and/or one or more soft materials.

In some embodiments, the housing 101 may include one or more components for fixing the acoustic output apparatus 100 on, for example, an ear, the head, the shoulder, or the like, of a user who wears the acoustic output apparatus 100. Merely by way of example, the housing 101 may include a supporting structure for supporting an acoustic output component of the acoustic output apparatus 100 proximate to the user's ear. The acoustic output component of the acoustic output apparatus 100 may include, for example, the acoustic driver 103 (or a portion thereof), the acoustic route 105, the sound guiding hole 106, or any other component for generating and/or outputting sounds, any combination thereof. In some embodiments, the supporting structure may form an acoustically open structure that allows the acoustic output component to acoustically communicate with the surroundings. The acoustic output apparatus 100 that includes such supporting structure may be referred to as an open acoustic output apparatus. When worn by a user, the open acoustic output apparatus may not block the ear canal of the user and allow the user to listen to the sounds generated by the open acoustic output apparatus and also the environment sound.

In some embodiments, the supporting structure may have any suitable form, shape, and/or size. Merely by way of example, the supporting structure may include an ear hook for hanging the acoustic output component(s) on the user's ear. The ear hook may have a shape of, for example, a circular ring, an oval, a polygonal (regular or irregular), a U-shape, a V-shape, a semi-circle, or the like. As another example, the supporting structure may include a headband placed over the head of the user when the acoustic output apparatus 100 is worn by the user. The headband may be completely rigid or completely flexible. Alternatively, a portion of the headband may be rigid and the other portion of the headband may be flexible. As yet another example, the supporting structure may include a fixing component configured to fix the acoustic output component near an opening of an ear canal of the user, wherein the fixing component may be placed into the ear canal without blocking the ear canal. Merely by way of example, the fixing component may have a shape of a hollow circular ring matching the ear canal. When worn by the user, the circular ring may be stuck in the ear canal without blocking the ear cannel. More descriptions regarding the supporting structure may be found elsewhere in the present disclosure. See, e.g., FIGS. 2A to 4 and relevant descriptions thereof.

The power source 102 may be configured to provide an electrical power to one or more components of the acoustic output apparatus 100 (e.g., the acoustic driver 103). In some embodiments, the power source 102 may include a circuit component, a battery, a charging interface, or the like, or any combination thereof. The circuit component may be configured to connect the battery and one or more other components of the acoustic output apparatus 100 (e.g., the acoustic driver 103), and provide power for operations of the other components. Exemplary batteries may include but not limited to a storage battery, a dry battery, a lithium battery, or the like, or any combination thereof. The charging interface of the power source 102 may be used to charge the acoustic output apparatus 100 (e.g., the battery). In some embodiments, the charging interface of the power source 102 may include a magnetic connector configured to charge the acoustic output apparatus 100 when the magnetic connector absorbs a charging interface of an external power source. More descriptions regarding the magnetic connector may be found elsewhere in the present disclosure. See, e.g., FIGS. 48-53 and relevant descriptions thereof.

The acoustic driver 103 may be configured to convert an electrical signal into a sound. The acoustic driver 103 may be acoustically coupled with the acoustic route 105 and the sound guiding hole 106. The sound generated by the acoustic driver 103 may be transmitted to the sound guiding hole 106 via the acoustic route 105, and the sound guiding hole 106 may output the sound. In some embodiments, the acoustic driver 103 may include a transducer (or referred to as an electro-acoustic transducer), such as an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof.

In some embodiments, the acoustic driver 103 may include a voice coil, a vibration plate (e.g., a vibration diaphragm), and a magnetic system 104. The magnetic system 104 may be configured to generate a magnetic field. When a current is applied to the voice coil, the ampere force generated by the magnetic field may drive the voice coil to vibrate. The vibration of the voice coil may drive the vibration plate to vibrate to generate sound waves, which may be transmitted to the sound guiding hole 106 through the acoustic route 105. In some embodiments, the magnetic system 104 may include a magnetic component for generating a magnetic field and/or a magnetic conductive component for adjusting the magnetic field generated by the magnetic component. In some embodiments, the magnetic system 104 may include a plurality of magnetic components, which in combination may generate a total magnetic field. A magnetic gap may be formed between the magnetic components (or portion thereof) of the magnetic system 104, and the voice coil may be placed in the magnetic gap. In the magnetic gap, the magnetic field intensity of the total magnetic field may be greater than that of the magnetic field generated by any individual magnetic component of the magnetic system 104. More descriptions regarding an acoustic driver may be found elsewhere in the present disclosure. See, e.g., FIG. 8 and relevant descriptions thereof. More descriptions regarding a magnetic system may be found elsewhere in the present disclosure. See, e.g., FIGS. 42 to 47 and relevant descriptions thereof.

The acoustic route 105 may be configured to transmit a sound. For example, the acoustic route 105 may be acoustically coupled with the acoustic driver 103 and transmit a sound generated by the acoustic driver 103 to the sound guiding hole 106. In some embodiments, the acoustic route 105 may include a sound tube, a sound cavity, a resonance cavity, a sound hole, a sound slit, or a tuning net, or the like, or any combination thereof. In some embodiments, the acoustic route 105 may also include an acoustic resistance material, which may have a specific acoustic impedance. Exemplary acoustic resistance materials may include, but not limited to, plastic, textile, metal, permeable material, woven material, screen material or mesh material, porous material, particulate material, polymer material, or the like, or any combination thereof. More descriptions regarding an acoustic route may be found elsewhere in the present disclosure. See, e.g., FIG. 8 and relevant descriptions thereof.

The sound guiding hole 106 be configured to propagate a sound, such as the sound generated by the acoustic driver 103. In some embodiments, the sound guiding hole 106 may be formed on the housing 101 of the acoustic output apparatus 100 with a specific opening and allowing sound to pass. Exemplary shapes of the sound guiding hole 106 may include a circle shape, an oval shape, a square shape, a trapezoid shape, a rounded quadrangle shape, a triangle shape, an irregular shape, or the like, or any combination thereof.

In some embodiments, the acoustic output apparatus 100 may include any count of acoustic drivers 103, acoustic routes 105, and/or sound guiding holes 106. In some embodiments, the acoustic output apparatus 100 may include a plurality of acoustic drivers 103, each of which is configured to generate a sound with a specific frequency range. The sounds generated by different acoustic drivers 103 may have different frequency ranges. Optionally, the acoustic output apparatus 100 may further include a plurality of acoustic routes 105 and a plurality of pairs of sound guiding holes 106. The sound generated by each of the acoustic drivers 103 may be transmitted to one pair of sound guiding holes 106 via one of the acoustic routes 105. In some embodiments, parameter(s) of the acoustic drivers 103, the acoustic routes 105, and/or the pairs of sound guiding holes 106 may be adjusted to improve the performance of the acoustic output apparatus 100, for example, reduce or eliminate the acoustic output apparatus's sound leakage to the environment and/or increase the acoustic output apparatus's output effect to the user.

Figure 2A:
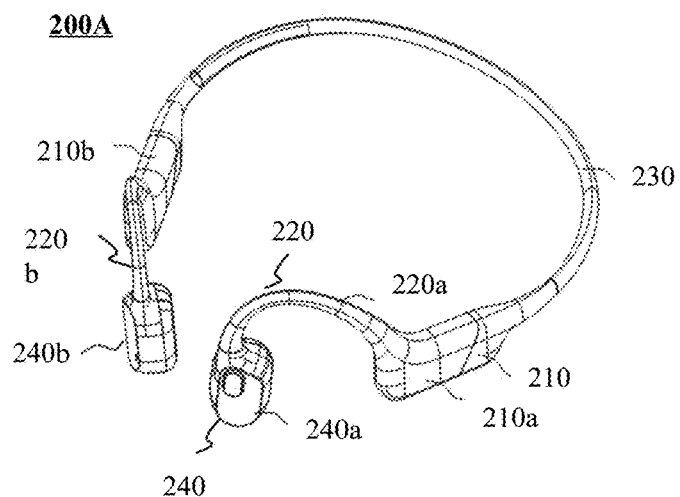
FIG. 2A is a schematic diagram illustrating an exemplary acoustic output apparatus according to some embodiments of the present disclosure.

FIG. 2A is a schematic diagram illustrating an exemplary acoustic output apparatus 200A according to some embodiments of the present disclosure. As shown in FIG. 2A, the acoustic output apparatus 200A may include at least one circuit housing 210, two ear hooks 220, a rear hook 230, a first speaker assembly 240a, and a second speaker assembly 240b. A circuit housing 210 may be used to accommodate one or more components, such as a control circuit, a battery, or the like, or any combination thereof, of the acoustic output apparatus 200A.

In some embodiments, the acoustic output apparatus 200A may include a first circuit housing 210a and a second circuit housing 210b as shown in FIG. 2A. One of the two ear hooks 220 may be mechanically connected to the first speaker assembly 240a and the first circuit housing 210a. The other one of the ear hooks 220 may be mechanically connected to the second speaker assembly 240b and the second circuit housing 210b. The ear hooks 220 may be used as a supporting structure of the acoustic output apparatus 200A. For example, the shape of each of the ear hooks 220 may match the shape of the user's ear. When the acoustic output apparatus 200A is worn by the user, the ear hooks 220 may be hung on the user's ears, and the rear hook 230 may surround the back of the user's head. For example, the ear hook 220a may be used to support the first speaker assembly 240a approximate to the left ear of the user, and the ear hook 220b may be used to support the second speaker assembly 240b approximate to the right ear of the user. In some embodiments, the first and second speaker assemblies may not block the ear canals of the user.

The speaker assemblies 240a and 240b may include one or more acoustic output components for generating and/or output a sound, for example, an acoustic driver. In some embodiments, a plurality of components of the acoustic output apparatus 200A may form an integral assembly. In some embodiments, the acoustic output apparatus 200A may include one or more additional components and/or one or more components of the acoustic output apparatus 200A may be omitted. For example, the acoustic output apparatus 200A may include one or more user interaction elements, such as one or more buttons, a microphone, a touch screen, or the like, for the user to interact with the acoustic output apparatus 200A. As another example, the rear hook 230 may be omitted, and the two ear hooks may be used independently.

In some embodiments, the acoustic output apparatus 200A may include one or more sound guiding holes for outputting sounds. The count of the sound guiding holes may be any positive integer, such as 1, 2, 4, 5, 10, or the like. A sound guiding hole may be located at any position of the acoustic output apparatus 200A. Merely by way of example, a plurality of sound guiding holes may be set on a housing of the speaker assembly 240a, wherein the sound guiding holes may be located on a same surface or different surfaces of the speaker assembly 240a. As another example, a sound guiding hole may be located on the speaker assembly 240a (e.g., a surface of the speaker assembly 240a opposite to the first circuit housing 210a), and another sound guiding hole may be located on the first circuit housing 210a (e.g., a surface of the first circuit housing 210a opposite to the speaker assembly 240a). When the acoustic output apparatus 200A is worn by the user, the sound guiding hole on the speaker assembly 240a and the sound guiding hole on the first circuit housing 210a may be located on two sides of the user's auricle.

Figure 2B:
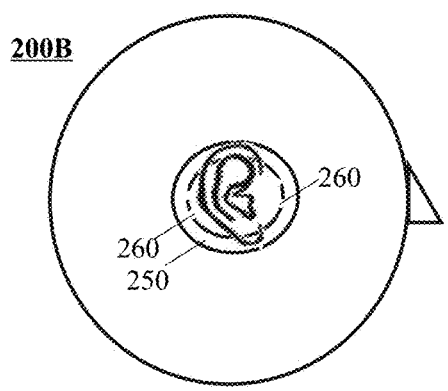
FIG. 2B is a schematic diagram illustrating an exemplary acoustic output apparatus according to some embodiments of the present disclosure.

FIG. 2B is a schematic diagram illustrating an exemplary acoustic output apparatus 200B according to some embodiments of the present disclosure. As shown in FIG. 2B, the acoustic output apparatus 200B may include an ear hook 250, at least one sound guiding holes 260, and a speaker assembly (not shown in FIG. 2B). The ear hook 250 may have a shape of a circular ring, which may be hung on an ear of a user of the acoustic output apparatus 200B. In some embodiments, an accommodation space may be formed within the ear hook 250 for accommodating the speaker assembly (e.g., an acoustic driver).

The sound guiding hole(s) 260 may be set on a housing of the ear hook 250. The count of the sound guiding hole(s) 260 may be any positive value. Merely by way of example, as shown in FIG. 2B, two sound guiding holes 260 may be set on a side of the ear hook 250 adjacent to the ear canal of the user, and one sound guiding hole 260 may be set on a side of the ear hook 250 adjacent to the back of the ear. It should be understood that the acoustic output apparatus 200B in FIG. 2B is provided for illustration purposes, and may be modified according to actual needs. For example, the ear hook 250 may have any other shape suitable for human ears, for example, an oval, a polygonal (regular or irregular), a U-shape, a V-shape, a semi-circle, or the like. The at least one sound guiding hole 260 may be located at any position on the acoustic output apparatus 200B.

Figure 3:
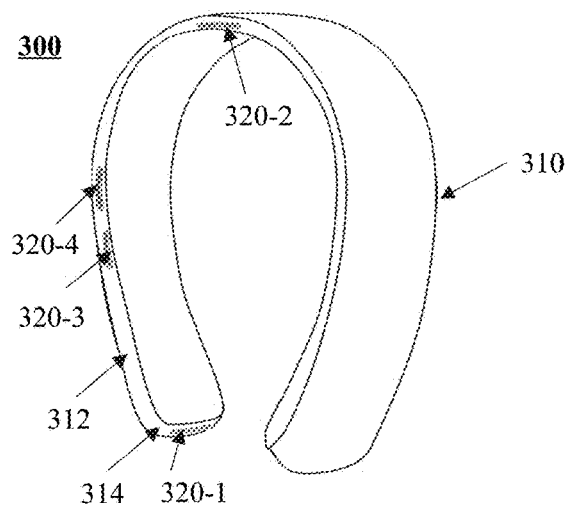
FIG. 3 is a schematic diagram illustrating an exemplary acoustic output apparatus according to some embodiments of the present disclosure.

FIG. 3 is a schematic diagram illustrating an exemplary acoustic output apparatus 300 according to some embodiments of the present disclosure. As shown in FIG. 3, the acoustic output apparatus 300 may have a headband-shaped structure and include a housing 310, at least one sound guiding hole 320 (e.g., a first sound guiding hole 320-1, a second sound guiding hole 320-2, a third sound guiding hole 320-3, and a fourth sound guiding hole 320-4), and a speaker assembly (not shown in FIG. 3). The housing 310 may have a shape of a headband and include at least a side surface 312 and at least an end surface 314. The acoustic output apparatus 300 may be placed over the head or the neck of a user when the acoustic output apparatus 300 is worn by the user.

The at least one sound guiding hole 320 may be located at the housing 310. Merely by way of example, the first sound guiding hole 320-1 may be located at the end surface 314. The second sound guiding hole 320-2, the third sound guiding hole 320-3, and the fourth sound guiding hole 320-4 may be located at the side surface 312. Different sound guiding holes 320 may have a same shape or different shapes. In some embodiments, different sound guiding holes 320 may be used output sounds with different frequency ranges. Merely by way of example, the sound guiding holes 320-1 and 320-2 may be used to output low-frequency sounds (e.g., a sound with a frequency lower than a threshold frequency), and the sound guiding holes 320-3 and 320-4 may be used output high frequency sounds (e.g., a sound with a frequency higher than the threshold frequency). The distance between the sound guiding holes 320-1 and 320-2 and/or the distance between the sound guiding holes 320-3 and 320-4 may be adjusted to achieve an improved performance of the acoustic output apparatus 300, such as a reduced sound leakage to the environment and/or an improved sound output effect at the user's ears.

Figure 4:
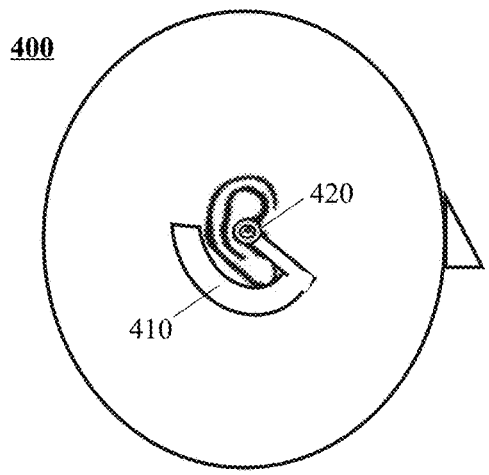
FIG. 4 is a schematic diagram illustrating an exemplary acoustic output apparatus according to some embodiments of the present disclosure.

FIG. 4 is a schematic diagram illustrating an exemplary acoustic output apparatus 400 according to some embodiments of the present disclosure. The acoustic output apparatus 400 may include a housing 410, a fixing component 420, and a speaker assembly (not shown in FIG. 4) accommodated within the housing 410. In some embodiments, the speaker assembly of the acoustic output apparatus 400 may be mechanically connected to the fixing component 240 and placed proximate to an opening of the ear canal by the fixing component 240. The fixing component 240 may have a shape matching the ear canal of the user and can be fixed in the ear canal. The fixing component 240 may have a through-hole through which the air can pass when it is fixed in the ear canal. In some embodiments, the fixing component 240 may include one or more soft materials (e.g., soft silicone, rubber, etc.) so that it may be comfortable to wear. In some embodiments, one or more sound guiding holes may be set on the housing 410. For example, a sound guiding hole may be set on a portion of the housing 410 adjacent to the ear canal of the user, and another sound guiding hole may be set on a portion of the housing 410 adjacent to the back of the ear of the user.

Figure 5:
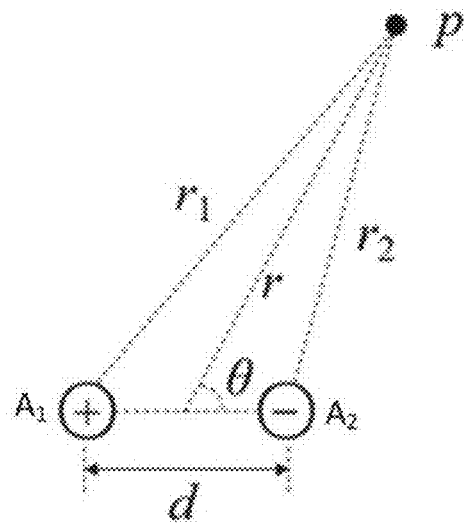
FIG. 5 is a schematic diagram illustrating exemplary two point sources according to some embodiments of the present disclosure.

FIG. 5 is a schematic diagram illustrating an exemplary two point sources according to some embodiments of the present disclosure. In order to further explain the effect of the setting of the sound guiding holes on the acoustic output apparatus, and considering that the sound may be regarded as propagating outwards from the sound guiding holes, the present disclosure may describe sound guiding holes on an acoustic output apparatus as sound sources for externally outputting sound.

Just for the convenience of description and for the purpose of illustration, when sizes of the sound guiding holes on the acoustic output apparatus are small, each sound guiding hole may be approximately regarded as a point source (or referred to as a point sound source or a sound source). In some embodiments, any sound guiding hole provided on the acoustic output apparatus for outputting sound may be approximated as a single point (sound) source on the acoustic output apparatus. The sound field pressure p generated by a single point source may satisfy Equation (1):

$$p = \frac{j\omega\rho_0}{4\pi r} Q_0 \exp j(\omega t - kr), \qquad (1)$$

where $\omega$ denotes an angular frequency, $\rho_0$ denotes an air density, r denotes a distance between a target point and the point source, $Q_0$ denotes a volume velocity of the point source, and k denotes the wave number. It may be concluded that the magnitude of the sound field pressure of the point source at the target point is inversely proportional to the distance from the target point to the point source.

It should be noted that the sound guiding holes for outputting sound as point sources may only serve as an explanation of the principle and effect of the present disclosure, and may not limit the shapes and sizes of the sound guiding holes in practical applications. In some embodiments, if an area of a sound guiding hole is large enough, the sound guiding hole may also be equivalent to a planar acoustic source. In some embodiments, the point source may also be realized by other structures, such as a vibration surface and a sound radiation surface. For those skilled in the art, without creative activities, it may be known that sounds produced by structures such as a sound guiding hole, a vibration surface, and an acoustic radiation surface may be similar to a point source at the spatial scale discussed in the present disclosure, and may have similar sound propagation characteristics and the similar mathematical description method. Further, for those skilled in the art, without creative activities, it may be known that the acoustic effect achieved by "an acoustic driver may output sound from at least two first sound guiding holes" described in the present disclosure may also achieve the same effect by other acoustic structures, for example, "at least two acoustic drivers each may output sound from at least one acoustic radiation surface." According to actual situations, other acoustic structures may be selected for adjustment and combination, and the same acoustic output effect may also be achieved. The principle of radiating sound outward with structures such as surface sound sources may be similar to that of point sources, and may not be repeated here.

As mentioned above, at least two sound guiding holes corresponding to a same acoustic driver may be set on the acoustic output apparatus provided in the specification. In this case, two point sources may be formed, which may reduce sound transmitted to the surrounding environment. For convenience, sound output from the acoustic output apparatus to the surrounding environment may be referred to as a far-field leakage since it can be heard by others in the environment. The sound output from the acoustic output apparatus to the ears of the user wearing the acoustic output apparatus may be referred to as a near-field sound since a distance between the acoustic output apparatus and the user is relatively short. In some embodiments, the sound output from two sound guiding holes (i.e., two point sources) may have a certain phase difference. When the distance between the two point sources and the phase difference of the two point sources meet a certain condition, the acoustic output apparatus may output different sound effects in the near field (for example, the position of the user's ear) and the far field. For example, if the phases of the point sources corresponding to the two sound guiding holes are opposite, that is, an absolute value of the phase difference between the two point sources is 180 degrees, the far-field leakage may be reduced according to the principle of reversed phase cancellation. More details regarding an enhancement of the acoustic output apparatus by adjusting the amplitude and/or phase of each point source may be found in International application No. PCT/CN2019/130884, filed on Dec. 31, 2019, the entire content of which may be hereby incorporated by reference.

As shown in FIG. 5, a sound field pressure p generated by two point sources may satisfy Equation (2):

$$p = \frac{A_1}{r_1}\exp j(\omega t - kr_1 + \varphi_1) + \frac{A_2}{r_2}(\omega t - kr_2 + \varphi_2), \quad (2)$$

where $A_1$ and $A_2$ denote intensities of the two point sources, and $\varphi_1$ and $\varphi_2$ denote phases of the two point sources, respectively, d denotes a distance between the two point sources, and $r_1$ and $r_2$ may satisfy Equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases} \quad 3)$$

where r denotes a distance between a target point and the center of the two point sources in the space, and θ indicates an angle between a line connecting the target point and the center of the two point sources and the line on which the two point source is located.

It may be concluded from Equation (3) that a magnitude of the sound pressure pat the target point in the sound field may relate to the intensity of each point source, the distance d, the phase of each point source, and the distance r.

Two point sources with different output effects may be achieved by different settings of sound guiding holes, such that the volume of the near-field sound may be improved, and the far-field leakage may be reduced. For example, an acoustic driver may include a vibration diaphragm. When the vibration diaphragm vibrates, sounds may be transmitted from the front and rear sides of the vibration diaphragm, respectively. The front side of the vibration diaphragm in the acoustic output apparatus may be provided with a front chamber for transmitting sound. The front chamber may be coupled with a sound guiding hole acoustically. The sound on the front side of the vibration diaphragm may be transmitted to the sound guiding hole through the front chamber and further transmitted outwards. The rear side of the vibration diaphragm in the acoustic output apparatus may be provided with a rear chamber for transmitting sound. The rear chamber may be coupled with another sound guiding hole acoustically. The sound on the rear side of the vibration diaphragm may be transmitted to the sound guiding hole through the rear chamber and propagate further outwards. It should be noted that, when the vibration diaphragm is vibrating, the front side and the rear side of the vibration diaphragm may generate sounds with opposite phases. In some embodiments, the structures of the front chamber and rear chamber may be specially set so that the sound output by the acoustic driver at different sound guiding holes may meet a specific condition. For example, lengths of the front chamber and rear chamber may be specially designed such that sounds with a specific phase relationship (e.g., opposite phases) may be output at the two sound guiding holes. As a result, a problem that the acoustic output apparatus has a low volume in the near-field and a sound leakage in the far-field may be effectively resolved.

Under certain conditions, compared to the volume of a far-field leakage of a single point source, the volume of a far-field leakage of two point sources may increase with the frequency. In other words, the leakage reduction capability of the two point sources in the far field may decrease with the frequency increases. For further description, a curve illustrating a relationship between a far-field leakage and a frequency may be described in connection with FIG. 6.

Figure 6:
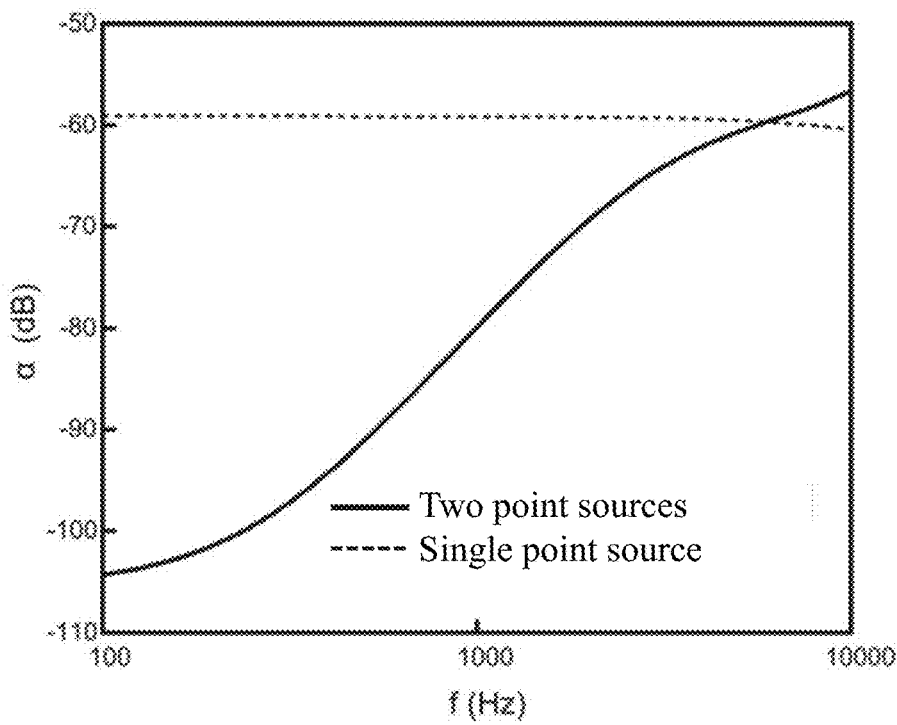
FIG. 6 is a schematic diagram illustrating a variation of a sound leakage of two point sources and a single point source along with frequency according to some embodiments of the present disclosure.

FIG. 6 is a schematic diagram illustrating a variation of a sound leakage of two point sources and a single point source as a function of frequency according to some embodiments of the present disclosure. The distance between the two point sources in FIG. 6 may be fixed, and the two point sources may have a substantially same amplitude and opposite phases. The dotted line may indicate a variation curve of a volume of a leaked sound of the single point source at different frequencies. The solid line may indicate a variation curve of a volume of a leaked sound of the two point sources at different frequencies. The abscissa of the diagram may represent the sound frequency (f), and the unit may be Hertz (Hz). The ordinate of the diagram may use a normalization parameter a to evaluate the volume of a leaked sound. The parameter a may be determined according to Equation (4):

$$\alpha = \frac{|P_{far}|^2}{|P_{ear}|^2}, \quad (4)$$

where $P_{far}$ represents the sound pressure of the acoustic output apparatus in the far-field (i.e., the sound pressure of the far-field sound leakage). $P_{ear}$ represents the sound pressure around the user's ears (i.e., the sound pressure of the near-field sound). The larger the value of a, the larger the far-field leakage relative to the near-field sound heard will be, indicating that a poorer capability of the acoustic output apparatus for reducing the far-field leakage.

As shown in FIG. 6, when the frequency is below 6000 Hz, the far-field leakage produced by the two point sources may be less than the far-field leakage produced by the single point source, and may increase as the frequency increases. When the frequency is close to 10000 Hz (for example, about 8000 Hz or above), the far-field leakage produced by the two point sources may be greater than the far-field leakage produced by the single point source. In some embodiments, a frequency corresponding to an intersection of the variation curves of the two point sources and the single point source may be determined as an upper limit frequency that the two point sources are capable of reducing a sound leakage.

For illustrative purposes, when the frequency is relatively small (for example, in a range of 100 Hz~1000 Hz), the capability of reducing a sound leakage of the two point sources may be strong (e.g., the value of a is small, such as below −80 dB). In such a frequency band, an increase of the volume of the sound heard by the user may be determined as an optimization goal. When the frequency is larger (for example, in a range of 1000 Hz~8000 Hz), the capability of reducing a sound leakage of the two point sources may be weak (e.g., above −80 dB). In such a frequency band, a decrease of the sound leakage may be determined as the optimization goal.

According to FIG. 6, it may be possible to determine a frequency division point based on the variation tendency of the two point sources' capability of reducing a sound leakage. Parameters of the two point sources may be adjusted according to the frequency division point so as to reducing the sound leakage of the acoustic output apparatus. For example, the frequency corresponding to a of a specific value (for example, −60 dB, −70 dB, −80 dB, −90 dB, etc.) may be used as the frequency division point. Parameters of the two point sources may be determined to improve the near-field sound in a frequency band below the frequency division point, and/or to reduce the far-field sound leakage in a frequency band above the frequency division point. In some embodiments, a high-frequency band with a high frequency (for example, a sound output from a high-frequency acoustic driver) and a low-frequency band with a low frequency (for example, a sound output from a low-frequency acoustic driver) may be determined based on the frequency division point. More details of the frequency division point may be disclosed elsewhere in the present disclosure, for example, FIG. 8 and the descriptions thereof.

In some embodiments, the method for measuring and determining the sound leakage may be adjusted according to the actual conditions. For example, a plurality of points on a spherical surface centered by s center point of the two point sources with a radius of r (for example, 40 centimeter) may be identified, and an average value of amplitudes of the sound pressure at the plurality of points may be determined as the value of the sound leakage. The distance between the near-field listening position and the point sources may be far less than the distance between the point sources and the spherical surface for measuring the far-field leakage. Optionally, the ratio of the distance from the near-field listening position to the center of the two point sources to the radius r may be less than 0.3, 0.2, 0.15, or 0.1. As another example, one or more points of the far-field may be taken as the position for measuring the sound leakage, and the sound volume of the position may be taken as the value of the sound leakage. As another example, a center of the two point sources may be used as a center of a circle at the far field, and sound pressure amplitudes of two or more points evenly distributed at the circle according to a certain spatial angle may be averaged as the value of the sound leakage. These methods may be adjusted by those skilled in the art according to actual conditions, and is not intended to be limiting.

According to FIG. 6, it may be concluded that in the high-frequency band (a higher frequency band determined according to the frequency division point), the two point sources may have a weak capability to reduce a sound leakage. In the low-frequency band (a lower frequency band determined according to the frequency division point), the two point sources may have a strong capability to reduce a sound leakage. At a certain sound frequency, if the distance between the two point sources changes, its capability to reduce a sound leakage may be changed, and the difference between volume of the sound heard by the user (also referred to as "heard sound") and volume of the leaked sound may also be changed. For a better description, the curve of a far-field leakage as a function of the distance between the two point sources may be described with reference to FIGS. 7A and 7B.

Figure 7A:
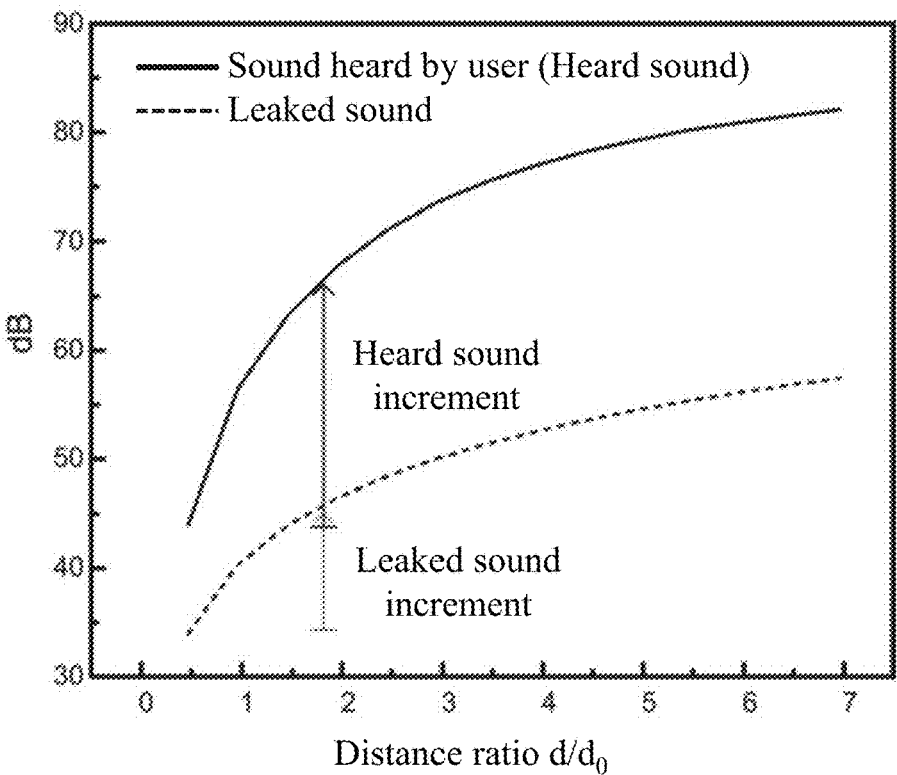
FIGS. 7A-7B are graphs illustrating a volume of a near-field sound and a volume of a far-field leakage as a function of a distance between two point sources according to some embodiments of the present disclosure.
Figure 7B:
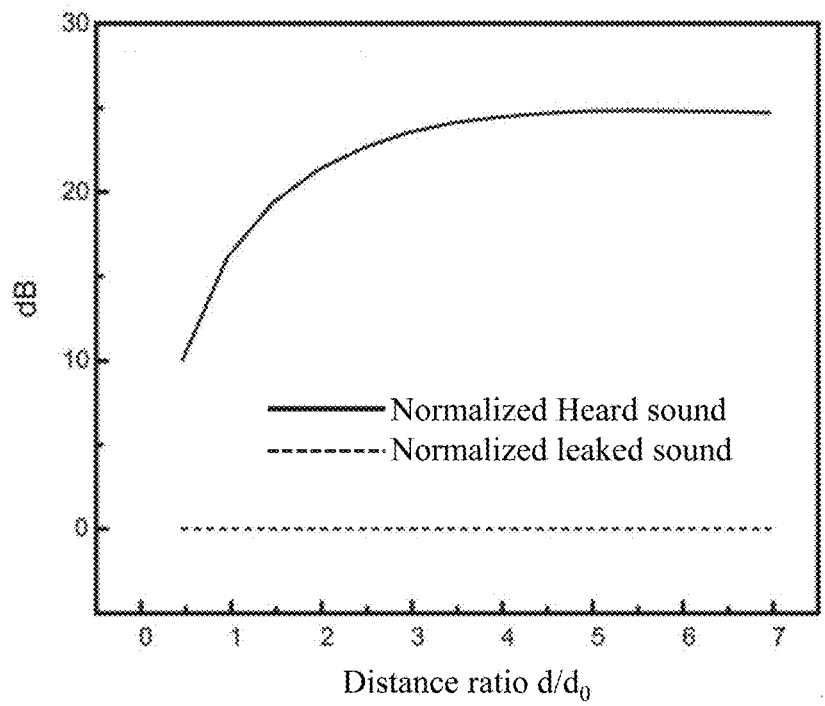

FIGS. 7A and 7B are exemplary graphs illustrating a volume of a near-field sound and a volume of a far-field leakage as a function of a distance between two point sources according to some embodiments of the present disclosure. FIG. 7B may be generated by performing a normalization on the graph in FIG. 7A.

In FIG. 7A, a solid line may represent a variation curve of the volume of the two point sources as a function of the distance between the two point sources, and the dotted line may represent the variation curve of the volume of the leaked sound of the two point sources as a function of the distance between the two point sources. The abscissa may represent a distance ratio d/d0 of the distance d of the two point sources to a reference distance d0. The ordinate may represent a sound volume (the unit is decibel dB). The distance ratio d/d0 may reflect a variation of the distance between the two point sources. In some embodiments, the reference distance d0 may be selected within a specific range. For example, d0 may be a specific value in the range of 2.5 mm~10 mm, e.g., d0 may be 5 mm. In some embodiments, the reference distance d0 may be determined based on a listening position. For example, the distance between the listening position to the nearest point source may be taken as the reference distance d0. It should be known that the reference distance d0 may be flexibly selected from any other suitable values according to the actual conditions, which is not limited here. Merely by way of example, in FIG. 7A, d0 may be 5 mm.

When the sound frequency is a constant, the volume of the sound heard by the user and volume of the leaked sound of the two point sources may increase as the distance between the two point sources increases. When the distance ratio d/d0 of is less than a threshold ratio, an increase (or increment) in the volume of the sound heard by the user may be larger than an increase (or increment) in the volume of the leaked sound as the distance between two point sources increases. That is to say, the increase in volume of the sound heard by the user may be more significant than the increase in volume of the leaked sound. For example, as shown in FIG. 7A, when the distance ratio d/d0 is 2, the difference between the volume of the sound heard by the user and the volume of the leaked sound may be about 20 dB. When the distance ratio d/d0 is 4, the difference between the volume of the sound heard by the user and the volume of the leaked sound may be about 25 dB. In some embodiments, when the distance ratio d/d0 reaches the threshold ratio, the ratio of the volume of the sound heard by the user to the volume of the leaked sound of the two point sources may reach a maximum value. At this time, as the distance of the two point sources further increases, the curve of the volume of the sound heard by the user and the curve of the volume of the leaked sound may gradually go parallel, that is, the increase in volume of the sound heard by the user and the increase in volume of the leaked sound may remain substantially the same. For example, as shown in FIG. 7B, when the distance ratio d/d0 is 5, 6, or 7, the difference between the volume of the sound heard by the user and the volume of the leaked sound may remain substantially the same, both of which may be about 25 dB. That is, the increase in volume of the sound heard by the user may be the same as the increase in volume of the leaked sound. In some embodiments, the threshold ratio of the distance ratio d/d0 of the two point sources may be in the range of 0-7. For example, the threshold ratio of d/d0 may be set in the range of 0.5-4.5. As another example, the threshold ratio of d/d0 may be set in the range of 1-4.

In some embodiments, the threshold ratio value may be determined based on the variation of the difference between the volume of the sound heard by the user and the volume of the leaked sound of the two point sources of FIG. 7A. For example, the ratio corresponding to the maximum difference between the volume of the sound heard by the user and the volume of the leaked sound may be determined as the threshold ratio. As shown in FIG. 7B, when the distance ratio d/d0 is less than the threshold ratio (e.g., 4), a curve of a normalized sound heard by the user (also referred to as "normalized heard sound") may show an upward trend (the slope of the curve is larger than 0) as the distance between the two point sources increases. That is, the increase in sound heard by the user volume may be greater than the increase in volume of the leaked sound. When the distance ratio d/d0 is greater than the threshold ratio, the slope of the curve of the normalized sound heard by the user may gradually approach 0 as the distance between the two point sources increases. That is to say, the increase in volume of the sound heard by the user may be no longer greater than the increase in volume of the leaked sound as the distance between the two point sources increases.

According to the descriptions above, if the listening position is fixed, the parameters of the two point sources may be adjusted by certain means. It may be possible to achieve an effect that the volume of the near-field sound has a significant increase while the volume of the far-field leakage only increases slightly (i.e., the increase in the volume of the near-field sound is greater than the volume of the far-field leakage). For example, two or more sets of two point sources (such as a set of high-frequency two point sources and a set of low-frequency two point sources) may be used. For each set, the distance between the point sources in the set are adjusted by a certain means, so that the distance between the high-frequency two point sources may be less than the distance between the low-frequency two point sources. The low-frequency two point sources may have a small sound leakage (the capability to reduce the sound leakage is strong), and the high-frequency two point sources have a large sound leakage (the capability to reduce the sound leakage is weak). The volume of the sound heard by the user may be significantly larger than the volume of the leaked sound if a smaller distance between the two point sources is set in the high-frequency band, thereby reducing the sound leakage.

In some embodiments, each acoustic driver may have a corresponding pair of sound guiding holes. The distance between the sound guiding holes corresponding to each acoustic driver may affect the volume of the near-field sound transmitted to the user's ears and the volume of the far-field leakage transmitted to the environment. In some embodiments, if the distance between the sound guiding holes corresponding to a high-frequency acoustic driver is less than that between the sound guiding holes corresponding to a low-frequency acoustic driver, the volume of the sound heard by the user may be increased and the sound leakage may be reduced, thereby preventing the sound from being heard by others near the user of the acoustic output apparatus. According to the above descriptions, the acoustic output apparatus may be effectively used as an open earphone even in a relatively quiet environment.

Figure 8:
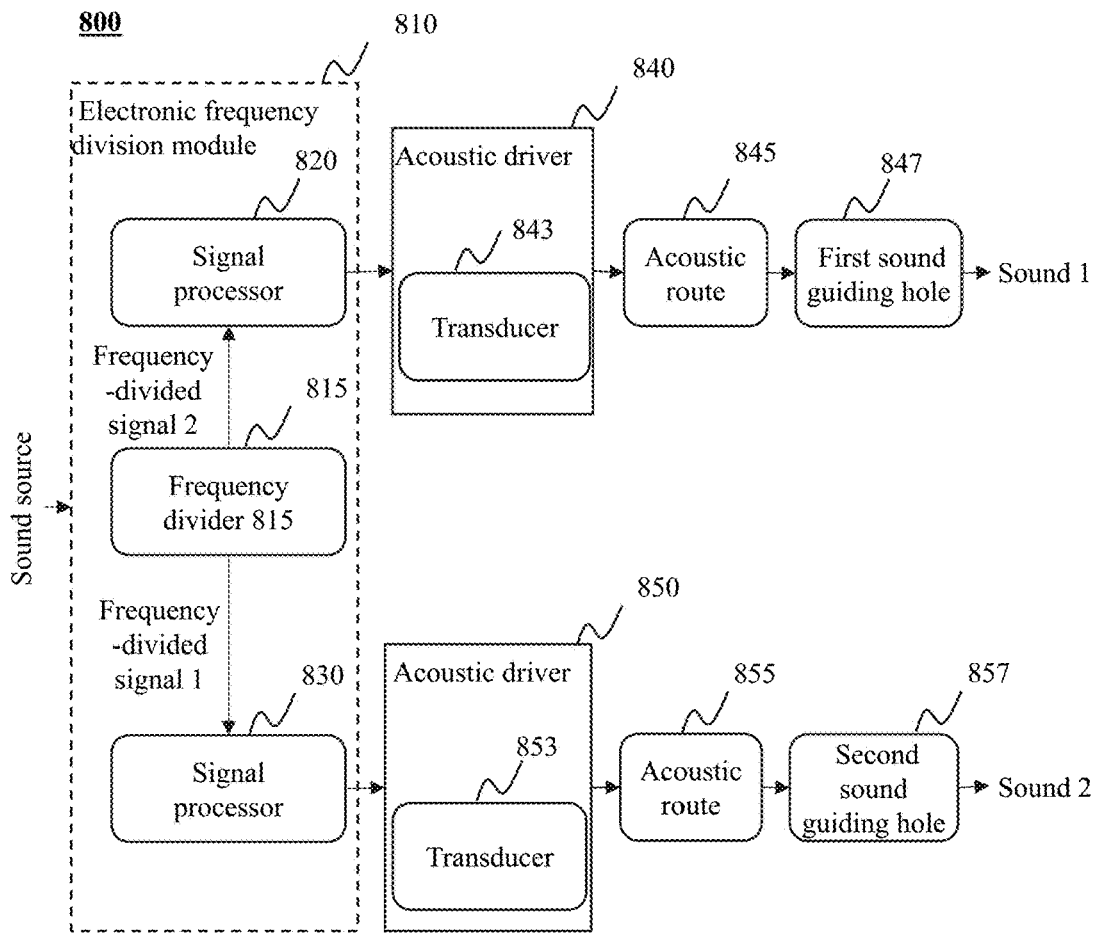
FIG. 8 is a schematic diagram illustrating an exemplary acoustic output apparatus according to some embodiments of the present disclosure.

FIG. 8 is a schematic diagram illustrating an exemplary acoustic output apparatus according to some embodiments of the present disclosure. As shown in FIG. 8, the acoustic output apparatus 800 may include an electronic frequency division module 810, an acoustic driver 840, an acoustic driver 850, an acoustic route 845, an acoustic route 855, at least two first sound guiding holes 847, and at least two second sound guiding holes 857. In some embodiments, the acoustic output apparatus 800 may further include a controller (not shown in the figure). The electronic frequency division module 810 may be part of the controller and configured to generate electrical signals that are input into different acoustic drivers. The connection between different components in the acoustic output apparatus 800 may be wired and/or wireless.

The electronic frequency division module 810 may divide the frequency of a source signal. The source signal may come from one or more sound source apparatus (for example, a memory storing audio data). The sound source apparatus may be part of the acoustic output apparatus 800 or an independent device. The source signal may be an audio signal that is received by the acoustic output apparatus 800 via a wired or wireless means. In some embodiments, the electronic frequency division module 810 may decompose the source signal into two or more frequency-divided signals having different frequencies. For example, the electronic frequency division module 110 may decompose the source signal into a first frequency-divided signal (or frequency-divided signal 1) having a high-frequency sound and a second frequency-divided signal (or frequency-divided signal 2) having a low-frequency sound. For convenience, a frequency-divided signal having the high-frequency sound may be referred to as a high-frequency signal, and a frequency-divided signal having the low-frequency sound may be referred to as a low-frequency signal.

For the purposes of description, a low-frequency signal described in the present disclosure may refer to a sound signal with a frequency in a first frequency range (or referred to as a low frequency range). A high-frequency signal may refer to a sound signal with a frequency in a second frequency range (or referred to as a high frequency range). The first frequency range and the second frequency range may or may not include overlapping frequency ranges. The second frequency range may include frequencies higher than the first frequency range. Merely by way of example, the first frequency range may include frequencies below a first threshold frequency. The second frequency range may include frequencies above a second threshold frequency. The first threshold frequency may be lower than the second threshold frequency, or equal to the second threshold frequency, or higher than the second threshold frequency. For example, the first threshold frequency may be lower than the second threshold frequency (for example, the first threshold frequency may be 600 Hz and the second threshold frequency may be 700 Hz), which means that there is no overlap between the first frequency range and the second frequency range. As another example, the first threshold frequency may be equal to the second frequency (for example, both the first threshold frequency and the second threshold frequency may be 650 Hz or any other frequency values). As another example, the first threshold frequency may be higher than the second threshold frequency, which indicates that there is an overlap between the first frequency range and the second frequency range. In such cases, in some embodiments, the difference between the first threshold frequency and the second threshold frequency may not exceed a third threshold frequency. The third threshold frequency may be a fixed value, for example, 20 Hz, 50 Hz, 100 Hz, 150 Hz, or 200 Hz. Optionally, the third threshold frequency may be a value related to the first threshold frequency and/or the second threshold frequency (for example, 5%, 10%, 15%, etc., of the first threshold frequency). Alternatively, the third threshold frequency may be a value flexibly set by the user according to the actual needs, which may be not limited herein.

In some embodiments, the electronic frequency division module 810 may include a frequency divider 815, a signal processor 820, and a signal processor 830. The frequency divider 815 may be used to decompose the source signal into two or more frequency-divided signals containing different frequency components, for example, a frequency-divided signal 1 having a high-frequency sound component and a frequency-divided signal 2 having a low-frequency sound component. In some embodiments, the frequency divider 815 may be any electronic device that may implement the signal decomposition function, including but not limited to one of a passive filter, an active filter, an analog filter, a digital filter, or any combination thereof.

In some embodiments, the frequency divider 815 may divide the source signal based on one or more frequency division points. A frequency division point may refer to a specific frequency distinguishing the first frequency range and the second frequency range. For example, when there is an overlapping frequency range between the first frequency range and the second frequency range, the frequency division point may be a feature point within the overlapping frequency range (for example, a low-frequency boundary point, a high-frequency boundary point, a center frequency point, etc., of the overlapping frequency range). In some embodiments, the frequency division point may be determined according to a relationship between the frequency and the sound leakage of the acoustic output apparatus (for example, the curves shown in FIGS. 6, 7A, and 7B). For example, considering that the sound leakage of the acoustic output apparatus changes with the frequency, a frequency point corresponding to the volume of the leaked sound satisfying a certain condition may be selected as the frequency division point, for example, 1000 Hz shown in FIG. 6. In some alternative embodiments, the user may specify a specific frequency as the frequency division point directly. For example, considering that the frequency range of sounds that the human ear may hear is 20 Hz-20 kHz, the user may select a frequency point in this range as the frequency division point. For example, the frequency division point may be 600 Hz, 800 Hz, 1000 Hz, 1200 Hz, or the like. In some embodiments, the frequency division point may be determined based on the performance of the acoustic drivers 840 and 850. For example, considering that a low-frequency acoustic driver and a high-frequency acoustic driver have different frequency response curves, the frequency division point may be selected within a frequency range. The frequency range may be above ½ of the upper limiting frequency of the low-frequency acoustic driver and below 2 times of the lower limiting frequency of the high-frequency acoustic driver. In some embodiments, the frequency division point may be selected in a frequency range above ⅓ of the upper limiting frequency of the low-frequency acoustic driver and below 1.5 times of the lower limiting frequency of the high-frequency acoustic driver. In some embodiments, in the overlapping frequency range, the positional relationship between point sources may also affect the volume of the sound produced by the acoustic output apparatus in the near field and the far field. More details may be found in International application No. PCT/CN2019/130886, filed on Dec. 31, 2019, the entire contents of which are hereby incorporated by reference.

The signal processor 820 and the signal processor 830 may further process a frequency-divided signal to meet the requirements of sound output. In some embodiments, the signal processor 820 and/or the signal processor 830 may include one or more signal processing components. For example, the signal processing components(s) may include, but not limited to, an amplifier, an amplitude modulator, a phase modulator, a delayer, a dynamic gain controller, or the like, or any combination thereof. Merely by way of example, the processing of a sound signal by the signal processor 820 and/or the signal processor 830 may include adjusting the amplitude of a portion of the sound signal that has a specific frequency. In some embodiments, if the first frequency range and the second frequency range overlap, the signal processors 820 and 830 may adjust the intensity of a portion of a sound signal that has the frequency in the overlapping frequency range (for example, reduce the amplitude of the portion that has the frequency in the overlapping frequency range). This may avoid that in a final sound outputted by acoustic output apparatus, the portion that corresponds to the overlapping frequency range may have an excessive volume caused by the superposition of multiple sound signals.

After being processed by the signal processors 820 or 830, the frequency-divided signals 1 and 2 may be transmitted to the acoustic drivers 840 and 850, respectively. In some embodiments, the processed frequency-divided signal transmitted into the acoustic driver 840 may be a sound signal having a lower frequency range (e.g., the first frequency range). Therefore, the acoustic driver 840 may also be referred to as a low-frequency acoustic driver. The processed frequency-divided transmitted into the acoustic driver 850 may be a sound signal having a higher frequency range (e.g., the second frequency range). Therefore, the acoustic driver 850 may also be referred to as a high-frequency acoustic driver. The acoustic driver 840 and the acoustic driver 850 may convert sound signals into a low-frequency sound and a high-frequency sound, respectively, then propagate the converted signals outwards.

In some embodiments, the acoustic driver 840 may be acoustically coupled to at least two first sound guiding holes. For example, the acoustic driver 840 may be acoustically coupled to the two first sound guiding holes 847 via two acoustic routes 845. The acoustic driver 840 may propagate sound through the at least two first sound guiding holes 847. The acoustic driver 850 may be acoustically coupled to at least two second sound guiding holes. For example, the acoustic driver 850 may be acoustically coupled to the two second sound guiding holes 857 via two acoustic routes 855. The acoustic driver 850 may propagate sound through the at least two second sound guiding holes 857. A sound guiding hole may be a small hole formed on the acoustic output apparatus with a specific opening and allowing sound to pass. The shape of a sound guiding hole may include but not limited to a circle shape, an oval shape, a square shape, a trapezoid shape, a rounded quadrangle shape, a triangle shape, an irregular shape, or the like, or any combination thereof. In addition, the number of the sound guiding holes connected to the acoustic driver 840 or 850 may not be limited to two, which may be an arbitrary value instead, for example, three, four, six, or the like.

In some embodiments, in order to reduce the far-field leakage of the acoustic output apparatus 800, the acoustic driver 840 may be used to output low-frequency sounds with the same (or approximately the same) amplitude and opposite (or approximately opposite) phases via the at least two first sound guiding holes. The acoustic driver 850 may be used to output high-frequency sounds with the same (or approximately the same) amplitude and opposite (or approximately opposite) phases via the at least two second sound guiding holes. In this way, the far-field leakage of low-frequency sounds (or high-frequency sounds) may be reduced according to the principle of acoustic interference cancellation.

According to FIGS. 6 7A and 7B, considering that the wavelength of a low-frequency sound is longer than that of a high-frequency sound, and in order to reduce the interference cancellation of the sound in the near field (for example, near the user's ear), the distance between the first sound guiding holes and the distance between the second sound guiding holes may have different values. For example, assuming that there is a first distance between the two first sound guiding holes and a second distance between the two second sound guiding holes, the first distance may be longer than the second distance. In some embodiments, the first distance and the second distance may be arbitrary values. Merely by way of example, the first distance may not be longer than 40 mm, for example, in the range of 20 mm-40 mm. The second distance may not be longer than 12 mm, and the first distance may be longer than the second distance. In some embodiments, the first distance may not be shorter than 12 mm. The second distance may be shorter than 7 mm, for example, in the range of 3 mm-7 mm. In some embodiments, the first distance may be 30 mm, and the second distance may be 5 mm. As another example, the first distance may be at least twice longer than the second distance. In some embodiments, the first distance may be at least three times longer than the second distance. In some embodiments, the first distance may be at least 5 times longer than the second distance.

As shown in FIG. 8, the acoustic driver 840 may include a transducer 843. The transducer 843 may transmit a sound to the first sound guiding hole(s) 847 through the acoustic route 845. The acoustic driver 850 may include a transducer 853. The transducer 853 may transmit a sound to the second sound guiding hole(s) 857 through the acoustic route 855.

In some embodiments, the acoustic drivers (such as the low-frequency acoustic driver 840, the high-frequency acoustic driver 850) may include transducers with different properties or different counts of transducers. For example, each of the low-frequency acoustic driver 840 and the high-frequency acoustic driver 850 may include a transducer, and the transducers of the frequency acoustic driver 840 and the high-frequency acoustic driver 850 may have different frequency response characteristics (such as a low-frequency speaker unit and a high-frequency speaker unit). As another example, the low-frequency acoustic driver 840 may include two transducers 843 (such as two low-frequency speaker units), and the high-frequency acoustic driver 850 may include two transducers 853 (such as two high-frequency speaker units).

In some embodiments, the acoustic output apparatus 800 may generate sounds with different frequency ranges by other means, for example, a transducer frequency division, an acoustic route frequency division, or the like. When the acoustic output apparatus 800 uses a transducer or an acoustic route to divide a sound, the electronic frequency division module 810 (e.g., the part inside the dotted frame in FIG. 8) may be omitted. The source signal may be input to the acoustic driver 840 and the acoustic driver 850, respectively.

In some embodiments, the acoustic output apparatus 800 may use a plurality of transducers to achieve signal frequency division. For example, the acoustic driver 840 and the acoustic driver 850 may convert the inputted source signal into a low-frequency signal and a high-frequency signal, respectively. Specifically, through the transducer 843 (such as a low-frequency speaker), the low-frequency acoustic driver 840 may convert the source signal into the low-frequency sound having a low-frequency component. The low-frequency sound may be transmitted to at least two first sound guiding holes 847 along at least two different acoustic routes 845. Then the low-frequency sound may be propagated outwards through the first sound guiding holes 847. Through the transducer 853 (such as a high-frequency speaker), the high-frequency acoustic driver 850 may convert the source signal into the high-frequency sound having a high-frequency component. The high-frequency sound may be transmitted to at least two second sound guiding holes 857 along at least two different acoustic routes 855. Then the high-frequency sound may be propagated outwards through the second sound guiding holes 857.

In some alternative embodiments, an acoustic route (e.g., the acoustic routes 845 and the acoustic routes 855) connecting a transducer and a sound guiding hole may affect the nature of the transmitted sound. For example, an acoustic route may attenuate or change the phase of the transmitted sound to some extent. In some embodiments, the acoustic route may include a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. For example, the acoustic impedance may be in the range of 5MKS Rayleigh to 500MKS Rayleigh. By setting acoustic routes of different acoustic impedances, the sounds output of different transducers may be acoustically filtered. In this case, the sounds output through different acoustic routes have different frequency components.

In some embodiments, the acoustic output apparatus 800 may utilize a plurality of acoustic routes to achieve signal frequency division. Specifically, the source signal may be inputted into a specific acoustic driver and converted into a sound including high and low-frequency components. The sound may be propagated along an acoustic route having a specific frequency selection characteristic. For example, the sound may be propagated along an acoustic route with a low-pass characteristic to a corresponding sound guiding hole to output a low-frequency sound. In this process, the high-frequency component of the sound may be absorbed or attenuated by the acoustic route with a low-pass characteristic. Similarly, the sound signal may be propagated along an acoustic route with a high-pass characteristic to the corresponding sound guiding hole to output a high-frequency sound. In this process, the low-frequency component of the sound may be absorbed or attenuated by the acoustic route with the high-pass characteristic.

In some embodiments, the controller in the acoustic output apparatus 800 may cause the low-frequency acoustic driver 840 to output a sound in the first frequency range (i.e., a low-frequency sound), and cause the high-frequency acoustic driver 850 to output a sound in the second frequency range (i.e., a high-frequency sound). In some embodiments, the acoustic output apparatus 800 may also include a supporting structure. The supporting structure may be used to carry an acoustic driver (such as the high-frequency acoustic driver 850, the low-frequency acoustic driver 840), so that the acoustic driver may be positioned away from the user's ear. In some embodiments, the sound guiding hole(s) acoustically coupled with the high-frequency acoustic driver 850 may be located closer to an expected position of the user's ears (for example, the ear canal entrance), while the sound guiding hole(s) acoustically coupled with the low-frequency acoustic driver 840 may be located further away from the expected position. In some embodiments, the supporting structure may be used to package the acoustic driver. For example, the supporting structure may include a casing made of various materials such as plastic, metal, and tape. The casing may encapsulate the acoustic driver and form a front chamber and a rear chamber corresponding to the acoustic driver. The front chamber may be acoustically coupled to one of the at least two sound guiding holes corresponding to the acoustic driver. The rear chamber may be acoustically coupled to the other of the at least two sound guiding holes corresponding to the acoustic driver. For example, the front chamber of the low-frequency acoustic driver 840 may be acoustically coupled to one of the at least two first sound guiding holes 847. The rear chamber of the low-frequency acoustic driver 840 may be acoustically coupled to the other of the at least two first sound guiding holes 847. The front chamber of the high-frequency acoustic driver 850 may be acoustically coupled to one of the at least two second sound guiding holes 857. The rear chamber of the high-frequency acoustic driver 850 may be acoustically coupled to the other of the at least two second sound guiding holes 857. In some embodiments, a sound guiding hole (such as the first sound guiding hole(s) 847 and the second sound guiding hole(s) 857) may be disposed on the casing.

In some embodiments, the acoustic output apparatus 800 may include any number of the acoustic drivers. For example, the acoustic output apparatus 800 may include two groups of the high-frequency acoustic drivers 850 and two groups of the low-frequency acoustic drivers 840, or one group of the high-frequency acoustic drives 850 and two groups of the low-frequency acoustic drivers 840, and these high-frequency/low-frequency drivers may be used to generate a sound in a specific frequency range, respectively. As another example, the acoustic driver 840 and/or the acoustic driver 850 may include an additional signal processor. The signal processor may have the same structural component as or different structural component from the signal processor 820 or 830.

It should be noted that the acoustic output apparatus and its modules shown in FIG. 8 may be implemented in various ways. For example, in some embodiments, the system and the modules may be implemented by hardware, software, or a combination of both. The hardware may be implemented by a dedicated logic. The software may be stored in a storage which may be executed by a suitable instruction execution system, for example, a microprocessor or a dedicated design hardware. It will be appreciated by those skilled in the art that the above methods and systems may be implemented by computer-executable instructions and/or embedded in control codes of a processor. For example, the control codes may be provided by a medium such as a disk, a CD or a DVD-ROM, a programmable memory device, such as read-only memory (e.g., firmware), or a data carrier such as an optical or electric signal carrier.

It may be understood that, for those skilled in the art, after understanding the principle of the apparatus, it is possible to combine each unit or form a substructure to connect with other units arbitrarily without departing from this principle. For example, the electronic frequency division module 810 may be omitted, and the frequency division of the source signal may be implemented by the internal structure of the low-frequency acoustic driver 840 and/or the high-frequency acoustic driver 850. As another example, the signal processor 820 or 830 may be a part independent of the electronic frequency division module 810. Those modifications may fall within the scope of the present disclosure.

Figure 9A:
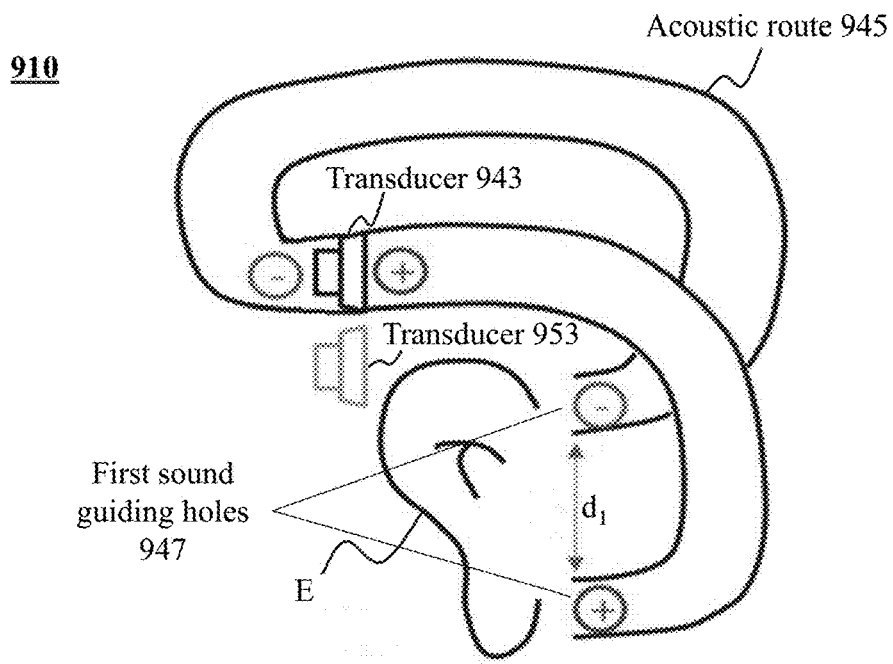
FIGS. 9A-9B are schematic diagrams illustrating exemplary application scenarios of an acoustic driver according to some embodiments of the present disclosure.
Figure 9B:
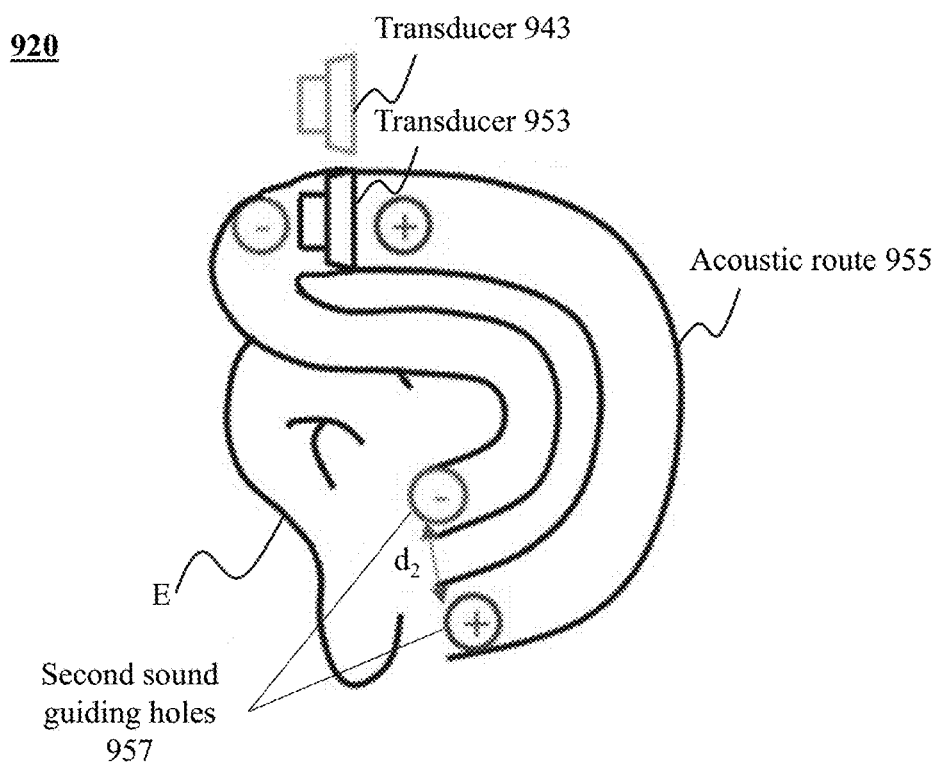

FIGS. 9A and 9B are schematic diagrams illustrating exemplary acoustic output apparatuses according to some embodiments of the present disclosure. For the purpose of illustration, sounds outputted by different sound guiding holes coupled with a same transducer may be described as an example. In FIGS. 9A and 9B, each transducer may have a front side and a rear side, and a front chamber and a rear chamber may exist on the front and rear side of the transducer, respectively. In some embodiments, these structures may have the same or approximately the same equivalent acoustic impedance, such that the transducer may be loaded symmetrically. The symmetrical load of the transducer may form sound sources satisfying an amplitude and phase relationship at different sound guiding holes (such as the "two point sources" having a same amplitude and opposite phases as described above), such that a specific sound field may be formed in the high-frequency range and/or the low-frequency range (for example, the near-field sound may be enhanced and the far-field leakage may be suppressed).

As shown in FIGS. 9A and 9B, an acoustic driver (for example, the acoustic driver 910 or 920) may include transducers, and acoustic routes and sound guiding holes connected to the transducers. In order to describe an actual application scenario of the acoustic output apparatus more clearly, a position of a user's ear E is shown in FIGS. 9A and 9B for explanation. FIG. 9A illustrates an application scenario of the acoustic driver 910. The acoustic driver 910 may include a transducer 943 (or referred to as a low-frequency acoustic driver), and the transducer 943 may be coupled with two first sound guiding holes 947 through an acoustic route 945. FIG. 9B illustrates an application scenario of the acoustic driver 920. The acoustic driver 920 may include a transducer 953 (or referred to as a high-frequency acoustic driver), and the transducer 953 may be coupled with two second sound guiding holes 957 through an acoustic route 955.

The transducer 943 or 953 may vibrate under the driving of an electric signal, and the vibration may generate sounds with equal amplitudes and opposite phases (180 degrees inversion). In some embodiments, the transducer 943 or 953 may include a vibration diaphragm, which may vibrate when driven by an electrical signal, and the front and rear sides of the vibration diaphragm may simultaneously output a normal-phase sound and a reverse-phase sound. In FIGS. 9A and 9B, "+" and "−" may be used to represent sounds with different phases, wherein "+" may represent a normal-phase sound, and "−" may represent a reverse-phase sound.

In some embodiments, a transducer may be encapsulated by a casing of a supporting structure, and the interior of the casing may be provided with sound channels connected to the front and rear sides of the transducer, respectively, thereby forming an acoustic route. For example, a front cavity of the transducer 943 may be coupled to one of the two first sound guiding holes 947 through a first acoustic route (i.e., a half of the acoustic route 945), and a rear cavity of the transducer 943 may acoustically be coupled to the other sound guiding hole of the two first sound guiding holes 947 through a second acoustic route (i.e., the other half of the acoustic route 945). A normal-phase sound and a reverse-phase sound output from the transducer 943 may be output from the two first sound guiding holes 947, respectively. As another example, a front cavity of the transducer 953 may be coupled to one of the two sound guiding holes 957 through a third acoustic route (i.e., half of the acoustic route 955), and a rear cavity of the transducer 953 may be coupled to another sound guiding hole of the two second sound guiding holes 957 through a fourth acoustic route (i.e., the other half of the acoustic route 955). A normal-phase sound and a reverse-phase sound output from the transducer 953 may be output from the two second sound guiding holes 957, respectively.

In some embodiments, an acoustic route may affect the nature of the transmitted sound. For example, an acoustic route may attenuate or change the phase of the transmitted sound to some extent. In some embodiments, the acoustic route may include one or more of a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. In some embodiments, in order to prevent the sound transmitted by the acoustic driver's front chamber and rear chamber from being differently disturbed, the front chamber and rear chamber corresponding to the acoustic driver may have the approximately same equivalent acoustic impedance. Additionally, sound guiding holes with the same acoustic resistance material, the same size and/or shape, etc., may be used.

The distance between the two first sound guiding holes 947 of the low-frequency acoustic driver may be expressed as d1 (i.e., the first distance). The distance between the two second sound guiding holes 957 of the high-frequency acoustic driver may be expressed as d2 (i.e., the second distance). By setting the distances d1 and d2, a higher sound volume output in the low-frequency band and a stronger ability to reduce the sound leakage in the high-frequency band may be achieved. For example, the distance between the two first sound guiding holes 947 is greater than the distance between the two second sound guiding holes 957 (i.e., d1>d2).

In some embodiments, the transducer 943 and the transducer 953 may be housed together in a housing of an acoustic output apparatus, and be placed in isolation in a structure of the housing.

In some embodiments, the acoustic output apparatus may include multiple sets of high-frequency acoustic drivers and low-frequency acoustic drivers. For example, the acoustic output apparatus may include a set of high-frequency acoustic drivers and a set of low-frequency acoustic drivers for simultaneously outputting sound to the left and/or right ears. As another example, the acoustic output apparatus may include two sets of high-frequency acoustic drivers and two sets of low-frequency acoustic drivers, wherein one set of high-frequency acoustic drivers and one set of low-frequency acoustic drivers may be used to output sound to a user's left ear, and the other set of high-frequency acoustic drivers and the other set of low-frequency acoustic drivers may be used to output sound to a user's right ear.

In some embodiments, the high-frequency acoustic driver and the low-frequency acoustic driver may have different powers. In some embodiments, the low-frequency acoustic driver may have a first power, the high-frequency acoustic driver may have a second power, and the first power may be greater than the second power. In some embodiments, the first power and the second power may be arbitrary values.

Figure 10A:
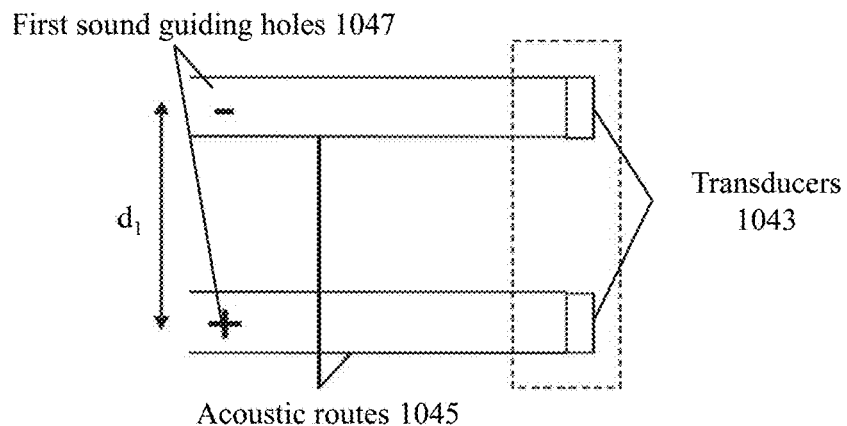
FIGS. 10A-10C are schematic diagrams illustrating exemplary sound output scenarios according to some embodiments of the present disclosure.
Figure 10B:
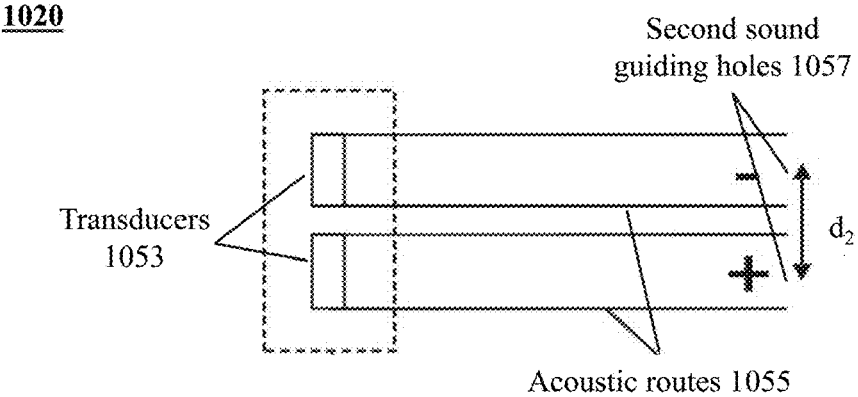
Figure 10C:
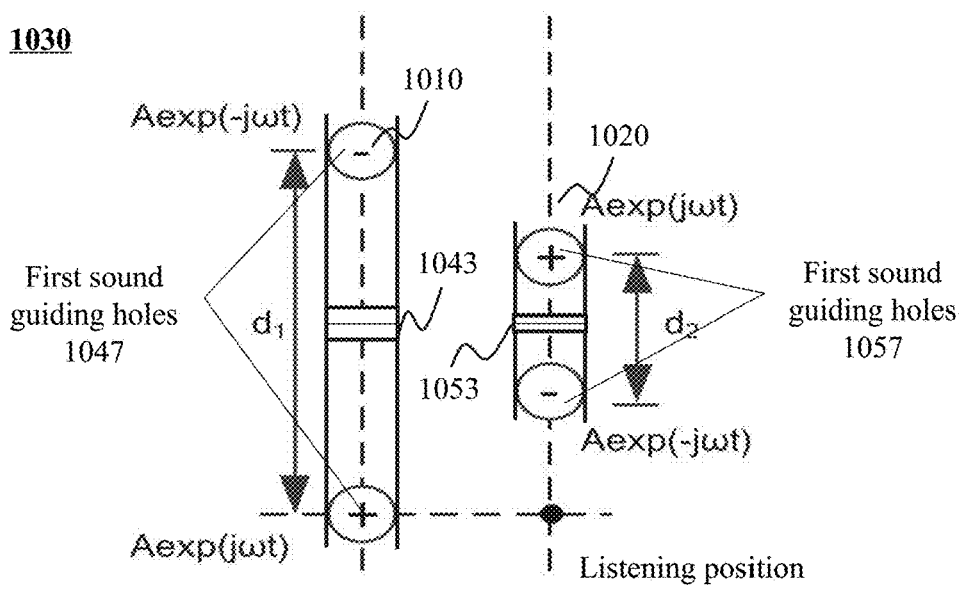

FIGS. 10A, 10B, and 10C are schematic diagrams illustrating sound output scenarios according to some embodiments of the present disclosure.

In some embodiments, the acoustic output apparatus may generate sounds in the same frequency range through two or more transducers, and the sounds may propagate outwards through different sound guiding holes. In some embodiments, different transducers may be controlled by the same controller or different controllers, respectively, and may produce sounds that satisfy a certain phase and amplitude condition (for example, sounds with the same amplitude but opposite phases, sounds with different amplitudes and opposite phases, etc.). For example, a controller may make the electrical signals input into two low-frequency transducers of an acoustic driver have the same amplitude and opposite phases. In this way, the two low-frequency transducers may output low-frequency sounds with the same amplitude but opposite phases.

Specifically, the two transducers in an acoustic driver (such as a low-frequency acoustic driver 1010 or a high-frequency acoustic driver 1020) may be arranged side by side in an acoustic output apparatus, one of which may be used to output a normal-phase sound, and the other may be used to output a reverse-phase sound. As shown in FIG. 10A, the acoustic driver 1010 may include two transducers 1043, two acoustic routes 1045, and two first sound guiding holes 1047. As shown in FIG. 10B, the acoustic driver 1050 may include two transducers 1053, two acoustic routes 1055, and two second sound guiding holes 1057. Driven by electrical signals with opposite phases, the two transducers 1043 may generate a set of low-frequency sounds with opposite phases (180 degrees inversion). One of the two transducers 1043 (such as the transducer located below) may output a normal-phase sound, and the other (such as the transducer located above) may output a reverse-phase sound. The two low-frequency sounds with opposite phases may be transmitted to the two first sound guiding holes 1047 along the two acoustic routes 1045, respectively, and propagate outwards through the two first sound guiding holes 1047. Similarly, driven by electrical signals with opposite phases, the two transducers 1053 may generate a set of high-frequency sounds with opposite phases (180 degrees inversion). One of the two transducers 1053 (such as the transducer located below) may output a normal-phase high-frequency sound, and the other (such as the transducer located above) may output a reverse-phase high-frequency sound. The high-frequency sounds with opposite phases may be transmitted to the two second sound guiding holes 1057 along the two acoustic routes 1055, respectively, and propagate outwards through the two second sound guiding holes 1057.

In some embodiments, the two transducers in an acoustic driver (for example, the low-frequency acoustic driver 1043 and the high-frequency acoustic driver 1053) may be arranged relatively close to each other along a straight line, and one of them may be used to output a normal-phase sound and the other may be used to output a reverse-phase sound.

As shown in FIG. 10C, the left side may be the acoustic driver 1010, and the right side may be the acoustic driver 1020. The two transducers 1043 of the acoustic driver 1010 may generate a set of low-frequency sounds of equal amplitude and opposite phases under the control of the controller, respectively. One of the transducers 1043 may output a normal-phase low-frequency sound, and transmit the normal-phase low-frequency sound along a first acoustic route to a first sound guiding hole 1047. The other transducer 1043 may output a reverse-phase low-frequency sound, and transmit the reverse-phase low-frequency sound along a second acoustic route to another first sound guiding hole 1047. The two transducers 1053 of the acoustic driver 1020 may generate high-frequency sounds of equal amplitude and opposite phases under the control of the controller, respectively. One of the transducers 1053 may output a normal-phase high-frequency sound, and transmit the normal-phase high-frequency sound along a third acoustic route to a second sound guiding hole 1057. The other transducer 1053 may output a reverse-phase high-frequency sound, and transmit the reverse-phase high-frequency sound along a fourth acoustic route to another second sound guiding hole 1057.

In some embodiments, the transducer 1043 and/or the transducer 1053 may be of various suitable types. For example, the transducer 1043 and the transducer 1053 may be dynamic coil speakers, which may have the characteristics of a high sensitivity in low-frequency, a deep low frequency depth, and a small distortion. As another example, the transducer 1043 and the transducer 1053 may be moving iron speakers, which may have the characteristics of a small size, a high sensitivity, and a large high-frequency range. As another example, the transducers 1043 and 1053 may be air-conducted speakers or bone-conducted speakers. As yet another example, the transducer 1043 and the transducer 1053 may be balanced armature speakers. In some embodiments, the transducer 1043 and the transducer 1053 may be of different types. For example, the transducer 1043 may be a moving iron speaker, and the transducer 1053 may be a moving coil speaker. As another example, the transducer 1043 may be a dynamic coil speaker, and the transducer 1053 may be a moving iron speaker.

In FIGS. 10A-10C, the distance between the two point sources of the acoustic driver 1010 may be d1, the distance between the two point sources of the acoustic driver 1020 may be d2, and d1 may be greater than d2. As shown in FIG. 10C, the listening position (that is, the position of the ear canal when the user wears an acoustic output apparatus) may be approximately located on a line of a set of two point sources. In some embodiments, the listening position may be located at any suitable position. For example, the listening position may be located on a circle centered on the center point of the two point sources. As another example, the listening position may be on the same side of the two lines of the two sets of point sources.

It may be understood that the simplified structure of the acoustic output apparatus shown in FIGS. 10A-10C may be merely by way of example, which may be not a limitation for the present disclosure. In some embodiments, the acoustic output apparatus may include a supporting structure, a controller, a signal processor, or the like, or any combination thereof.

Figure 11A:
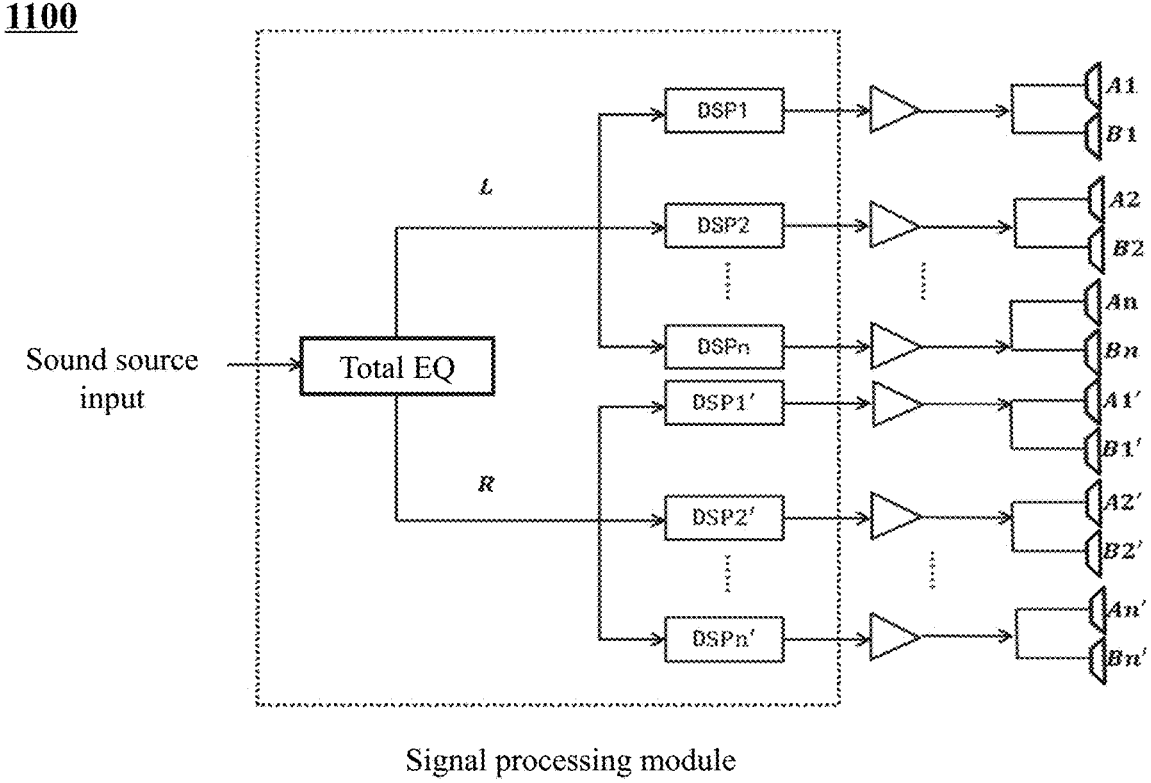
FIGS. 11A-11B are schematic diagrams illustrating acoustic output apparatuses according to some embodiments of the present disclosure.
Figure 11B:
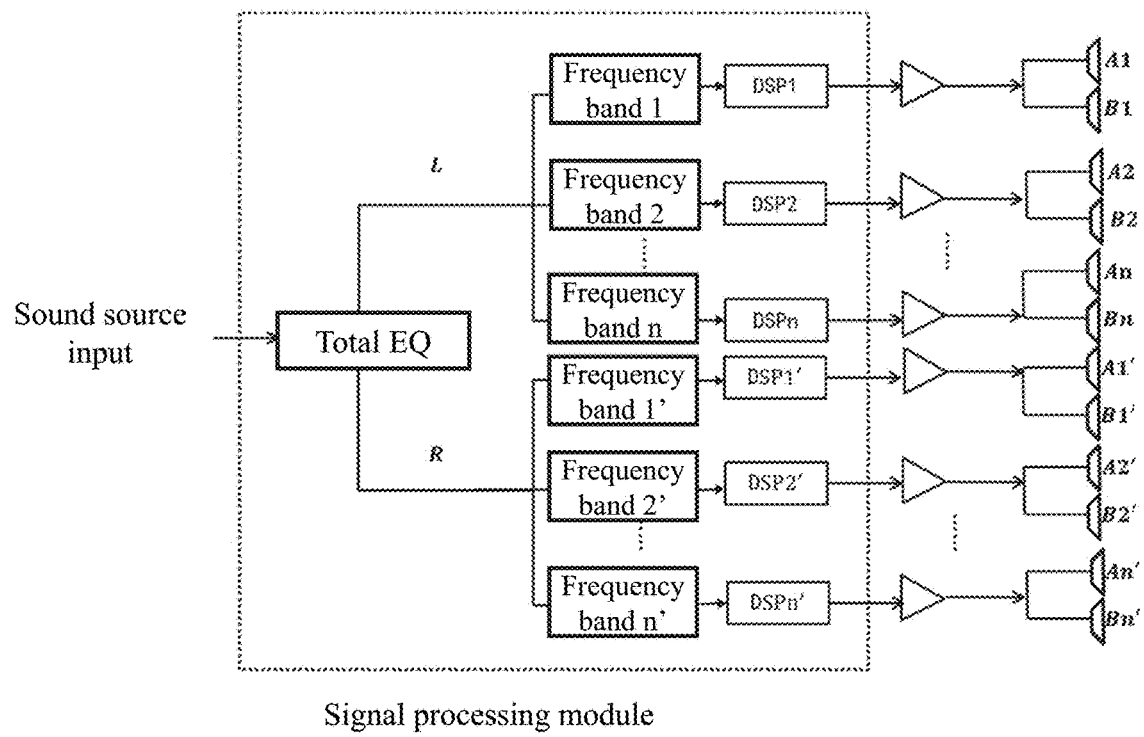

FIGS. 11A and 11B are schematic diagrams illustrating an acoustic output apparatus according to some embodiments of the present disclosure.

In some embodiments, acoustic drivers (e.g., acoustic drivers 1043 or 1053) may include multiple narrow-band speakers. As shown in FIG. 11A, the acoustic output apparatus may include a plurality of narrow-band speaker units and a signal processing module. On the left or right side of the user, the acoustic output apparatus may include n groups, narrow-band speaker units, respectively. Each group of narrow-band speaker units may have different frequency response curves, and the frequency response of each group may be complementary and collectively cover the audible sound frequency band. A narrow-band speaker unit used herein may be an acoustic driver with a narrower frequency response range than a low-frequency acoustic driver and/or a high-frequency acoustic driver. Taking the speaker units located on the left side of the user as shown in FIG. 11A as an example: A1~An and B1~Bn form n groups of two point sources. When a same electrical signal is input, each two point sources may generate sounds with different frequency ranges. By setting the distance do of each two point sources, the near-field and far-field sound of each frequency band may be adjusted. For example, in order to enhance the volume of near-field sound and reduce the volume of far-field leakage, the distance between a pair of two point sources corresponding to a high frequency may be less than the distance between a pair of two point sources corresponding to a low frequency.

In some embodiments, the signal processing module may include an Equalizer (EQ) processing module and a Digital Signal Processor (DSP) processing module. The signal processing module may be used to implement signal equalization and other digital signal processing algorithms (such as amplitude modulation and phase modulation). The processed signal may be connected to a corresponding acoustic driver (for example, a narrow-band speaker unit) to output a sound. Preferably, a narrow-band speaker unit may be a dynamic coil speaker or a moving iron speaker. In some embodiments, the narrow-band speaker unit may be a balanced armature speaker. Two point sources may be constructed using two balanced armature speakers, and the sound output from the two speakers may be in opposite phases.

In some embodiments, an acoustic driver (such as acoustic drivers 840, 850, 1040 or 1050) may include multiple sets of full-band speakers. As shown in FIG. 11B, the acoustic output apparatus may include a plurality of sets of full-band speaker units and a signal processing module. On the left or right side of the user, the acoustic output apparatus may include n groups full-band speaker units, respectively. Each full-band speaker unit may have the same or similar frequency response curve, and may cover a wide frequency range.

Taking the speaker units located on the left side of the user as shown in FIG. 11B as an example: A1~An and B1~Bn form n groups of two point sources. The difference between FIGS. 11A and 11B may be that the signal processing module in FIG. 11B may include at least one set of filters for performing frequency division on the sound source signal to generate electric signals corresponding to different frequency ranges, and the electric signals corresponding to different frequency ranges may be input into each group of full-band speaker units. In this way, each group of speaker units (similar to the two point sources) may produce sounds with different frequency ranges separately.

Figure 12A:
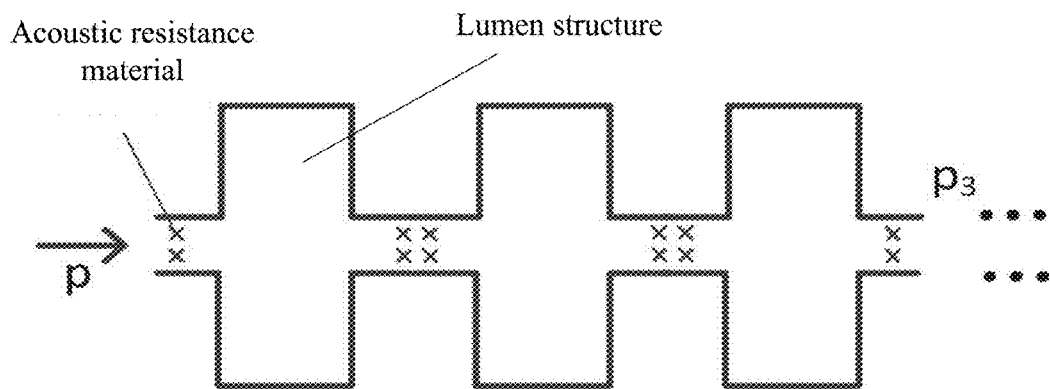
FIGS. 12A-12C are schematic diagrams illustrating acoustic routes according to some embodiments of the present disclosure.
Figure 12B:
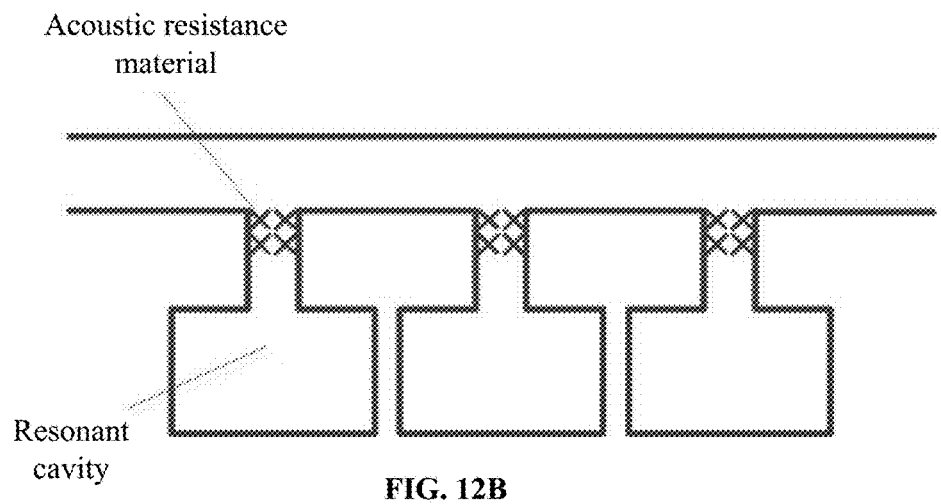
Figure 12C:
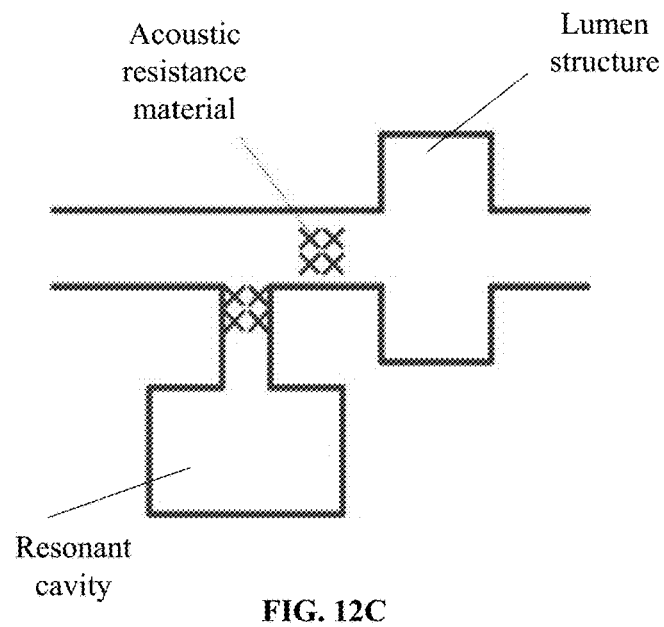

FIGS. 12A-12C are schematic diagrams illustrating an acoustic route according to some embodiments of the present disclosure.

As described above, an acoustic filtering structure may be constructed by setting structures such as a sound tube, a sound cavity, and a sound resistance in an acoustic route to achieve frequency division of sound. FIGS. 12A-12C show schematic structural diagrams of frequency division of a sound signal using an acoustic route. It should be noted that FIGS. 12A-12C may be examples of setting the acoustic route when using the acoustic route to perform frequency division on the sound signal, and may not be a limitation on the present disclosure.

As shown in FIG. 12A, an acoustic route may include one or more groups of lumen structures connected in series, and an acoustic resistance material may be provided in the lumen structures to adjust the acoustic impedance of the entire structure to achieve a filtering effect. In some embodiments, a band-pass filtering or a low-pass filtering may be performed on the sound by adjusting the size of the lumen structures and/or the acoustic resistance material to achieve frequency division of the sound. As shown in FIG. 12B, a structure with one or more sets of resonant cavities (for example, Helmholtz cavity) may be constructed on a branch of the acoustic route, and the filtering effect may be achieved by adjusting the size of each resonant cavity and the acoustic resistance material. As shown in FIG. 12C, a combination of a lumen structure and a resonant cavity (for example, a Helmholtz cavity) may be constructed in an acoustic route, and a filtering effect may be achieved by adjusting the size of the lumen structure and/or a resonant cavity, and/or the acoustic resistance material.

Figure 13:
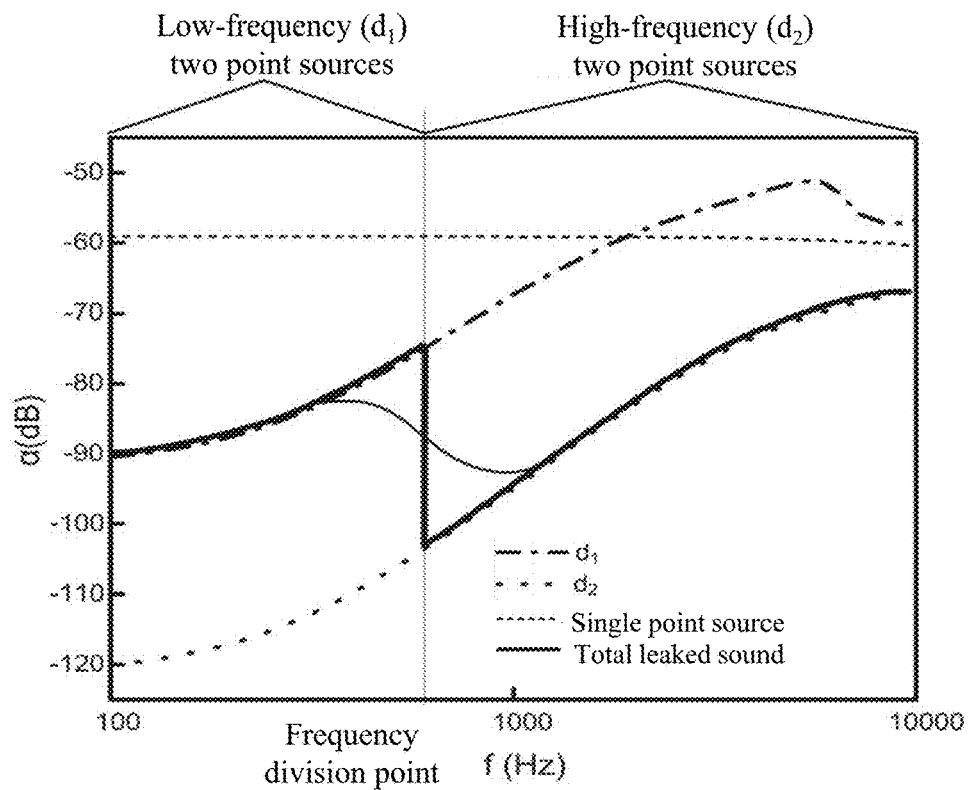
FIG. 13 is an exemplary graph illustrating a sound leakage under the action of two sets of two point sources according to some embodiments of the present disclosure.

FIG. 13 shows a curve of a sound leakage of an acoustic output apparatus (for example, the acoustic output apparatus 800) under the action of two sets of two point sources (a set of high-frequency two point sources and a set of low-frequency two point sources). The frequency division points of the two sets of two point sources may be around 700 Hz.

A normalization parameter a may be used to evaluate the volume of the leaked sound (descriptions of a may be found in Equation (4)). As shown in FIG. 13, compared with a single point source, the two sets of two point sources may have a stronger ability to reduce sound leakage. In addition, compared with the acoustic output apparatus provided with only one set of two point sources, the two sets of two point sources may output high-frequency sounds and low-frequency sounds, separately. The distance between the low-frequency two point sources may be greater than that of the high-frequency two point sources. In the low-frequency range, by setting a larger distance (d1) between the low frequency two point sources, the increase in the volume of the near-field sound may be greater than the increase in the volume of the far-field leakage, which may achieve a higher volume of the near-field sound output in the low-frequency band. At the same time, in the low-frequency range, because that the sound leakage of the low frequency two point sources is very small, increasing the distance d1 may slightly increase the sound leakage. In the high-frequency range, by setting a small distance (d2) between the high frequency two point sources, the problem that the cutoff frequency of high-frequency sound leakage reduction is too low and the audio band of the sound leakage reduction is too narrow may be overcame. Therefore, by setting the distance d1 and/or the distance d2, the acoustic output apparatus provided in the embodiments of the present disclosure may obtain a stronger sound leakage suppressing capability than an acoustic output apparatus having a single point source or a single set of two point sources.

In some embodiments, affected by factors such as the filter characteristic of a circuit, the frequency characteristic of a transducer, and the frequency characteristic of an acoustic route, the actual low-frequency and high-frequency sounds of the acoustic output apparatus may differ from those shown in FIG. 13. In addition, low-frequency and high-frequency sounds may have a certain overlap (aliasing) in the frequency band near the frequency division point, causing the total sound leakage reduction of the acoustic output apparatus not have a mutation at the frequency division point as shown in FIG. 13. Instead, there may be a gradient and/or a transition in the frequency band near the frequency division point, as shown by a thin solid line in FIG. 13. It may be understood that these differences may not affect the overall leakage reduction effect of the acoustic output apparatus provided by the embodiments of the present disclosure.

According to FIGS. 8 to 13 and the related descriptions, the acoustic output apparatus provided by the present disclosure may be used to output sounds in different frequency bands by setting high-frequency two point sources and low-frequency two point sources, thereby achieving a better acoustic output effect. In addition, by setting different sets of two point sources with different distances, the acoustic output apparatus may have a stronger capability to reduce the sound leakage in a high frequency band, and meet the requirements of an open acoustic output apparatus.

In some alternative embodiments, an acoustic output apparatus may include at least one acoustic driver, and the sound generated by the at least one acoustic driver may propagate outwards through at least two sound guiding holes coupled with the at least one acoustic driver. In some embodiments, the acoustic output apparatus may be provided with a baffle structure, so that the at least two sound guiding holes may be distributed on two sides of the baffle. In some embodiments, the at least two sound guiding holes may be distributed on both sides of the user's auricle. At this time, the auricle may serve as a baffle that separates the at least two sound guiding holes, so that the at least two sound guiding holes may have different acoustic routes to the user's ear canal. More descriptions of two point sources and a baffle may be found in International applications No. PCT/CN2019/130921 and No. PCT/CN2019/130942, both filed on Dec. 31, 2019, the entire contents of each of which are hereby incorporated by reference in the present disclosure.

Figure 14:
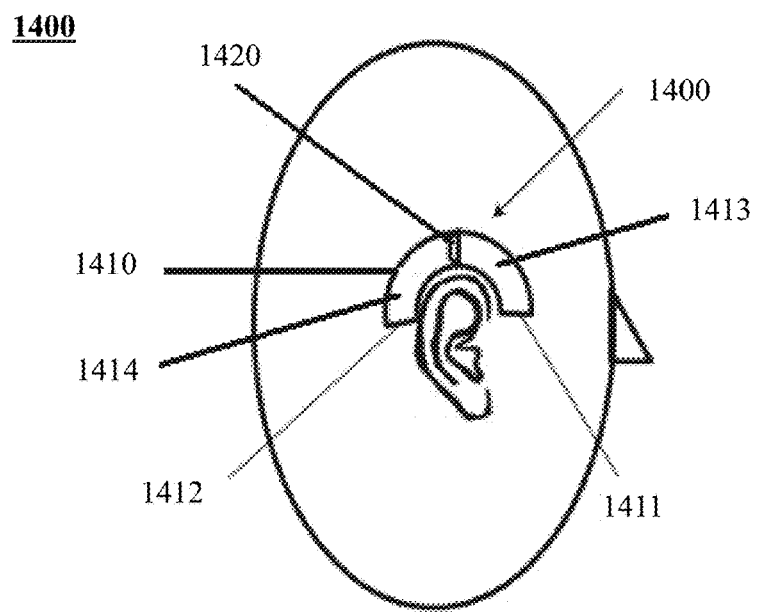
FIG. 14 is a schematic diagram illustrating another exemplary acoustic output apparatus according to some embodiments of the present disclosure.

FIG. 14 is a schematic diagram illustrating another exemplary acoustic output apparatus 1400 according to some embodiments of the present disclosure. As shown in FIG. 14, the acoustic output apparatus 1400 may include a supporting structure 1410 and an acoustic driver 1420 mounted within the supporting structure 1410. In some embodiments, the acoustic output apparatus 1400 may be worn on the user's body (for example, the human body's head, neck, or upper torso) through the supporting structure 1410. At the same time, the supporting structure 1410 and the acoustic driver 1420 may approach but not block the ear canal, so that the user's ear may remain open, thus the user may hear both the sound output from the acoustic output apparatus 1400 and the sound of the external environment. For example, the acoustic output apparatus 1400 may be arranged around or partially around the user's ear, and transmit sounds by means of air conduction or bone conduction.

The supporting structure 1410 may be used to be worn on the user's body and include one or more acoustic drivers 1420. In some embodiments, the supporting structure 1410 may have an enclosed shell structure with a hollow interior, and the one or more acoustic drivers 1420 may be located inside the supporting structure 1410. In some embodiments, the acoustic output apparatus 1400 may be combined with a product, such as glasses, a headset, a display apparatus, an AR/VR helmet, etc. In this case, the supporting structure 1410 may be fixed near the user's ear in a hanging or clamping manner. In some alternative embodiments, a hook may be provided on the supporting structure 1410, and the shape of the hook may match the shape of the user's auricle, so that the acoustic output apparatus 1400 may be independently worn on the user's ear through the hook. The acoustic output apparatus 1400 may communicate with a signal source (for example, a computer, a mobile phone, or other mobile devices) in a wired or wireless manner (for example, Bluetooth). For example, the acoustic output apparatus 1400 at the left and right ears may be directly in communication connection with the signal source in a wireless manner. As another example, the acoustic output apparatus 1400 at the left and right ears may include a first output apparatus and a second output apparatus. The first output apparatus may be in communication connection with the signal source, and the second output apparatus may be wirelessly connected with the first output apparatus in a wireless manner. The audio output of the first output apparatus and the second output apparatus may be synchronized through one or more synchronization signals.

In some embodiments, the supporting structure 1410 may have a shell structure with a shape suitable for human ears, for example, a circular ring, an oval, a polygonal (regular or irregular), a U-shape, a V-shape, a semi-circle, so that the supporting structure 1410 may be directly hooked at the user's ear. In some embodiments, the supporting structure 1410 may include one or more fixed structures. The fixed structure(s) may include an ear hook, a head strip, or an elastic band, so that the acoustic output apparatus 1400 may be better fixed on the user, preventing the acoustic output apparatus 1400 from falling down. Merely by way of example, the elastic band may be a headband to be worn around the head region. As another example, the elastic band may be a neckband to be worn around the neck/shoulder region. In some embodiments, the elastic band may be a continuous band and be elastically stretched to be worn on the user's head. In the meanwhile, the elastic band may also exert pressure on the user's head so that the acoustic output apparatus 1400 may be fixed to a specific position on the user's head. In some embodiments, the elastic band may be a discontinuous band. For example, the elastic band may include a rigid portion and a flexible portion. The rigid portion may be made of a rigid material (for example, plastic or metal), and the rigid portion may be fixed to the supporting structure 1410 of the acoustic output apparatus 1400 by a physical connection. The flexible portion may be made of an elastic material (for example, cloth, composite, or/and neoprene).

In some embodiments, when the user wears the acoustic output apparatus 1400, the supporting structure 1410 may be located above or below the auricle. The supporting structure 1410 may be provided with a sound guiding hole 1411 and a sound guiding hole 1412 for transmitting sound. In some embodiments, the sound guiding hole 1411 and the sound guiding hole 1412 may be located on both sides of the user's auricle, respectively, and the acoustic driver 1420 may output sounds through the sound guiding hole 1411 and the sound guiding hole 1412.

The acoustic driver 1420 may be a component that may receive an electrical signal, and convert the electrical signal into a sound signal for output. In some embodiments, in terms of frequency, the type of the acoustic driver 1420 may include a low-frequency acoustic driver, a high-frequency acoustic driver, or a full-frequency acoustic driver, or any combination thereof. In some embodiments, the acoustic driver 1420 may include a moving coil, a moving iron, a piezoelectric, an electrostatic, a magnetostrictive driver, or the like, or a combination thereof.

In some embodiments, the acoustic driver 1420 may include a vibration diaphragm. When the vibration diaphragm vibrates, sounds may be transmitted from the front and rear sides of the vibration diaphragm, respectively. In some embodiments, the front side of the vibration diaphragm in the supporting structure 1410 may be provided with a front chamber 1413 for transmitting sound. The front chamber 1413 may be acoustically coupled with the sound guiding hole 1411. The sound on the front side of the vibration diaphragm may be outputted from the sound guiding hole 1411 through the front chamber 1413. The rear side of the vibration diaphragm in the supporting structure 1410 may be provided with a rear chamber 1414 for transmitting sound. The rear chamber 1414 may be acoustically coupled with the sound guiding hole 1412. The sound on the rear side of the vibration diaphragm may be outputted from the sound guiding hole 1412 through the rear chamber 1414. It should be noted that, when the vibration diaphragm is vibrating, the front side and the rear side of the vibration diaphragm may simultaneously generate sounds with opposite phases. After passing through the front chamber 1413 and rear chamber 1414, respectively, the sounds may propagate outward from the sound guiding hole 1411 and the sound guiding hole 1412, respectively. In some embodiments, by adjusting the structure of the front chamber 1413 and the rear chamber 1414, the sounds output by the acoustic driver 1420 at the sound guiding hole 1411 and the sound guiding hole 1412 may meet specific conditions. For example, by designing the lengths of the front chamber 1413 and the rear chamber 1414, the sound guiding hole 1411 and the sound guiding hole 1412 may output sounds with a specific phase relationship (for example, opposite phases). Therefore, the problems including a small volume of the sound heard by the user in the near field of the acoustic output apparatus 1400 and a large sound leakage in the far field of the acoustic output apparatus 1400 may be effectively resolved.

In some alternative embodiments, the acoustic driver 1420 may also include a plurality of vibration diaphragms (e.g., two vibration diaphragms). Each of the plurality of vibration diaphragms may vibrate to generate a sound, which may pass through a cavity connected to the vibration diaphragm in the supporting structure, and output from corresponding sound guiding hole(s). The plurality of vibration diaphragms may be controlled by the same controller or different controllers and generate sounds that satisfy certain phase and amplitude conditions (for example, sounds of the same amplitude but opposite phases, sounds of different amplitudes and opposite phases, etc.).

As mentioned above, with a certain sound frequency, as the distance between two point sources increases, the volume of the sound heard by the user and the volume of the leaked sound corresponding to the two point sources may increase. For a clearer description, the relationship between volume of the sound heard by the user, the volume of sound leakage, and the point source distance d may be further explained in connection with FIGS. 15 through 17.

Figure 15:
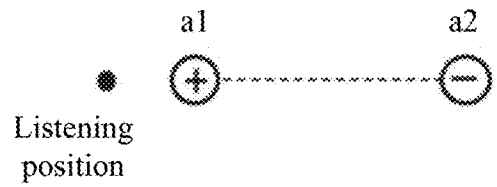
FIG. 15 is a schematic diagram illustrating two point sources and listening positions according to some embodiments of the present disclosure.

FIG. 15 is a schematic diagram illustrating two point sources and a listening position according to some embodiments of the present disclosure. As shown in FIG. 15, a point source a1 and a point source a2 may be on a same side of the listening position. The point source a1 may be closer to the listening position, and the point source a1 and the point source a2 may output sounds with the same amplitude but opposite phases.

Figure 16:
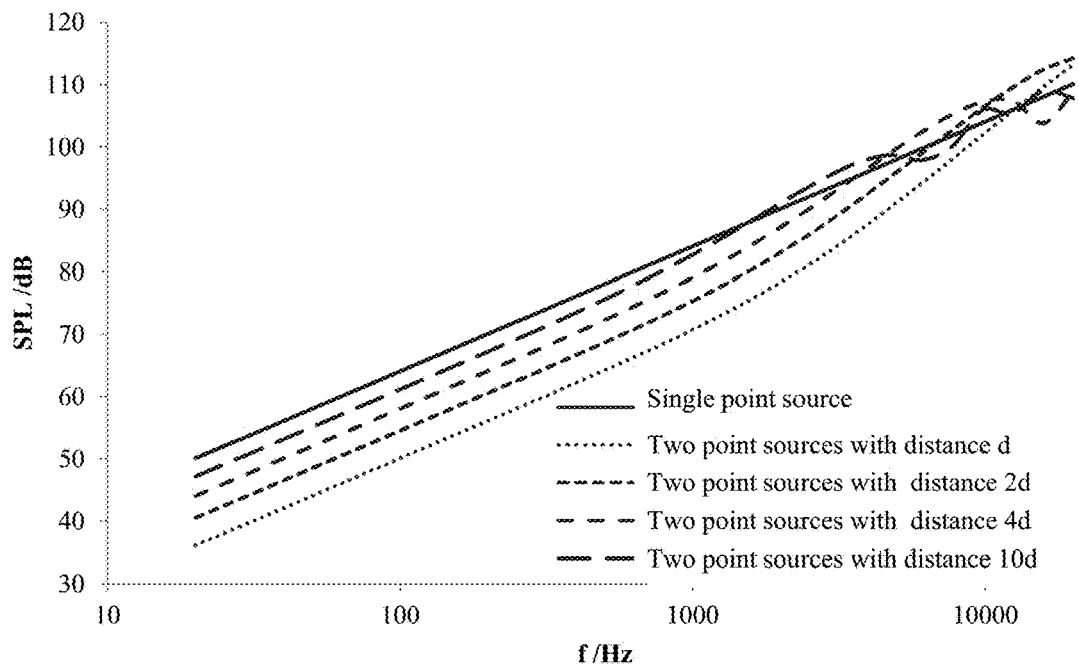
FIG. 16 is a graph illustrating a variation of a volume of a sound heard by a user of two point sources with different distances as a function of a frequency of sound according to some embodiments of the present disclosure.

FIG. 16 is a graph illustrating a variation of the volume of the sound heard by the user of two point sources with different distances as a function of a frequency of sound according to some embodiments of the present disclosure. The abscissa may represent the frequency (f) of the sound output by the two point sources (denoted as a1 and a2), and the unit may be hertz (Hz). The ordinate may represent the volume of the sound, and the unit may be decibel (dB). As shown in FIG. 16, as the distance between the point source a1 and the point source a2 gradually increases (for example, from d to 10d), the sound volume at the listening position may gradually increase. That is, as the distance between the point source a1 and the point source a2 increases, the difference in sound pressure amplitude (i.e., sound pressure difference) between the two sounds reaching the listening position may become larger, making the sound cancellation effect weaker, which may increase the sound volume at the listening position. However, due to the existence of sound cancellation, the sound volume at the listening position may still be less than the sound volume generated by a single point source at a same position in the low and middle frequency band (for example, a frequency of less than 1000 Hz). However, in the high-frequency band (for example, a frequency close to 10000 Hz), due to the decrease in the wavelength of the sound, mutual enhancement of the sound may appear, making the sound generated by the two point sources louder than that of the single point source. In some embodiments, a sound pressure may refer to the pressure generated by the sound through the vibration of the air.

Figure 17:
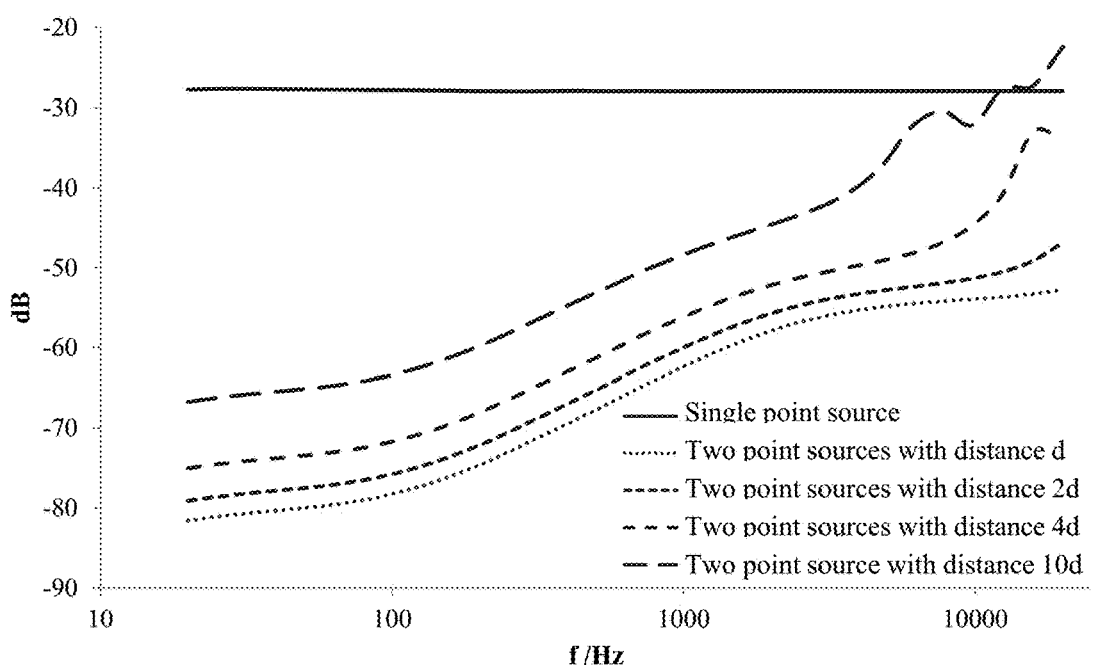
FIG. 17 is a graph illustrating a variation of a normalized parameter of two point sources in a far field along with a frequency of sound according to some embodiments of the present disclosure.

In some embodiments, by increasing the distance between the two point sources (for example, the point source a1 and the point source a2), the sound volume at the listening position may be increased. But as the distance increases, the sound cancellation of the two point sources may become weaker, which may lead to an increase of the far-field sound leakage. For illustration purposes, FIG. 17 is a graph illustrating a variation of a normalized parameter of different distances between two point sources in the far field along with a frequency of sound according to some embodiments of the present disclosure. The abscissa may represent the frequency (f) of the sound, the unit may be Hertz (Hz). The ordinate may use a normalization parameter a for evaluating the volume of the leaked sound, and the unit may be decibel (dB). As shown in FIG. 17, taking the normalization parameter a of a single point source as a reference, as the distance between the two point sources increases from d to 10d, the normalization parameter a may gradually increase, indicating that the sound leakage may gradually increase. More descriptions regarding the normalization parameter a may be found in equation (4) and related descriptions.

Figure 18:
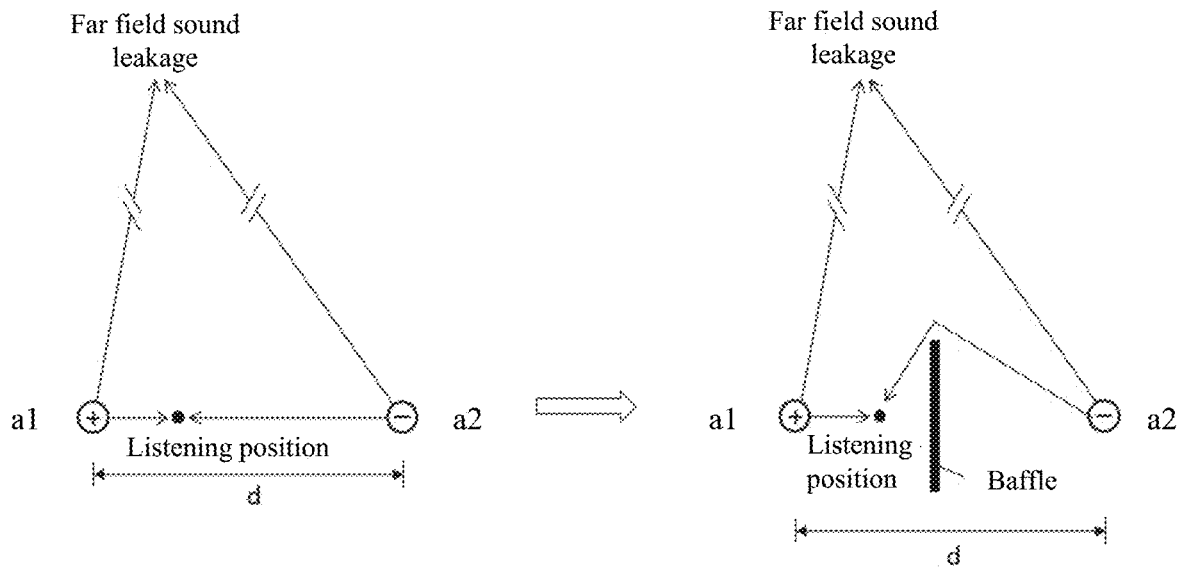
FIG. 18 is a distribution diagram illustrating an exemplary baffle provided between two point sources according to some embodiments of the present disclosure.

In some embodiments, adding a baffle structure to the acoustic output apparatus may be beneficial to improve the output effect of the acoustic output apparatus, that is, to increase the sound intensity at the near-field listening position, while reduce the volume of the far-field sound leakage. For illustration, FIG. 18 is a diagram illustrating an exemplary baffle provided between two point sources according to some embodiments of the present disclosure. As shown in FIG. 18, when a baffle is provided between the point source a1 and the point source a2, in the near field, the sound wave of the point source a2 may need to bypass the baffle to interfere with the sound wave of the point source a1 at the listening position, which may be equivalent to increasing the length of the acoustic route from the point source a2 to the listening position. Therefore, assuming that the point source a1 and the point source a2 have a same amplitude, compared to the case without a baffle, the difference in the amplitude of the sound waves of the point source a1 and the point source a2 at the listening position may increase, so that the degree of cancellation of the two sounds at the listening position may decrease, causing the sound volume at the listening position to increase. In the far field, because the sound waves generated by the point source a1 and the point source a2 do not need to bypass the baffle in a large space, the sound waves may interfere (similar to the case without a baffle). Compared to the case without a baffle, the sound leakage in the far field may not increase significantly. Therefore, a baffle structure being provided between the point source a1 and the point source a2 may increase the sound volume at the near-field listening position significantly while the volume of the far-field leakage does not increase significantly.

Figure 19:
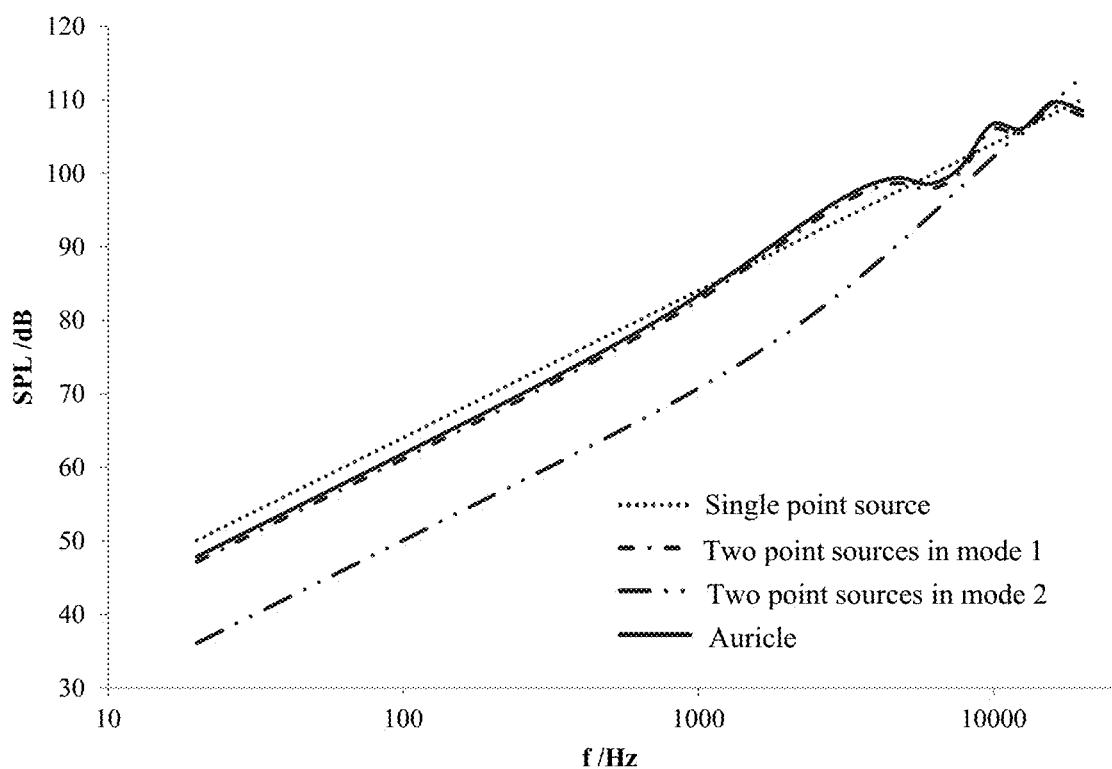
FIG. 19 is a graph illustrating a variation of a volume of sound heard by a user as a function of a frequency of sound when an auricle is located between two point sources according to some embodiments of the present disclosure.
Figure 20:
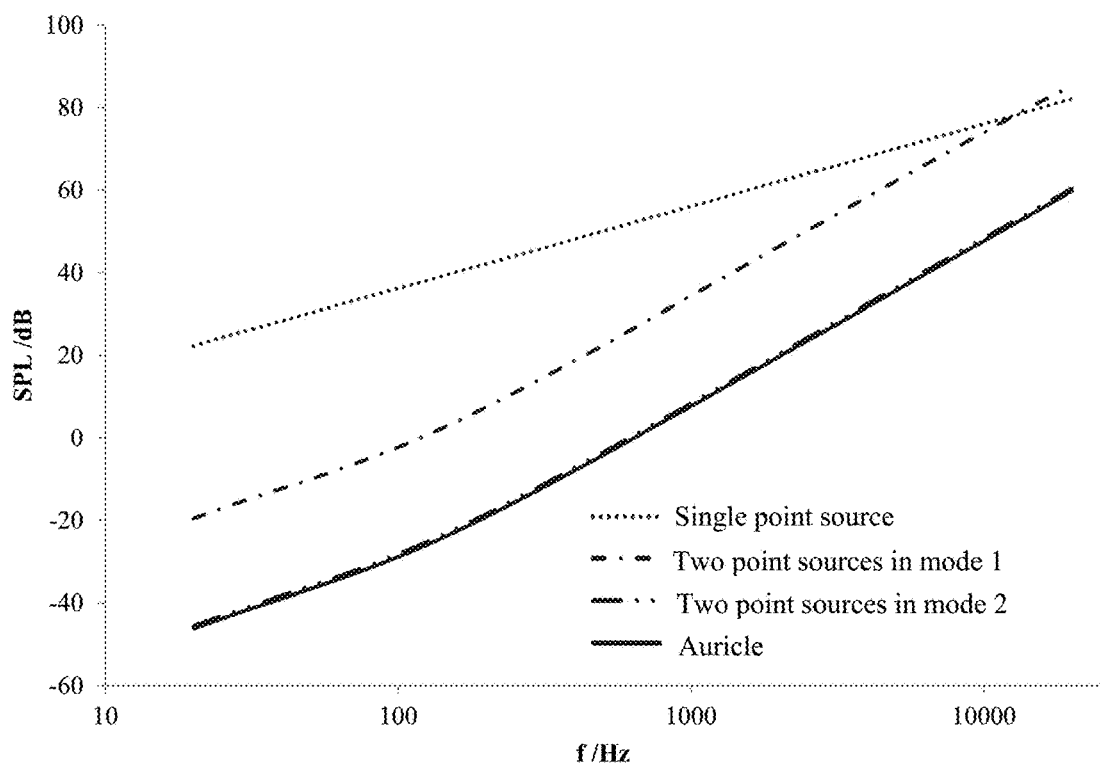
FIG. 20 is a graph illustrating a variation of a volume of a leaked sound as a function of frequency when an auricle is located between two point sources according to some embodiments of the present disclosure.
Figure 21:
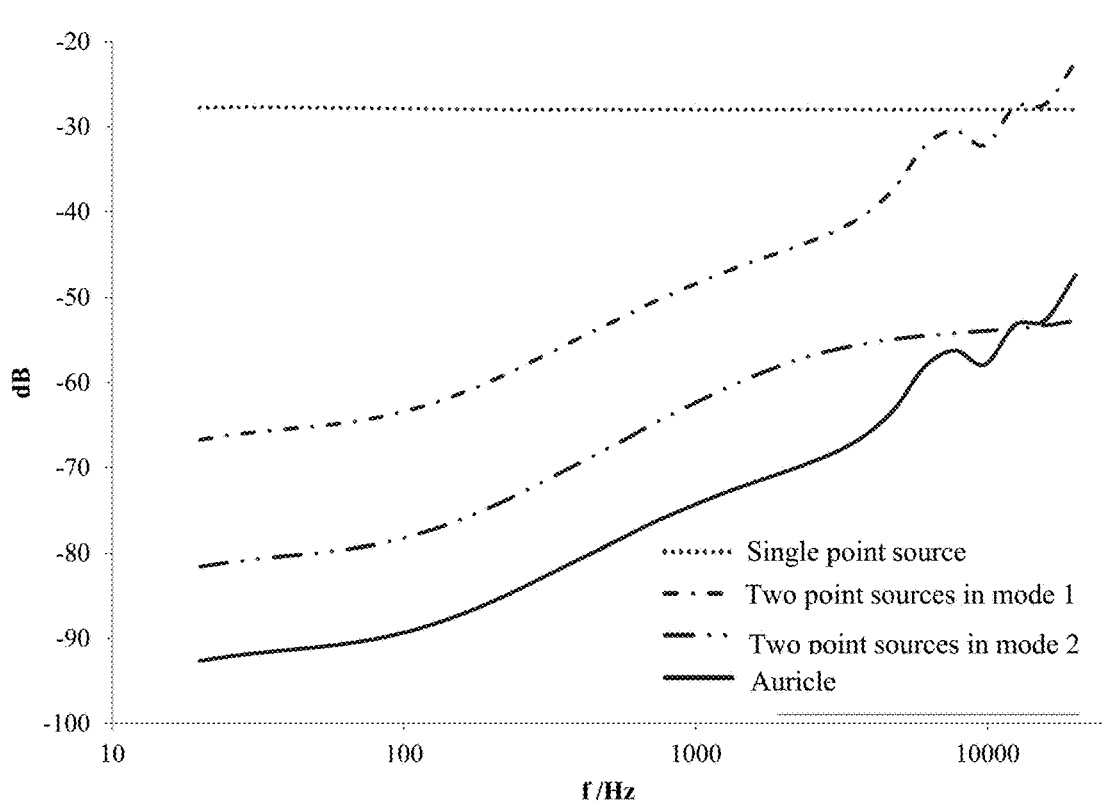
FIG. 21 is a graph illustrating a variation of a normalized parameter as a function of frequency when two point sources of an acoustic output apparatus are distributed on both sides of an auricle according to some embodiments of the present disclosure.

In the present disclosure, when the two point sources are located on both sides of the auricle, the auricle may serve as a baffle, so the auricle may also be referred to as a baffle for convenience. As an example, due to the existence of the auricle, the result may be equivalent to that the near-field sound may be generated by two point sources with a distance of D1 (also known as mode 1). The far-field sound may be generated by two point sources with a distance of D2 (also known as mode 2), and D1>D2. FIG. 19 is a graph illustrating a variation of the volume of a sound heard by a user as a function of the frequency of sound when the auricle is located between two point sources according to some embodiments of the present disclosure. As shown in FIG. 19, when the frequency is low (for example, when the frequency is less than 1000 Hz), the volume at the near-field sound (that is, the sound heard by the user by the user's ear) may basically be the same as that of the near-field sound in mode 1, be greater than the volume of the near-field sound in mode 2, and be close to the volume of the near-field sound of a single point source. As the frequency increases (for example, when the frequency is between 2000 Hz and 7000 Hz), the volume of the near-field sound in mode 1 and the two point sources being distributed on both sides of the auricle may be greater than that of the one point source. It shows that when the user's auricle is located between the two point sources, the volume of the near-field sound transmitted from the sound source to the user's ear may be effectively enhanced. FIG. 20 is a graph illustrating a variation of the volume of a leaked sound as a function of the frequency of sound when the auricle is located between two point sources according to some embodiments of the present disclosure. As shown in FIG. 20, as the frequency increases, the volume of the far-field leakage may increase. When the two point sources are distributed on both sides of the auricle, the volume of the far-field leakage generated by the two point sources may be basically the same as the volume of the far-field leakage in mode 2, and both of which may be less than the volume of the far-field leakage in mode 1 and the volume of the far-field leakage of a single point source. It shows that when the user's auricle is located between the two point sources, the sound transmitted from the sound source to the far field may be effectively reduced, that is, the sound leakage from the sound source to the surrounding environment may be effectively reduced. FIG. 21 is a graph illustrating a variation of a normalized parameter as a function of the frequency of sound when two point sources of an acoustic output apparatus is distributed on both sides of the auricle according to some embodiments of the present disclosure. As shown in FIG. 21, when the frequency is less than 10000 Hz, the normalized parameter of the two point sources being distributed on both sides of the auricle may be less than the normalized parameter in the case of mode 1 (no baffle structure between the two point sources, and the distance is D1), mode 2 (no baffle structure between the two point sources, and the distance is D2), and the single point source, which may show that when the two point sources are located on both sides of the auricle, the acoustic output apparatus may have a better capability to reduce the sound leakage.

In order to further explain the effect of the acoustic output apparatus with or without a baffle between the two point sources or two sound guiding holes, the volume of the near-field sound at the listening position and/or volume of the far-field leakage under different conditions may specifically be described below.

Figure 22:
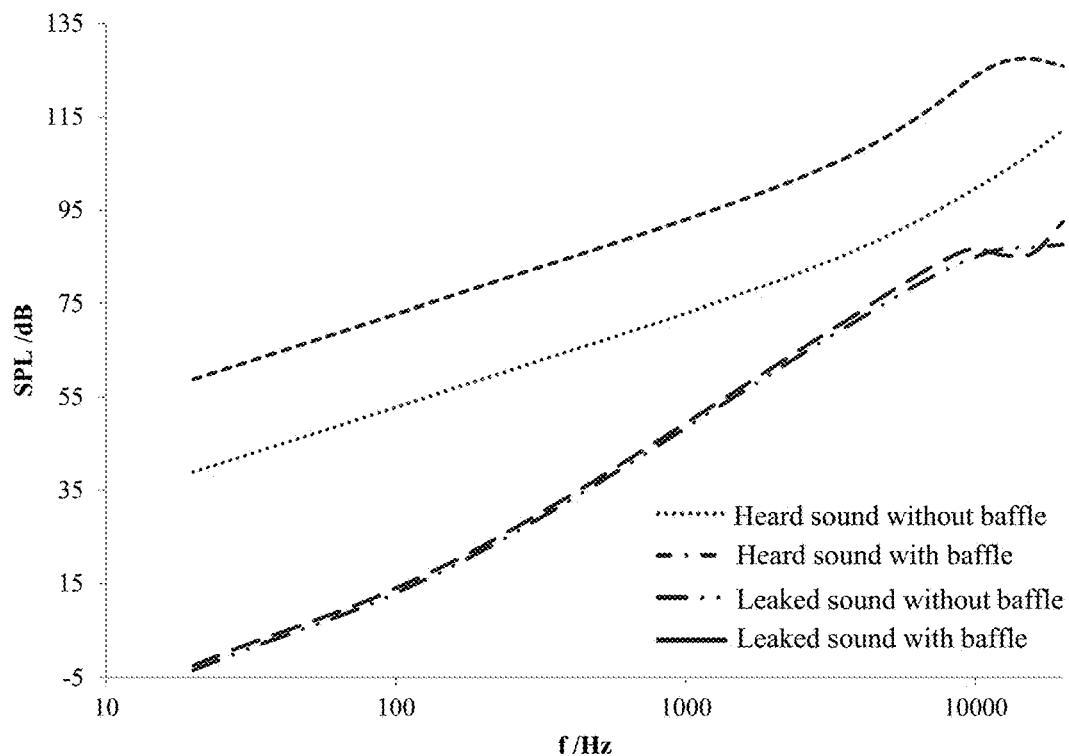
FIG. 22 is a graph illustrating a variation of a volume of sound heard by a user and a volume of a leaked sound as a function of frequency with and without a baffle between two point sources according to some embodiments of the present disclosure.

FIG. 22 is a graph illustrating a variation of the volume of a sound heard by the user and volume of a leaked sound as a function of the frequency of sound with and without a baffle between two point sources according to some embodiments of the present disclosure. As shown in FIG. 22, after adding a baffle between the two point sources (i.e., two sound guiding holes) of the acoustic output apparatus, in the near field, it may be equivalent to increasing the distance between the two point sources, and the sound volume at the near-field listening position may be equivalent to being generated by a set of two point sources with a large distance. The volume of the near-field sound may be significantly increased compared to the case without a baffle. In the far field, because the interference of the sound waves generated by the two point sources may be rarely affected by the baffle, the sound leakage may be equivalent to being generated by two point sources with a small distance, therefore the sound leakage may not change significantly with or without the baffle. It may be seen that by setting a baffle between two sound guiding holes (i.e., two point sources), the ability of the sound output apparatus to reduce the sound leakage may be effectively improved, and the volume of the near-field sound of the acoustic output apparatus may be increased significantly. Therefore, the requirements for sound production components of the acoustic output apparatus may be reduced. At the same time, the simple circuit structure may reduce the electrical loss of the acoustic output apparatus, so that the working time of the acoustic output apparatus may be greatly prolonged under a certain amount of electricity.

Figure 23:
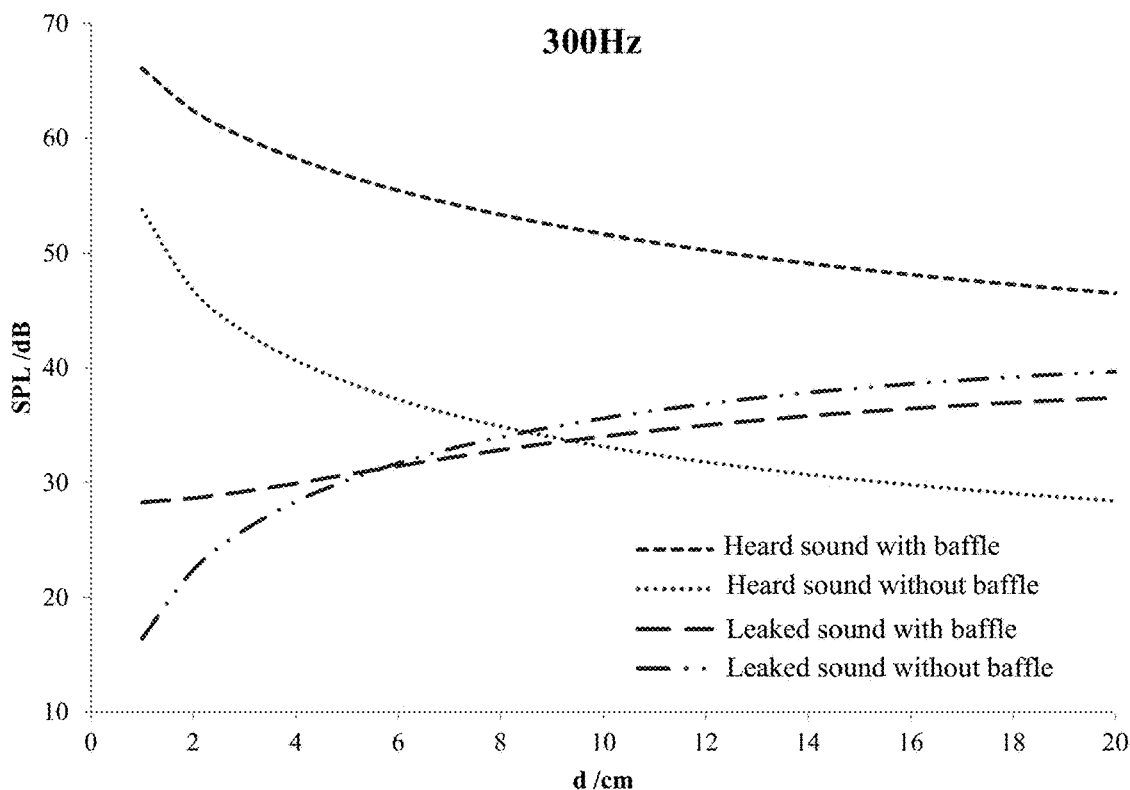
FIG. 23 is a graph illustrating a variation of a volume of sound heard by a user and a volume of a leaked sound as a function of the distance between two point sources at a frequency of 300 Hz and with or without a baffle according to some embodiments of the present disclosure.
Figure 24:
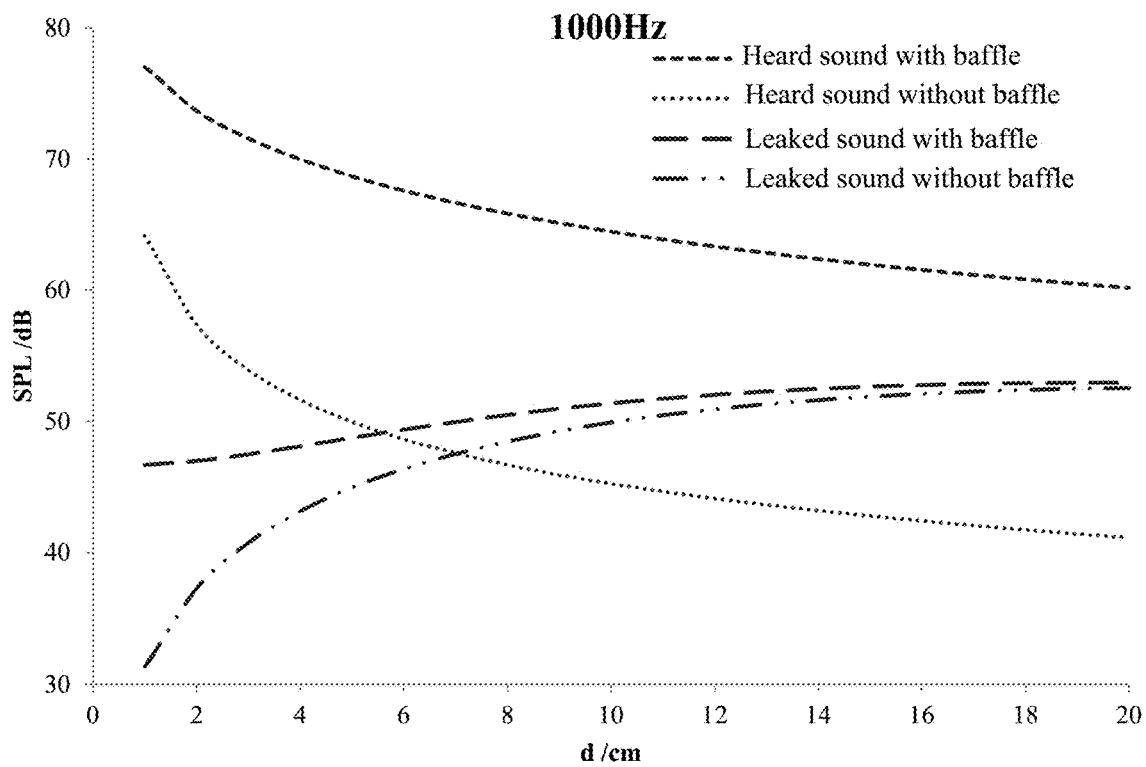
FIG. 24 is a graph illustrating a variation of a volume of sound heard by a user and a volume of a leaked sound as a function of the distance between two point sources at a frequency of 1000 Hz and with or without a baffle according to some embodiments of the present disclosure.

FIG. 23 is a graph illustrating a variation of the volume of a sound heard by the user and the volume of a leaked sound as a function of the distance between two point sources when the frequency of the two point sources is 300 Hz according to some embodiments of the present disclosure. FIG. 24 is a graph illustrating a variation of the volume of a sound heard by the user and the volume of a leaked sound as a function of the distance between two point sources when the frequency of the two point sources is 1000 Hz according to some embodiments of the present disclosure. As shown in FIGS. 23 and 24, in the near field, when the frequency is 300 Hz or 1000 Hz, as the increase of the distance d of the two point sources, the volume of the sound heard by the user with a baffle between the two point sources may be greater than that without a baffle between the two point sources, which shows that at this frequency, the baffle structure between the two point sources may effectively increase the volume of the sound heard by the user in the near field. In the far field, the volume of the leaked sound with a baffle between the two point sources may be equivalent to that without a baffle between the two point sources, which shows that at this frequency, with or without a baffle structure arranged between the two point sources has little effect on the far-field sound leakage.

Figure 25:
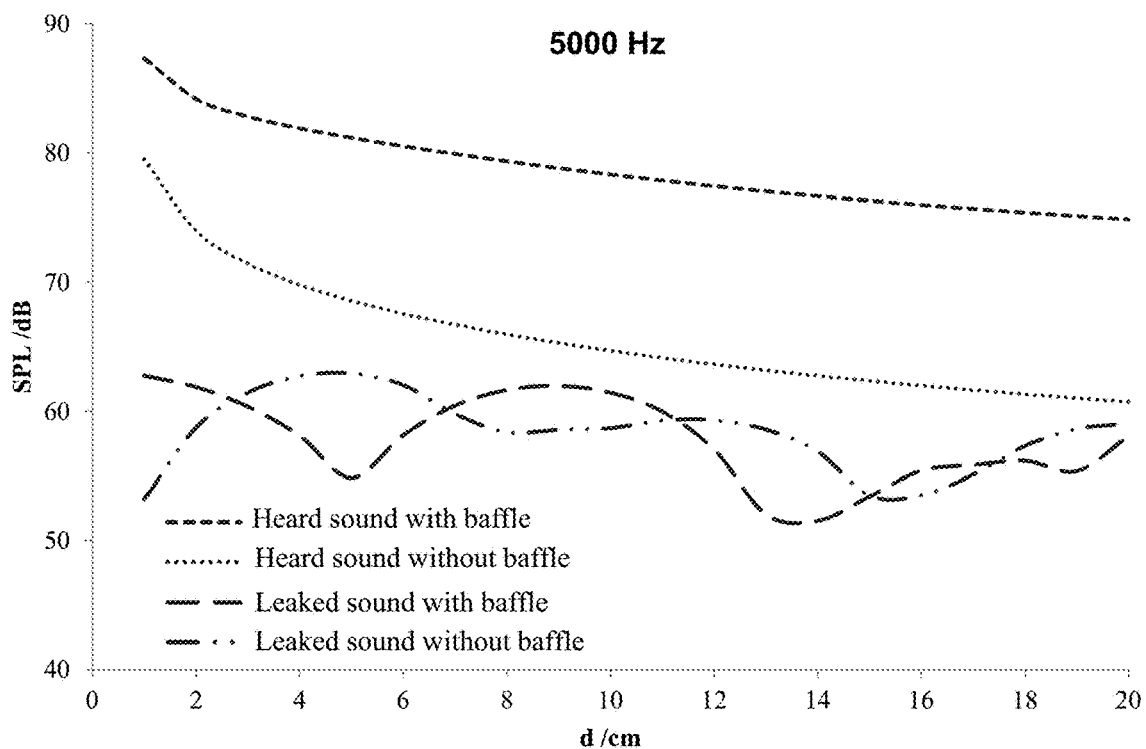
FIG. 25 is a graph illustrating a variation of a volume of sound heard by a user and a volume of a leaked sound as a function of distance at a frequency of 5000 Hz and with or without a baffle between the two point sources according to some embodiments of the present disclosure.

FIG. 25 is a graph illustrating a variation of the volume of a sound heard by the user and the volume of a leaked sound as a function of the distance when the frequency of the two point sources is 5000 Hz according to some embodiments of the present disclosure. As shown in FIG. 25, in the near field, when the frequency is 5000 Hz, as the distance d of the two point sources increases, the volume of the sound heard by the user when there is a baffle between the two point sources may be greater than that when there is no baffle. In the far-field, the volume of the leaked sound of the two point sources with and without baffle may be fluctuant as a function of the distance d. Overall, whether the baffle structure is arranged between the two point sources has little effect on the far-field leakage.

Figure 26:
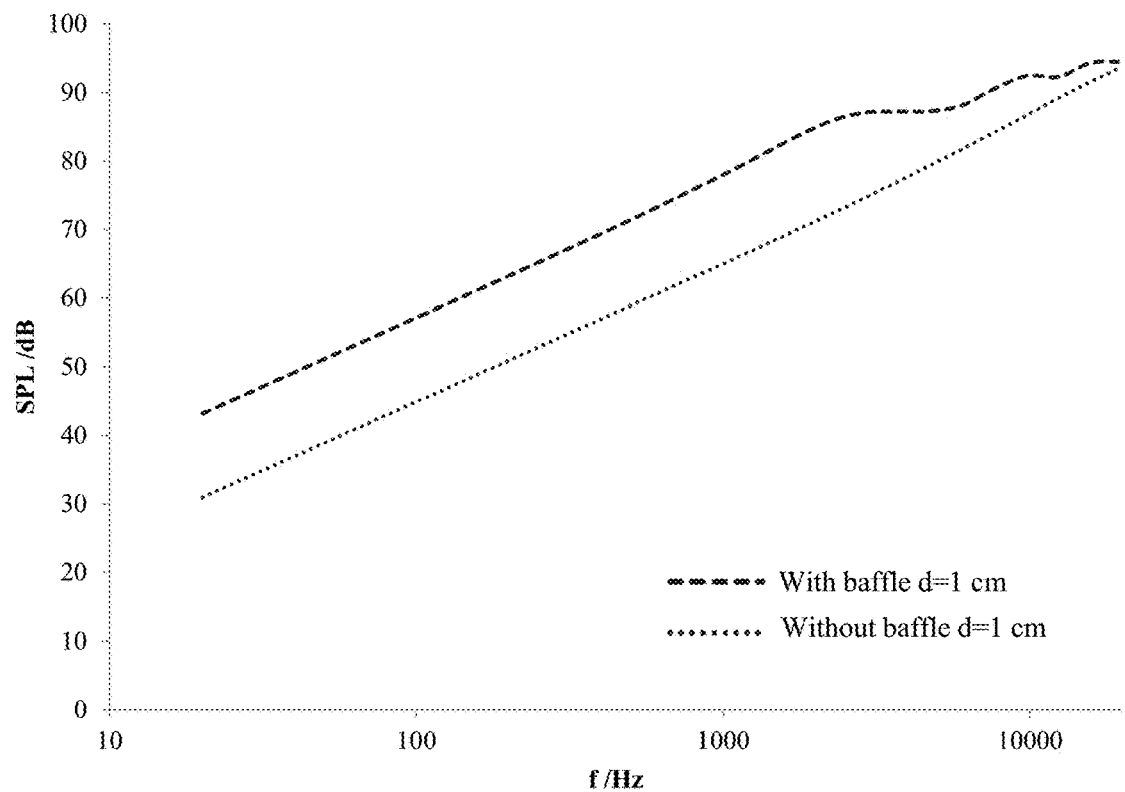
FIG. 26 is a graph illustrating a variation of a volume of sound heard by the user as a function of frequency when a distance d of two point sources is 1 cm according to some embodiments of the present disclosure.
Figure 27:
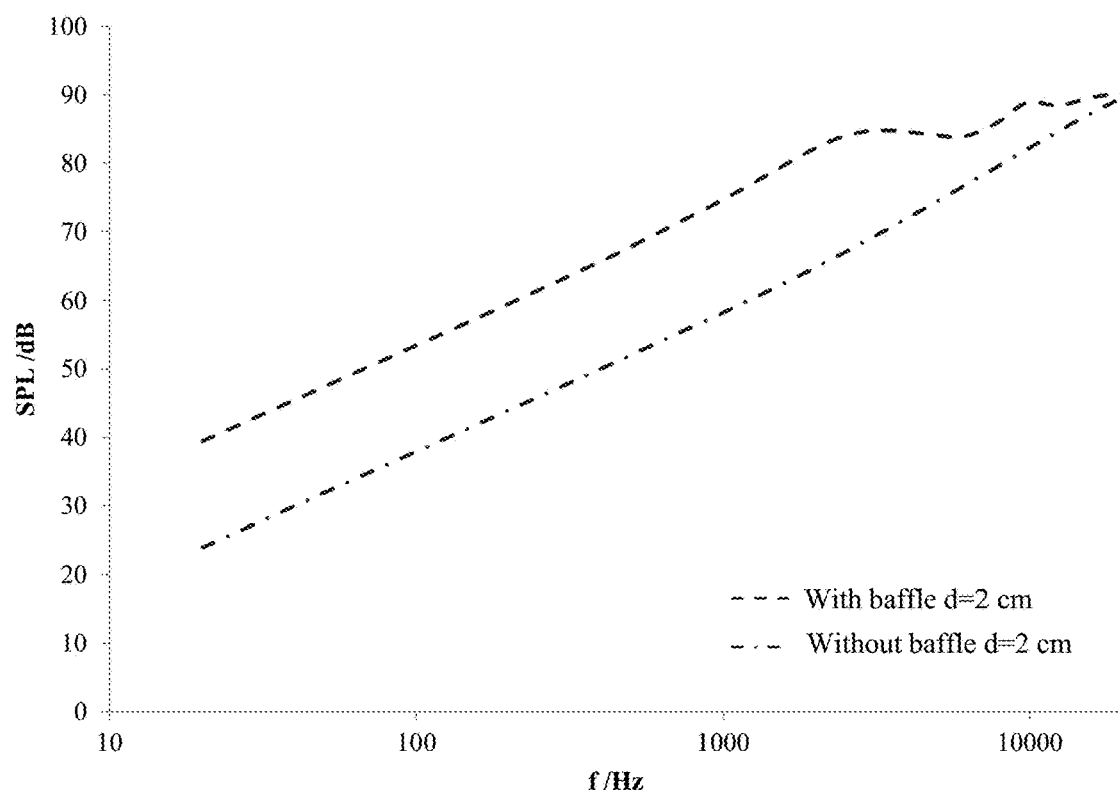
FIG. 27 is a graph illustrating a variation of a volume of sound heard by the user as a function of frequency when a distance d of two point sources is 2 cm according to some embodiments of the present disclosure.
Figure 28:
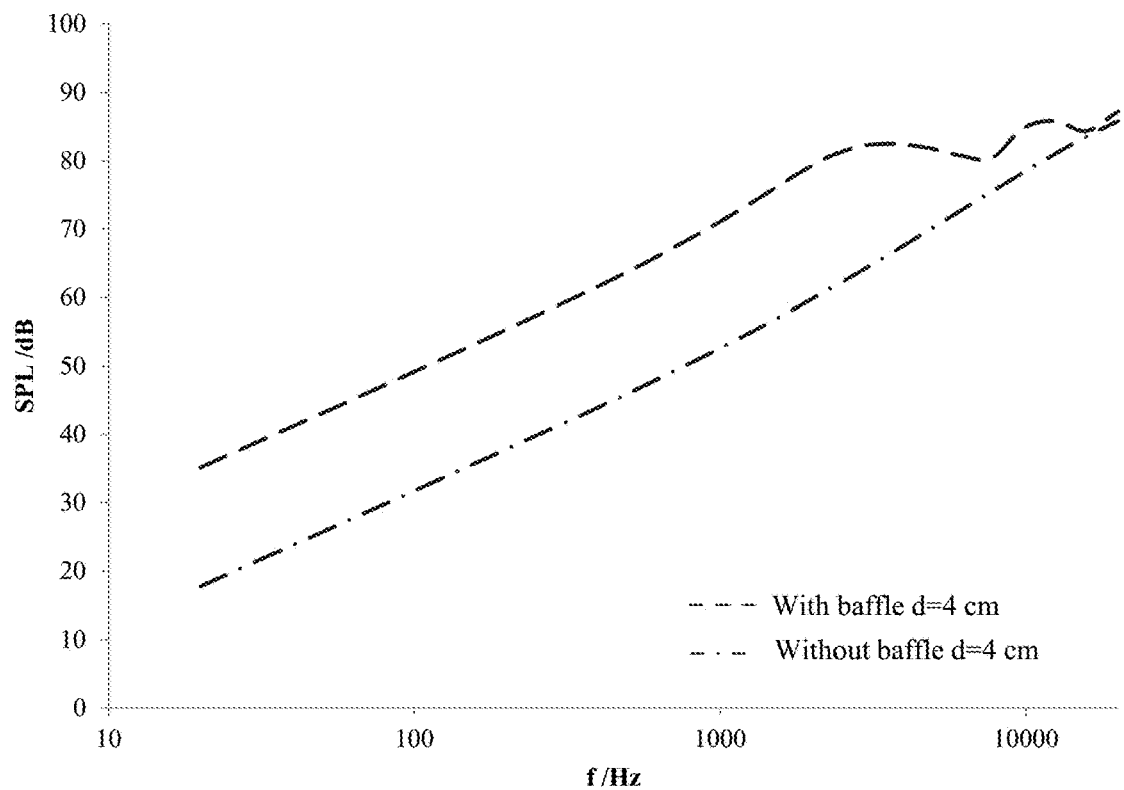
FIG. 28 is a graph illustrating a variation of a normalized parameter as a function of frequency when a distance d of two point sources is 4 cm according to some embodiments of the present disclosure.
Figure 29:
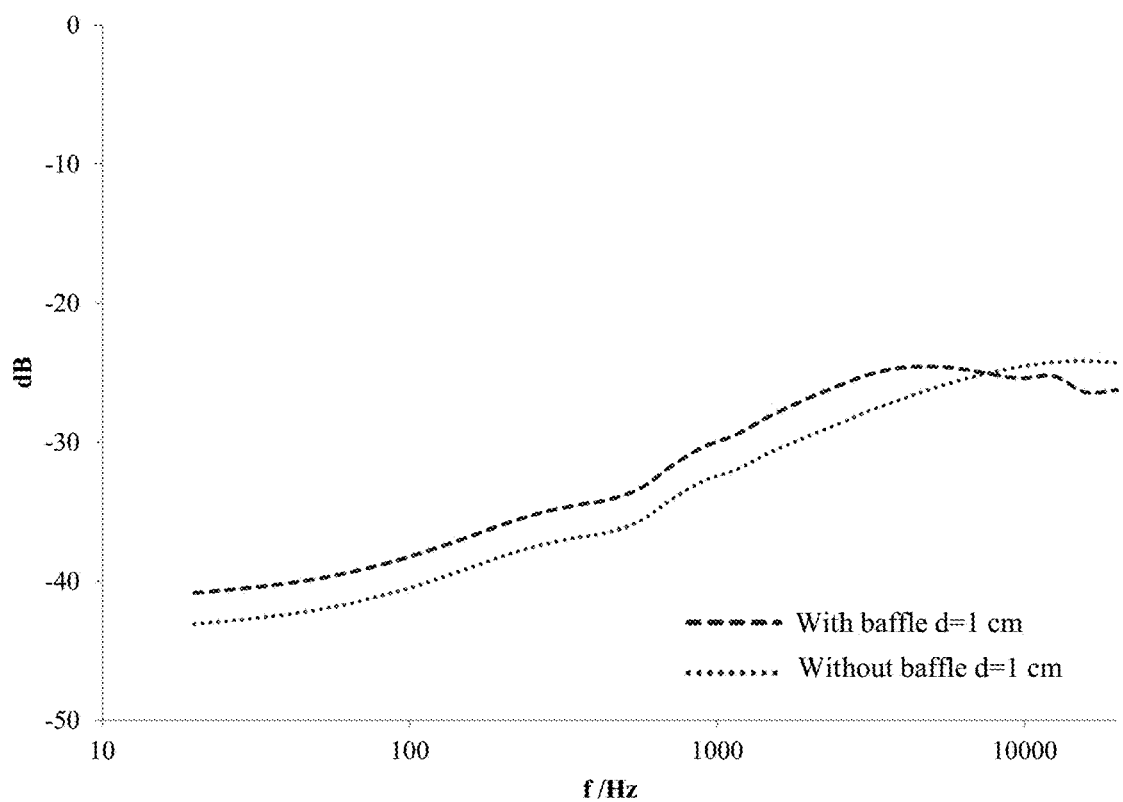
FIG. 29 is a graph illustrating a variation of a normalized parameter of a far field as a function of the frequency of sound when the distance d of two point sources is 1 cm according to some embodiments of the present disclosure.
Figure 30:
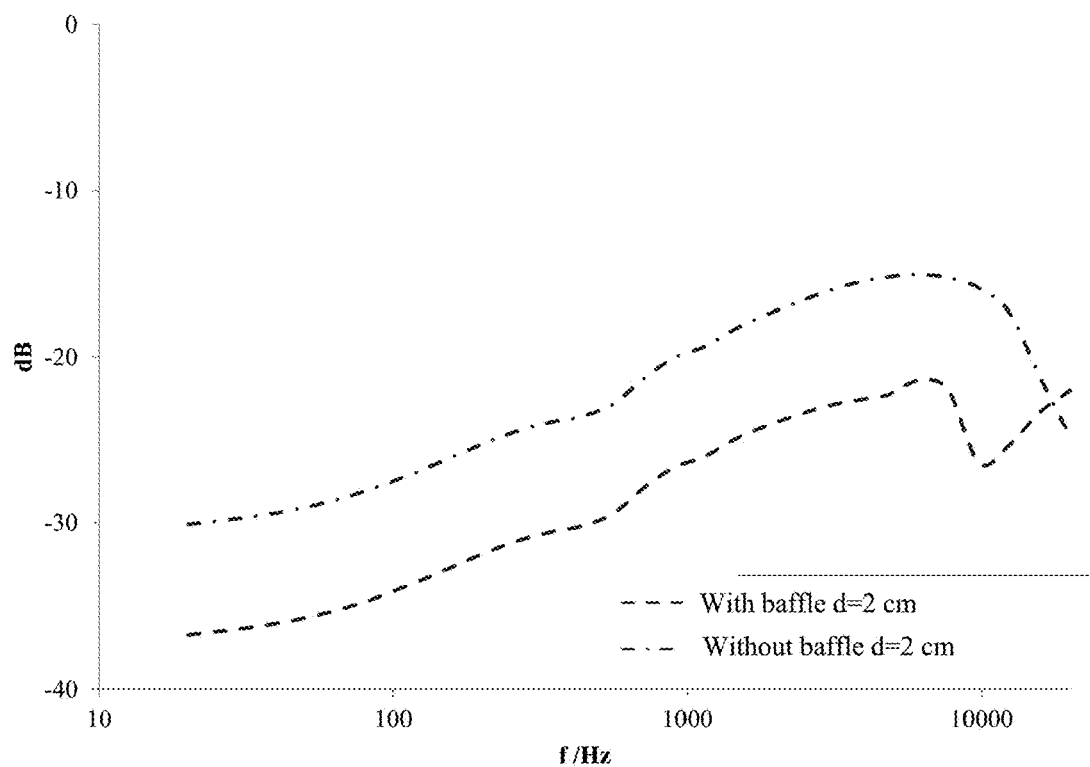
FIG. 30 is a graph illustrating a variation of a normalized parameter as a function of frequency when a distance d of two point sources is 2 cm according to some embodiments of the present disclosure.
Figure 31:
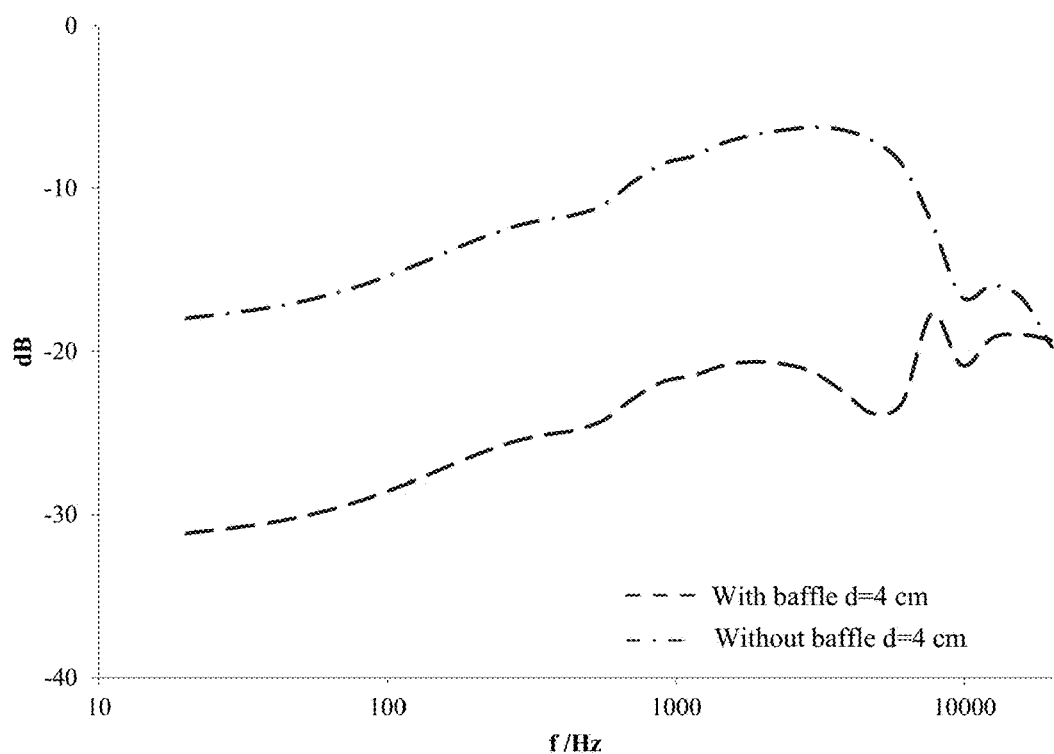
FIG. 31 is a graph illustrating a variation of a normalized parameter as a function of frequency when a distance d of two point sources is 4 cm according to some embodiments of the present disclosure.

FIGS. 26-28 are graphs illustrating a variation of the volume of a sound heard by the user as a function of the frequency of sound when the distance d of two point sources is 1 cm, 2 cm, 3 cm, respectively, according to some embodiments of the present disclosure. FIG. 29 is a graph illustrating a variation of a normalized parameter of a far field as a function of the frequency of sound when the distance d of two point sources is 1 cm according to some embodiments of the present disclosure. FIG. 30 is a graph illustrating a variation of a normalized parameter of a far field as a function of the frequency of sound when the distance d of two point sources is 2 cm according to some embodiments of the present disclosure. FIG. 31 is a graph illustrating a variation of a normalized parameter of a far field as a function of the frequency of sound when the distance d of two point sources is 4 cm according to some embodiments of the present disclosure. As shown in FIGS. 26 through 28, for the different distances d of the sound guiding holes (for example, 1 cm, 2 cm, 4 cm), at a certain frequency, in the near-field listening position (for example, the user's ear), the sound volume of two sound guiding holes located on both sides of the auricle (i.e., the "baffle effect" situation shown in the figure) may be greater than the sound volume of two sound guiding holes located on a same side of the auricle (i.e., the case of "without baffle" as shown in the figures). The certain frequency may be below 10000 Hz, below 5000 Hz, or below 1000 Hz.

As shown in FIGS. 29 to 31, for the different distances d of the sound guiding holes (for example, 1 cm, 2 cm, and 4 cm), at a certain frequency, in the far-field position (for example, the environment position away from the user's ear), the volume of the leaked sound generated when the two sound guiding holes are provided on both sides of the auricle may be smaller than that generated when the two sound guiding holes are not provided on both sides of the auricle. It should be noted that as the distance between two sound guiding holes or two point sources increases, the interference cancellation of sound at the far-field position may weaken, leading to a gradual increase in the far-field leakage and a weaker ability to reduce sound leakage. Therefore, the distance d between two sound guiding holes or the two point sources may not be too large. In some embodiments, in order to keep the output sound as loud as possible in the near field, and suppress the sound leakage in the far field, the distance d between the two sound guiding holes may be set to be no more than, for example, 20 cm, 12 cm, 10 cm, 6 cm, or the like. In some embodiments, considering the size of the acoustic output apparatus and the structural requirements of the sound guiding holes, the distance d between the two sound guiding holes may be set to be in a range of, for example, 1 cm to 12 cm, 1 cm to 10 cm, 1 cm to 8 cm, 1 cm to 6 cm, 1 cm to 3 cm, or the like.

In some embodiments, a plurality of sound guiding holes may be set on both sides of the baffle. The number of the sound guiding holes on both sides of the baffle may be the same or different. For example, the number of sound guiding holes on one side of the baffle may be two, and the number of sound guiding holes on the other side may be two or three. These modifications and changes may still be within the protection scope of the present disclosure.

Figure 32:
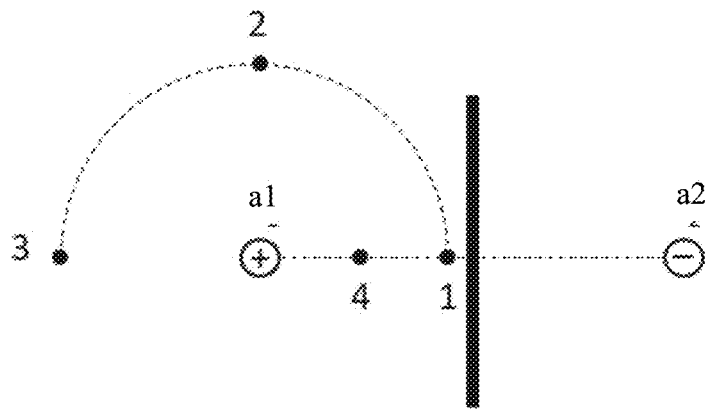
FIG. 32 is a graph illustrating exemplary distributions of different listening positions according to some embodiments of the present disclosure.

In some embodiments, on the premise of maintaining the distance between the two point sources, a relative position of the listening position to the two point sources may have a certain effect on the volume of the near-field sound and the far-field leakage reduction. In order to improve the acoustic output effect of the acoustic output apparatus, in some embodiments, the acoustic output apparatus may be provided with at least two sound guiding holes. The at least two sound guiding holes may include two sound guiding holes located on the front and back sides of the user's auricle, respectively. In some embodiments, considering that the sound propagated from the sound guiding hole located on the rear side of the user's auricle needs to bypass over the auricle to reach the user's ear canal, the acoustic route between the sound guiding hole located on the front side of the auricle and the user's ear canal (i.e., the acoustic distance from the sound guiding hole to the user's ear canal entrance) is shorter than the acoustic route between the sound guiding hole located on the rear side of the auricle and the user's ear. In order to further explain the effect of the listening position on the acoustic output effect, four representative listening positions (listening position 1, listening position 2, listening position 3, listening position 4) may be selected as shown in FIG. 32. The listening position 1, the listening position 2, and the listening position 3 may have equal distance from the point source a1, which may be $r_1$. The distance between the listening position 4 and the point source a1 may be $r_2$, and r2<r1. The point source a1 and the point source a2 may generate sounds with opposite phases, respectively.

Figure 33:
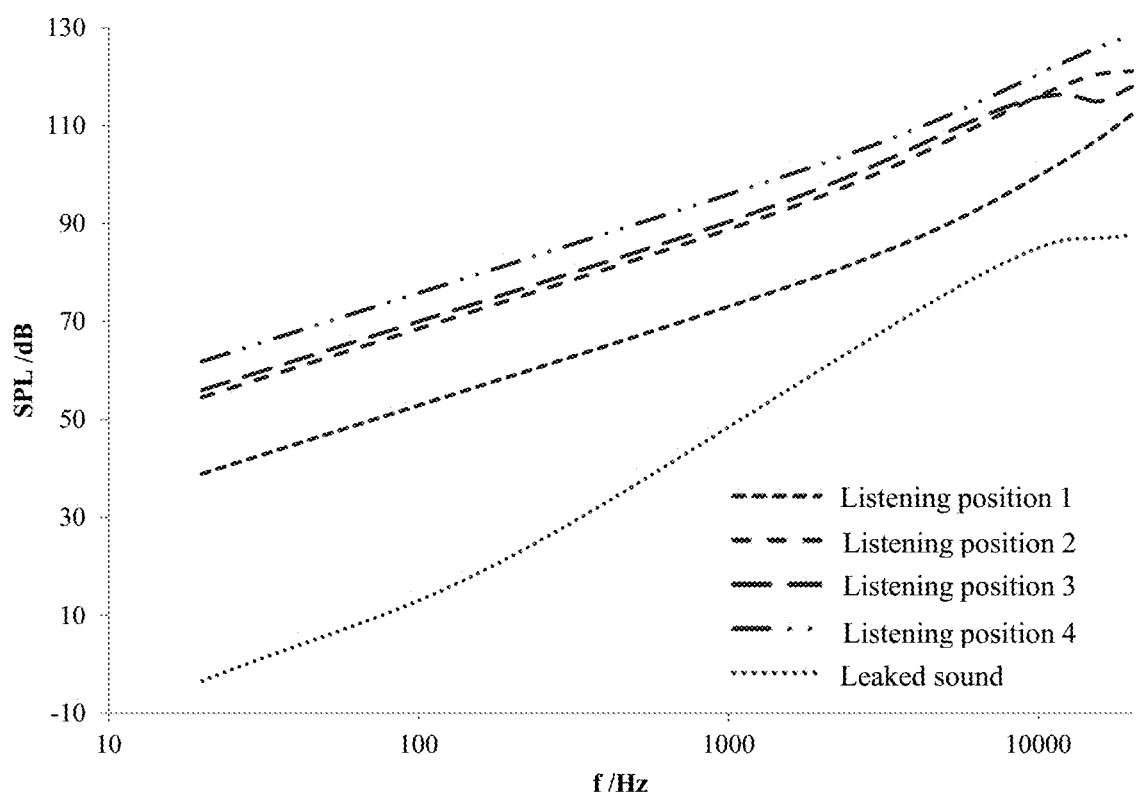
FIG. 33 is a graph illustrating a volume of sound heard by a user from two point sources without baffle at different listening positions in a near field as a function of a frequency of sound according to some embodiments of the present disclosure.
Figure 34:
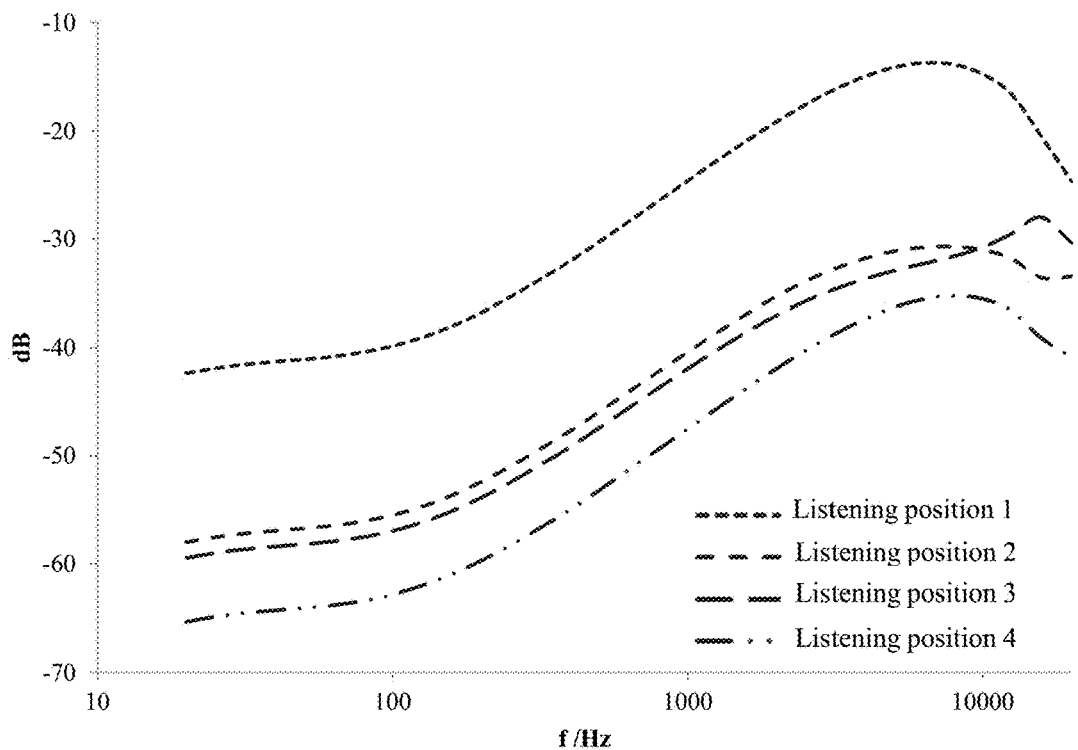
FIG. 34 is a graph illustrating a normalized parameter of two point sources without baffle at different listening positions in a near field according to some embodiments of the present disclosure.

FIG. 33 is a graph illustrating the volume of a sound heard by a user of two point sources without baffle at different listening positions as a function of the frequency of sound according to some embodiments of the present disclosure. FIG. 34 is a graph illustrating a normalized parameter of different listening positions as a function of the frequency of sound. The normalized parameter may be obtained with reference to Equation (4). As shown in FIGS. 33 and 34, for the listening position 1, since the difference between the acoustic routes from the point source a1 and the point source a2 to the listening position 1 is small, the difference in amplitude of the sounds produced by the two point sources at the listening position 1 may be small. Therefore, an interference of the sounds of the two point sources at the listening position 1 may cause the volume of the sound heard by the user to be smaller than that of other listening positions. For the listening position 2, compared with the listening position 1, the distance between the listening position 2 and the point source a1 may remain unchanged, that is, the acoustic route from the point source a1 to the listening position 2 may not change. However, the distance between the listening position 2 and the point source a2 may be longer, and the length of the acoustic route between the point source a2 and the listening position 2 may increase. The amplitude difference between the sound generated by the point source a1 and the sound generated by the point source a2 at the listening position 2 may increase. Therefore, the volume of the sound transmitted from the two point sources after interference at the listening position 2 may be greater than that at the listening position 1. Among all positions on an arc with a radius of $r_1$, a difference between the acoustic route from the point source a1 to the listening position 3 and the acoustic route from the point source a2 to the listening position 3 may be the longest. Therefore, compared with the listening position 1 and the listening position 2, the listening position 3 may have the highest volume of the sound heard by the user. For the listening position 4, the distance between the listening position 4 and the point source a1 may be short. The sound amplitude of the point source a1 at the listening position 4 may be large. Therefore, the volume of the sound heard by the user at the listening position 4 may be large. In summary, the volume of the sound heard by the user at the near-field listening position may change as the listening position and the relative position of the two point sources change. When the listening position is on the line between the two point sources and on the same side of the two point sources (for example, listening position 3), the acoustic route difference between the two point sources at the listening position may be the largest (the acoustic route difference may be the distance d between the two point sources). In this case (i.e., when the auricle is not used as a baffle), the volume of the sound heard by the user at this listening position may be greater than that at other locations. According to Equation (4), when the far-field leakage is constant, the normalization parameter corresponding to this listening position may be the smallest, and the leakage reduction capability may be the strongest. At the same time, reducing the distance r1 between the listening position (for example, listening position 4) and the point source a1 may further increase the volume at the listening position, at the same time reduce the sound leakage, and improve the capability to reduce leakage.

Figure 35:
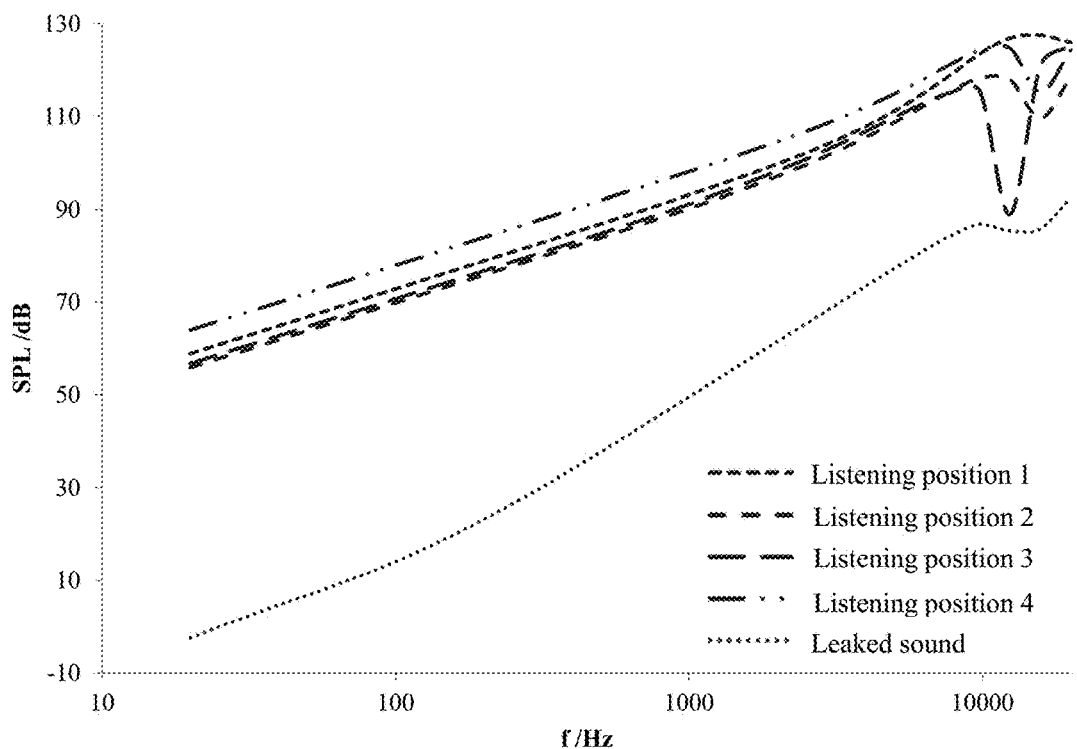
FIG. 35 is a graph illustrating a volume of sound heard by a user from two point sources with a baffle at different listening positions in a near field as a function of frequency according to some embodiments of the present disclosure.
Figure 36:
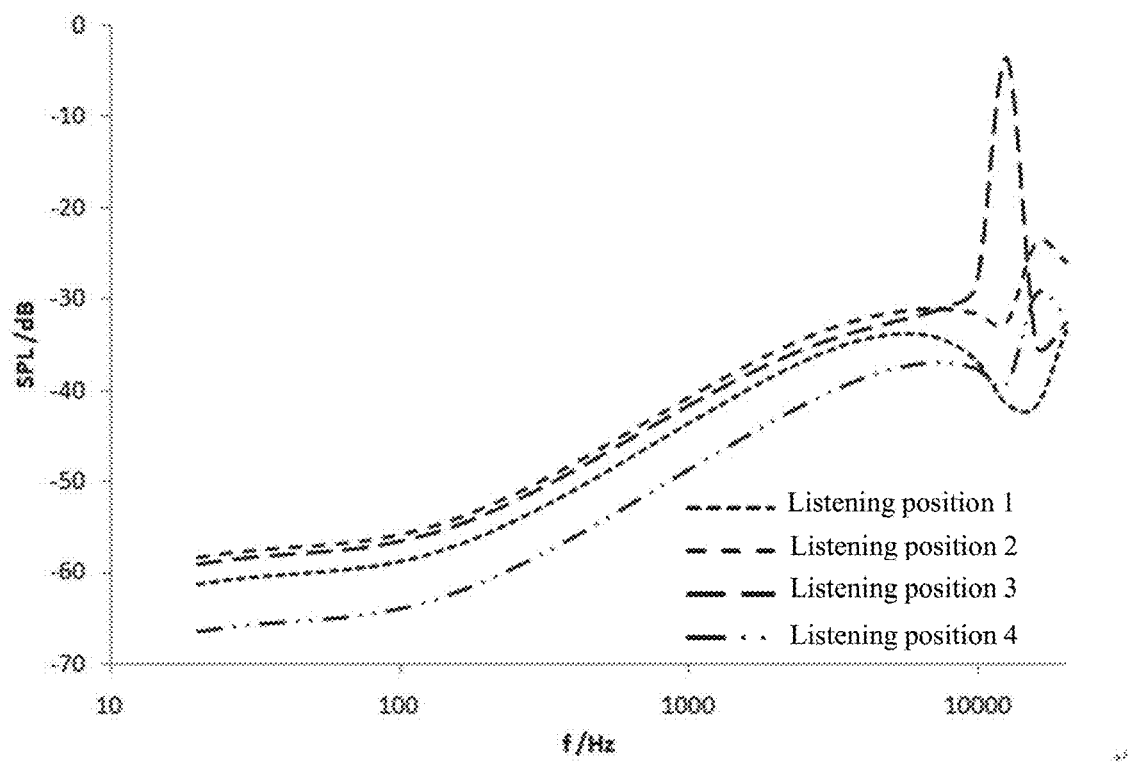
FIG. 36 is a graph illustrating a normalized parameter of two point sources with a baffle at different listening positions in a near field according to some embodiments of the present disclosure.

FIG. 35 is a graph illustrating the volume of the sound heard by the user of two point sources with baffle (as shown in FIG. 32) at different listening positions in the near field as a function of frequency according to some embodiments of the present disclosure. FIG. 36 is a graph of the normalization parameters of different listening positions obtained with reference to Equation (4) based on FIG. 35, as a function of frequency. As shown in FIGS. 35 and 36, compared to the case without a baffle, the volume of the sound heard by the user generated by the two point sources at listening position 1 may increase significantly when there is a baffle. The volume of the sound heard by the user at the listening position 1 may exceed that at the listening position 2 and the listening position 3. The reason may be that the acoustic route from the point source a2 to the listening position 1 may increase after a baffle is set between the two point sources. As a result, the acoustic route difference between the two point sources at the listening position 1 may increase significantly. The amplitude difference between the sounds generated by the two point sources at the listening position 1 may increase, making it difficult to produce sound interference cancellation, thereby increasing the volume of the sound heard by the user generated at the listening position 1 significantly. At the listening position 4, since the distance between the listening position and the point source a1 is further reduced, the sound amplitude of the point source a1 at this position may be larger. The volume of the sound heard by the user at the listening position 4 may still be the largest among the four listening positions. For listening position 2 and listening position 3, since the effect of the baffle on the acoustic route from the point source a2 to the two listening positions is not very obvious, the volume increase effect at the listening position 2 and the listening position 3 may be less than that at the listening position 1 and the listening position 4 which are closer to the baffle.

The volume of the leaked sound in the far field may not change with listening positions, and the volume of the sound heard by the user at the listening position in the near field may change with listening positions. In this case, according to Equation (4), the normalization parameter of the acoustic output apparatus may vary in different listening positions. Specifically, a listening position with a large volume of sound heard by the user (e.g., listening position 1 and listening position 4) may have a small normalization parameter and strong capability to reduce sound leakage. A listening position with a low volume of sound heard by the user (e.g., listening position 2 and listening position 3) may have a large normalization parameter and weak capability to reduce leakage.

Therefore, according to the actual application scenario of the acoustic output apparatus, the user's auricle may serve as a baffle. In this case, the two sound guiding holes on the acoustic output apparatus may be arranged on the front side and the back side of the auricle, respectively, and the ear canal may be located between the two sound guiding holes as a listening position. In some embodiments, by designing the positions of the two sound guiding holes on the acoustic output apparatus, the distance between the sound guiding hole on the front side of the auricle and the ear canal may be smaller than the distance between the sound guiding hole on the back side of the auricle and the ear canal. In this case, the acoustic output apparatus may produce a large sound amplitude at the ear canal since the sound guiding hole on the front side of the auricle is close to the ear canal. The sound amplitude formed by the sound guiding hole on the back of the auricle may be smaller at the ear canal, which may avoid the interference cancellation of the sound at the two sound guiding holes at the ear canal, thereby ensuring that the volume of the sound heard by the user at the ear canal is large. In some embodiments, the acoustic output apparatus may include one or more contact points (e.g., "an inflection point" on a supporting structure to match the shape of the ear) that can contact with the auricle when it is worn. The contact point(s) may be located on a line connecting the two sound guiding holes or on one side of the line connecting the two sound guiding holes. And a ratio of the distance between the front sound guiding hole and the contact point(s) to the distance between the rear sound guiding hole and the contact point(s) may be 0.05-20. In some embodiments, the ratio may be 0.1-10. In some embodiments, the ratio may be 0.2-5. In some embodiments, the ratio may be 0.4-2.5.

Figure 37:
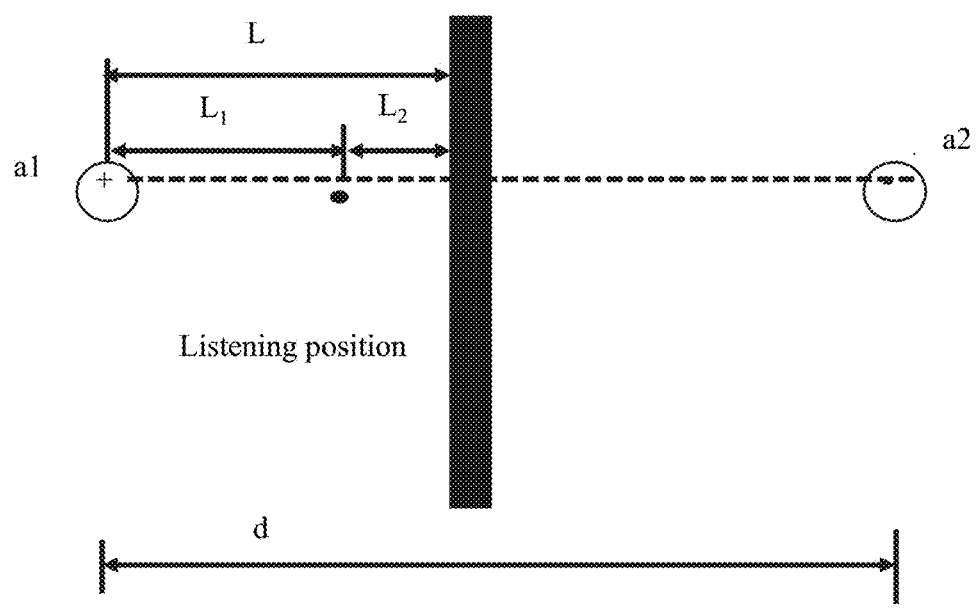
FIG. 37 is a schematic diagram illustrating two point sources and a baffle according to some embodiments of the present disclosure.

FIG. 37 is a schematic diagram illustrating two point sources and a baffle (e.g., an auricle) according to some embodiments of the present disclosure. In some embodiments, a position of the baffle between the two sound guiding holes may have a certain influence on the acoustic output effect. Merely by way of example, as shown in FIG. 37, a baffle may be provided between a point source a1 and a point source a2, a listening position may be located on the line connecting the point source a1 and the point source a2. In addition, the listening position may be located between the point source a1 and the baffle. A distance between the point source a1 and the baffle may be L. A distance between the point source a1 and the point source a2 may be d. A distance between the point source a1 and the sound heard by the user may be L1. A distance between the listening position and the baffle may be L2. When the distance L1 is constant, a movement of the baffle may cause different ratios of L to d, thereby obtaining different volumes of the sound heard by the user at the listening position and/or the volumes of the far-field leakage.

Figure 38:
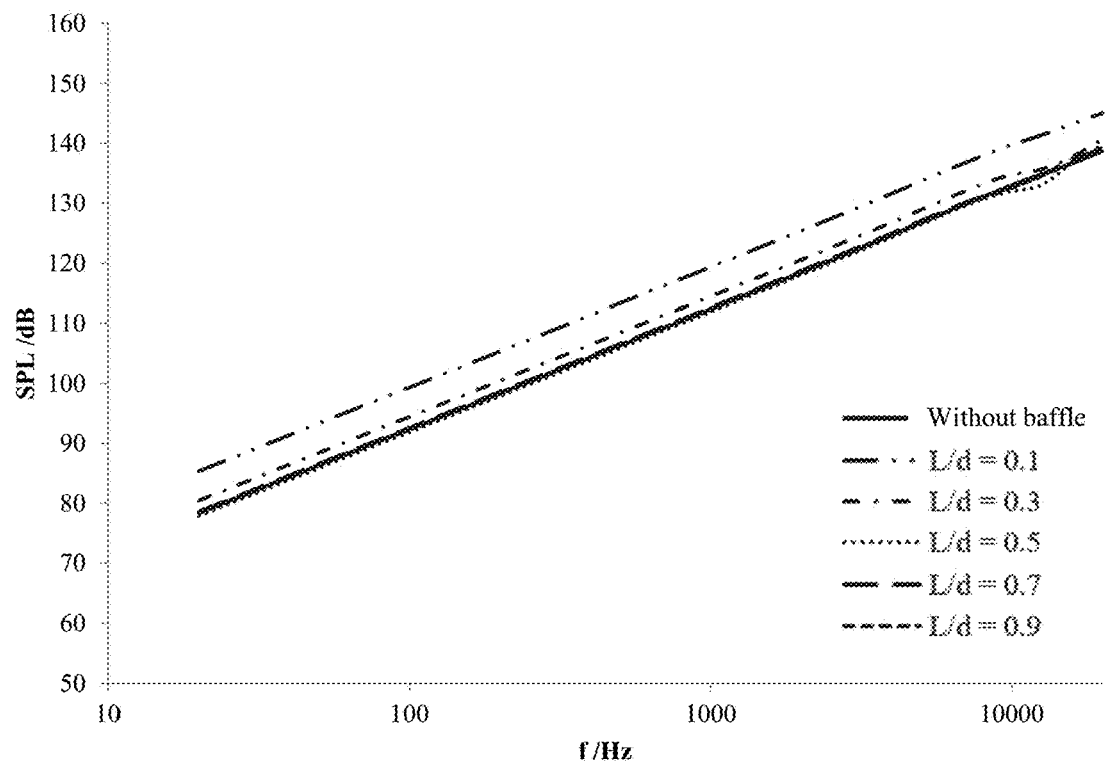
FIG. 38 is a graph illustrating a variation of a volume of a near-field sound as a function of a frequency of sound when a baffle is at different positions according to some embodiments of the present disclosure.
Figure 39:
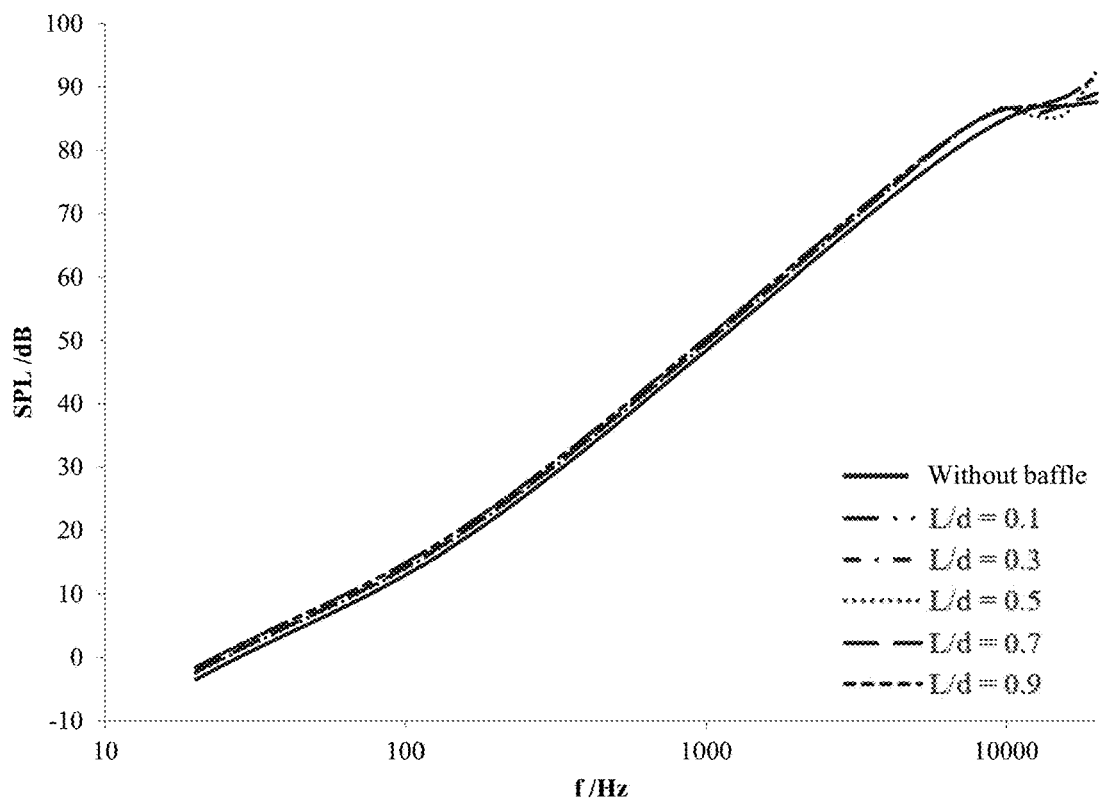
FIG. 39 is a graph illustrating a variation of a volume of a far-field leakage as a function of a frequency of sound when a baffle is at different positions according to some embodiments of the present disclosure.
Figure 40:
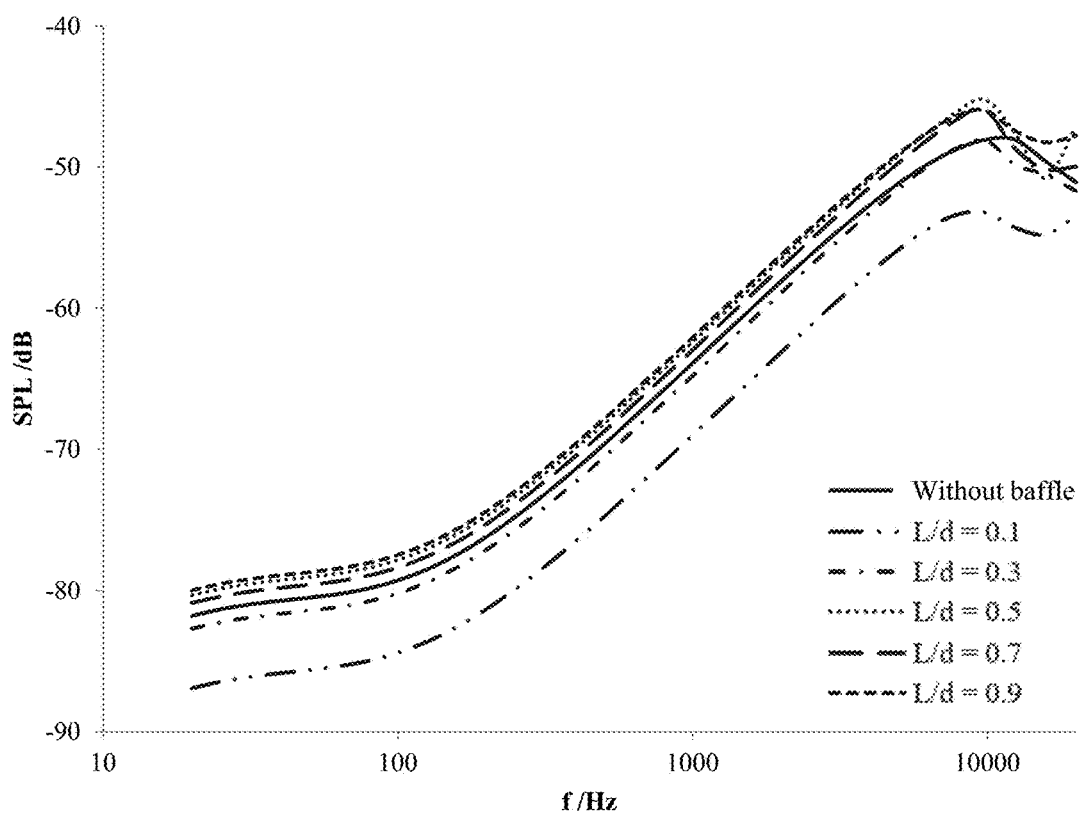
FIG. 40 is a graph illustrating a variation of a normalization parameter as a function of a frequency of sound when a baffle is at different positions according to some embodiments of the present disclosure.

FIG. 38 is a graph illustrating a variation of the volume of a near-field sound as a function of the frequency of sound when a baffle is at different positions according to some embodiments of the present disclosure. FIG. 39 is a graph illustrating a variation of the volume of a far-field leakage as a function of the frequency of sound when a baffle is at different positions according to some embodiments of the present disclosure. FIG. 40 is a graph illustrating a variation of a normalization parameter as a function of the frequency of sound when a baffle is at different positions according to some embodiments of the present disclosure. According to FIGS. 38-40, the volume of the far-field leakage may vary little with the change of the position of the baffle between the two point sources. In a situation that the distance d between the point source a1 and the point source a2 remains constant, when L decreases, the volume at the listening position may increase, the normalization parameter may decrease, and the capability to reduce sound leakage may be enhanced. In the same situation, when L increases, the volume at the listening position may increase, the normalization parameter may increase, and the capability to reduce sound leakage may be weakened. A reason for the above result may be that when L is small, the listening position may be close to the baffle, an acoustic route of the sound wave from the point source a2 to the listening position may be increased due to the baffle. In this case, an acoustic route difference between the point source a1 and the point source a2 to the listening position may be increased and the interference cancellation of the sound may be reduced. As a result, the volume at the listening position may be increased after the baffle is added. When L is large, the listening position may be far away from the baffle. The baffle may have a small effect on the acoustic route difference between the point source a1 and the point source a2 to the listening position. As a result, a volume change at the listening position may be small after the baffle is added.

As described above, by designing positions of the sound guiding holes on the acoustic output apparatus, an auricle of a human body may serve as a baffle to separate different sound guiding holes when the user wears the acoustic output apparatus. In this case, a structure of the acoustic output apparatus may be simplified, and the output effect of the acoustic output apparatus may be further improved. In some embodiments, the positions of the two sound guiding holes may be properly designed so that a ratio of a distance between the sound guiding hole on the front side of the auricle and the auricle (or a contact point on the acoustic output apparatus for contact with the auricle) to a distance between the two sound guiding holes may be less than or equal to 0.5 when the user wears the acoustic output apparatus. In some embodiments, the ratio may be less than or equal to 0.3. In some embodiments, the ratio may be less than or equal to 0.1. In some embodiments, the ratio of the distance between the sound guiding hole on the front side of the auricle and the auricle (or a contact point on the acoustic output apparatus for contact with the auricle) to the distance between the two sound guiding holes may be larger than or equal to 0.05. In some embodiments, a second ratio of the distance between the two sound guiding holes to a height of the auricle may be larger than or equal to 0.2. In some embodiments, the second ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output apparatus may have a certain effect on the volumes of the near-field sound and far-field sound leakage. The acoustic route may be changed by adjusting a cavity length between a vibration diaphragm in the acoustic output apparatus and the sound guiding hole. In some embodiments, the acoustic driver may include a vibration diaphragm. The front and rear sides of the vibration diaphragm may be coupled to two sound guiding holes through a front chamber and a rear chamber, respectively. The acoustic routes from the vibration diaphragm to the two sound guiding holes may be different. In some embodiments, a ratio of the lengths of the acoustic routes between the vibration diaphragm and the two sound guiding holes may be, for example, 0.5-2, 0.6-1.5, or 0.8-1.2.

In some embodiments, on the premise of keeping the phases of the sounds generated at the two sound guiding holes opposite, the amplitudes of the sounds generated at the two sound guiding holes may be changed to improve the output effect of the acoustic output apparatus. Specifically, impedances of acoustic routes connecting the acoustic driver and the two sound guiding holes may be adjusted so as to adjust the sound amplitude at each of the two sound guiding holes. In some embodiments, the impedance may refer to a resistance that a medium needs to overcome during displacement when acoustic waves are transmitted. The acoustic routes may or may not be filled with a damping material (e.g., a tuning net, a tuning cotton, etc.) so as to adjust the sound amplitude. For example, a resonance cavity, a sound hole, a sound slit, a tuning net, and/or a tuning cotton may be disposed in an acoustic route so as to adjust the acoustic resistance, thereby changing the impedances of the acoustic route. As another example, an aperture of each of the two sound guiding holes may be adjusted to change the acoustic resistance of the acoustic routes corresponding to the two sound guiding holes. In some embodiments, a ratio of the acoustic impedance of the acoustic route between the acoustic driver (the vibration diaphragm) and one of the two sound guiding holes to the acoustic route between the acoustic driver and the other sound guiding hole may be 0.5-2 or 0.8-1.2.

In some embodiments, the listening position may not be on the line connecting the two point sources, but may also be above, below, or in an extension direction of the line connecting the two point sources. As another example, a measurement method of the distance from a point sound source to the auricle, and a measurement method of the height of the auricle may also be adjusted according to different scenarios. These similar changes may be all within the protection scope of the present disclosure.

Figure 41:
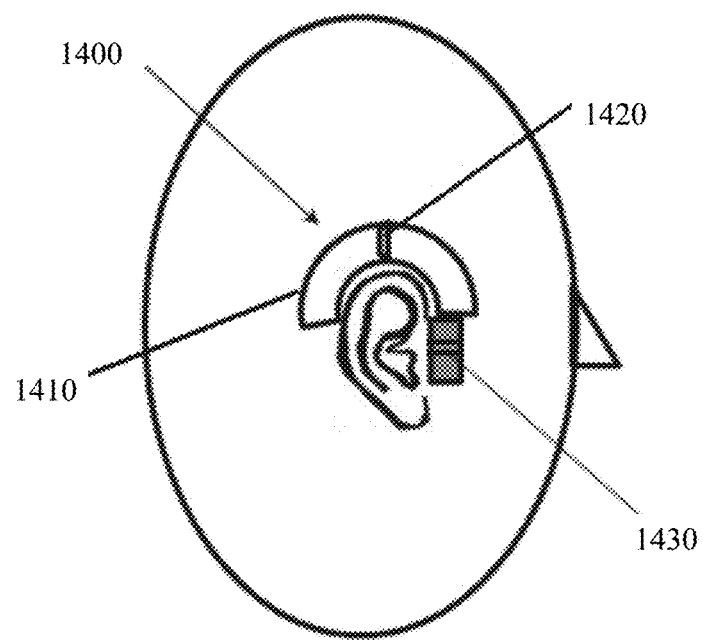
FIG. 41 is a schematic diagram illustrating another exemplary acoustic output apparatus according to some embodiments of the present disclosure.

FIG. 41 is a schematic diagram illustrating another exemplary acoustic output apparatus according to some embodiments of the present disclosure.

For human ears, the frequency band of sound that can be heard may be concentrated in a mid-low-frequency band. An optimization goal in the mid-low-frequency band may be to increase a volume of the sound heard by the user. If the listening position is fixed, parameters of the two point sources may be adjusted such that the volume of the sound heard by the user may increase significantly while a volume of leaked sound may be substantially unchanged (an increase in the volume of the sound heard by the user may be greater than an increase in the volume of the sound leakage). In a high-frequency band, a sound leakage reduction effect of the two point sources may be weaker. In the high-frequency band, an optimization goal may be reducing a sound leakage. The sound leakage may be further reduced by adjusting the parameters of the two point sources of different frequencies. In some embodiments, the acoustic output apparatus 1400 may also include an acoustic driver 1430. The acoustic driver 1430 may output sounds from two of second sound guiding holes. Details regarding the acoustic driver 1430, the second sound guiding holes, and a structure therebetween may be described with reference to the acoustic driver 1420 and the first sound guiding holes. In some embodiments, the acoustic driver 1430 and the acoustic driver 1420 may output sounds of different frequencies. In some embodiments, the acoustic output apparatus may further include a controller configured to cause the acoustic driver 1420 to output sound in the first frequency range, and cause the acoustic driver 1430 to output sound in the second frequency range. The second frequency range may include frequencies higher than the first frequency range. For example, the first frequency range may be 100 Hz-1000 Hz, and the second frequency range may be 1000 Hz-10000 Hz.

In some embodiments, the acoustic driver 1420 may be a low-frequency speaker, and the acoustic driver 1430 may be a mid-high-frequency speaker. Due to different frequency response characteristics of the low-frequency speaker and the mid-high-frequency speaker, frequency bands of the output sound may also be different. High-frequency bands and low-frequency bands may be divided by using the low-frequency speakers and the mid-high-frequency speakers, and accordingly, two low-frequency point sources and two mid-high-frequency point sources may be constructed to perform near-field sound output and a far-field leakage reduction. For example, the acoustic driver 1420 may provide two point sources for outputting low-frequency sound through the sound guiding hole 1411 and the sound guiding hole 1412, which may be mainly used for outputting sound in low-frequency band. The two low-frequency point sources may be distributed on both sides of an auricle to increase a volume near the near-field ear. The acoustic driver 1430 may provide two point sources for outputting mid-high-frequency sound through two second sound guiding holes. A mid-high-frequency sound leakage may be reduced by adjusting a distance between the two second sound guiding holes. The two mid-high-frequency point sources may be distributed on both sides of the auricle or on the same side of the auricle. Alternatively, the acoustic driver 1420 may provide two point sources for outputting full-frequency sound through the sound guiding hole 1411 and the sound guiding hole 1412 so as to further increase the volume of the near-field sound.

Further, the distance d2 between the two second sound guiding holes may be less than the distance d1 between the sound guiding hole 1411 and the sound guiding hole 1412, that is, d1 may be larger than d2. For illustration purpose, as shown in FIG. 13, it may be possible to obtain a stronger sound leakage reduction capability than a single point source and one set of two point sources by setting two sets of two point sources including one set of two low-frequency point sources and one set of two high-frequency point sources with different distances.

It should be noted that the positions of the sound guiding holes of the acoustic output apparatus may be not limited to the case that the two sound guiding holes 1411 and 1412 corresponding to the acoustic driver 1420 shown in FIG. 41 are distributed on both sides of the auricle, and the case that the two sound guiding holes corresponding to the acoustic driver 1430 are distributed on the front side of the auricle. For example, in some embodiments, two second sound guiding holes corresponding to the acoustic driver 1430 may be distributed on the same side of the auricle (e.g., a rear side, an upper side, or a lower side of the auricle). As another example, in some embodiments, the two second sound guiding holes corresponding to the acoustic driver 1430 may be distributed on both sides of the auricle. In some embodiments, when the sound guiding holes 1411 and the sound guiding hole 1412 (and/or the two second sound guiding holes) are located on the same side of the auricle, a baffle may be disposed between the sound guiding holes 1411 and the sound guiding hole 1412 (and/or the two second sound guiding holes) so as to further increase the volume of the near-field sound and reduce the far-field sound leakage. For a further example, in some embodiments, the two sound guiding holes corresponding to the acoustic driver 1420 may also be located on the same side of the auricle (e.g., a front side, a rear side, an upper side, or a lower side of the auricle).

In practical applications, the acoustic output apparatus may include different application forms such as bracelets, glasses, helmets, watches, clothings, or backpacks, smart headsets, etc. In some embodiments, an augmented reality technology and/or a virtual reality technology may be applied in the acoustic output apparatus so as to enhance a user's audio experience. Exemplary glasses may be or include augmented reality (AR) glasses, virtual reality (VR) glasses, etc.

Figure 42:
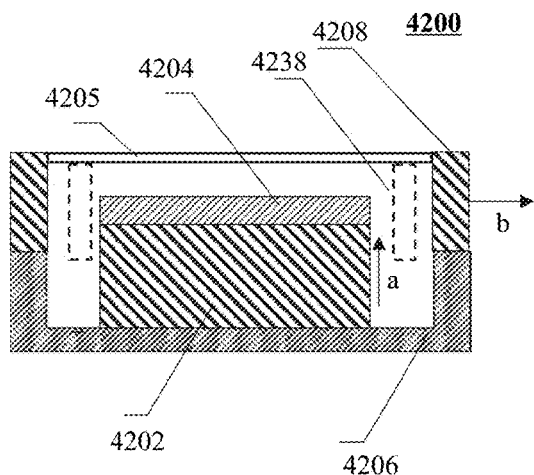
FIG. 42 is a schematic diagram illustrating a longitudinal sectional view of an exemplary acoustic output apparatus according to some embodiments of the present disclosure.

FIG. 42 is a schematic diagram illustrating a longitudinal sectional view of an exemplary acoustic output apparatus 4200 according to some embodiments of the present disclosure. It should be noted that, without departing from the spirit and scope of the present disclosure, the contents described below may be applied to an air conduction acoustic output apparatus and a bone conduction acoustic output apparatus.

As shown in FIG. 42, in some embodiments, the acoustic output apparatus 4200 may include a first magnetic component 4202, a first magnetic conductive component 4204, a second magnetic conductive component 4206, a second magnetic component 4208, a vibration plate 4205, and a voice coil 4238. One or more of the components of acoustic output apparatus 4200 may form a magnetic system. For example, the magnetic system may include the first magnetic component 4202, the first magnetic conductive component 4204, the second magnetic conductive component 4206, and the second magnetic component 4208. The magnetic system may generate a first total magnetic field (or referred to as a total magnetic field of the magnetic system or a first magnetic field). The first total magnetic field may be formed by all magnetic fields generated by all components of the magnetic system (e.g., the first magnetic component 4202, the first magnetic conductive component 4204, the second magnetic conductive component 4206, and the second magnetic component 4208).

A magnetic component used herein refers to any component that may generate a magnetic field, such as a magnet. In some embodiments, a magnetic component may have a magnetization direction, which refers to the direction of a magnetic field inside the magnetic component. In some embodiments, the first magnetic component 4202 may include a first magnet, which may generate a second magnetic field, and the second magnetic component 4208 may include a second magnet. The first magnet and the second magnet may be of the same type or different types. In some embodiments, a magnet may include a metal alloy magnet, a ferrite, or the like. The metal alloy magnet may include neodymium iron boron, samarium cobalt, aluminum nickel cobalt, iron chromium cobalt, aluminum iron boron, iron carbon aluminum, or the like, or any combination thereof. The ferrite may include barium ferrite, steel ferrite, ferromanganese ferrite, lithium manganese ferrite, or the like, or any combination thereof.

A magnetic conductive component may also be referred to as a magnetic field concentrator or an iron core. The magnetic conductive component may be used to form a magnetic field loop. The magnetic conductive component may adjust the distribution of a magnetic field (e.g., the second magnetic field generated by the first magnetic component 4202). In some embodiments, the magnetic conductive component may include a soft magnetic material. Exemplary soft magnetic materials may include a metal material, a metal alloy material, a metal oxide material, an amorphous metal material, or the like. For example, the soft magnetic material may include iron, iron-silicon based alloy, iron-aluminum based alloy, nickel-iron based alloy, iron-cobalt based alloy, low carbon steel, silicon steel sheet, silicon steel sheet, ferrite, or the like. In some embodiments, the magnetic conductive component may be manufactured by, for example, casting, plastic processing, cutting processing, powder metallurgy, or the like, or any combination thereof. The casting may include sand casting, investment casting, pressure casting, centrifugal casting, or the like. The plastic processing may include rolling, casting, forging, stamping, extrusion, drawing, or the like, or any combination thereof. The cutting processing may include turning, milling, planning, grinding, or the like. In some embodiments, the magnetic conductive component may be manufactured by a 3D printing technique, a computer numerical control machine tool, or the like.

In some embodiments, one or more of the first magnetic component 4202, the first magnetic conductive component 4204, and the second magnetic conductive component 4206 may have an axisymmetric structure. The axisymmetric structure may include a ring structure, a columnar structure, or other axisymmetric structures. For example, the structure of the first magnetic component 4202 and/or the first magnetic conductive component 4204 may be a cylinder, a rectangular parallelepiped, or a hollow ring (e.g., a cross-section of the hollow ring may be the shape of a racetrack). As another example, the structure of the first magnetic component 4202 and the structure of the first magnetic conductive component 4204 may be coaxial cylinders having the same diameter or different diameters. In some embodiments, the second magnetic conductive component 4206 may have a groove-shaped structure. The groove-shaped structure may include a U-shaped cross section (as shown in FIG. 42). The groove-shaped second magnetic conductive component 4206 may include a bottom plate and a side wall. In some embodiments, the bottom plate and the side wall may form an integral assembly. For example, the side wall may be formed by extending the bottom plate in a direction perpendicular to the bottom plate. In some embodiments, the bottom plate may be mechanically connected to the side wall. As used herein, a mechanical connection between two components may include a bonded connection, a locking connection, a welded connection, a rivet connection, a bolted connection, or the like, or any combination thereof.

The second magnetic component 4208 may have a shape of a ring or a sheet. For example, the second magnetic component 4208 may have a ring shape. The second magnetic component 4208 may include an inner ring and an outer ring. In some embodiments, the shape of the inner ring and/or the outer ring may be a circle, an ellipse, a triangle, a quadrangle, or any other polygon. In some embodiments, the second magnetic component 4208 may include a plurality of magnets. Two ends of a magnet of the plurality of magnets may be mechanically connected to or have a certain distance from the ends of an adjacent magnet. The distance between the adjacent magnets may be the same or different. For example, the second magnetic component 4208 may include two or three sheet-like magnets which are arranged equidistantly. The shape of a sheet-like magnet may be a fan shape, a quadrangular shape, or the like. In some embodiments, the second magnetic component 4208 may be coaxial with the first magnetic component 4202 and/or the first magnetic conductive component 4204.

In some embodiments, an upper surface of the first magnetic component 4202 may be mechanically connected to a lower surface of the first magnetic conductive component 4204 as shown in FIG. 42. A lower surface of the first magnetic component 4202 may be mechanically connected to the bottom plate of the second magnetic conductive component 4206. A lower surface of the second magnetic component 4208 may be mechanically connected to the side wall of the second magnetic conductive component 4206.

In some embodiments, a magnetic gap may be formed between the first magnetic component 4202 (and/or the first magnetic conductive component 4204) and the inner ring of the second magnetic component 4208 (and/or the second magnetic conductive component 4206). The voice coil 4238 may be disposed in the magnetic gap and mechanically connected to the vibration plate 4205. A voice coil refers to an element that may transmit an audio signal. The voice coil 4238 may be located in a magnetic field formed by the first magnetic component 4202, the first magnetic conductive component 4204, the second magnetic conductive component 4206, and the second magnetic component 4208. When a current is applied to the voice coil 4238, the ampere force generated by the magnetic field may drive the voice coil 4238 to vibrate. The vibration of the voice coil 4238 may drive the vibration plate 4205 to vibrate to generate sound waves, which may be transmitted to a user's ears via air conduction and/or the bone conduction. In some embodiments, the distance between the bottom of the voice coil 4238 and the second magnetic conductive component 4206 may be equal to that between the bottom of the second magnetic component 4208 and the second magnetic conductive component 4206.

In some embodiments, for a speaker device having a single magnetic component, the magnetic induction lines passing through the voice coil 4238 may be uneven and divergent. A magnetic leakage may be formed in the magnetic system, that is, some magnetic induction lines may leak outside the magnetic gap and fail to pass through the voice coil 4238. This may result in a decrease in a magnetic induction intensity (or a magnetic field intensity) at the voice coil 4238, and affect the sensitivity of the acoustic output apparatus 4200. To eliminate or reduce the magnetic leakage, the acoustic output apparatus 4200 may further include at least one second magnetic component and/or at least one third magnetic conductive component (not shown in the figure). The at least one second magnetic component and/or at least one third magnetic conductive component may suppress the magnetic leakage and restrict the shape of the magnetic induction lines passing through the voice coil 4238, so that more magnetic induction lines may pass through the voice coil 4238 horizontally and densely to enhance the magnetic induction intensity (or the magnetic field intensity) at the voice coil 4238. The sensitivity and the mechanical conversion efficiency of the acoustic output apparatus 4200 (i.e., the efficiency of converting an electric energy into a mechanical energy of the vibration of the voice coil 4238) may be improved.

In some embodiments, the magnetic field intensity (or referred to as a magnetic induction intensity or a magnetic induction lines density) of the first total magnetic field within the magnetic gap may be greater than that of the second magnetic field within the magnetic gap. In some embodiments, the second magnetic component 4208 may generate a third magnetic field, and the third magnetic field may increase the magnetic field intensity of the first total magnetic field within the magnetic gap. The third magnetic field increasing the magnetic field intensity of the first total magnetic field within the magnetic gap refers to that the magnetic field intensity of the first total magnetic field when the third magnetic field exists (i.e., a magnetic system includes the second magnetic component 4208) is greater than that when the third magnetic field doesn't exist (i.e., a magnetic system does not include the second magnetic component 4208). As used herein, unless otherwise specified, a magnetic system refers to a system that includes all magnetic component(s) and magnetic conductive component(s). The first total magnetic field refers to a magnetic field generated by the magnetic system. Each of the second magnetic field, the third magnetic field, . . . , and the $N^{th}$ magnetic field refers to a magnetic field generated by a corresponding magnetic component. Different magnetic systems may unitize a same magnetic component or different magnetic components to generate the second magnetic field (or the third magnetic field, . . . , the $N^{th}$ magnetic field).

In some embodiments, an angle (denoted as A1) between the magnetization direction of the first magnetic component 4202 and the magnetization direction of the second magnetic component 4208 may be in a range from 0 degree to 180 degrees. For example, the angle A1 may be in a range from 45 degrees to 135 degrees. As another example, the angle A1 may be equal to or greater than 90 degrees. In some embodiments, the magnetization direction of the first magnetic component 4202 may be parallel to an upward direction (as indicated by an arrow a in FIG. 42) that is perpendicular to the lower surface or the upper surface of the first magnetic component 4202. The magnetization direction of the second magnetic component 4208 may be parallel to a direction directed from the inner ring to the outer ring of the second magnetic component 4208 (as indicated by an arrow b as shown in FIG. 42 that is on the right side of the first magnetic component 4202, which can be obtained by rotating the magnetization direction of the first magnetic component 4202 by 90 degrees clockwise). The magnetization direction of the second magnetic component 4208 may be perpendicular to that of the first magnetic component 4202.

In some embodiments, at the position of the second magnetic component 4208, an angle (denoted as A2) between the direction of the first total magnetic field and the magnetization direction of the second magnetic component 4208 may be not greater than 90 degrees. In some embodiments, at the position of the second magnetic component 4208, an angle (denoted as A3) between the direction of the magnetic field generated by the first magnetic component 4202 and the magnetization direction of the second magnetic component 4208 may be less than or equal to 90 degrees, such as 0 degree, 10 degrees, or 20 degrees. Compared with a magnetic system with a single magnetic component, the second magnetic component 4208 may increase the total magnetic induction lines within the magnetic gap of the magnetic system of the acoustic output apparatus 4200, thereby increasing the magnetic induction intensity within the magnetic gap. In addition, due to the second magnetic component 4208, the originally scattered magnetic induction lines may be converged to the position of the magnetic gap, which may further increase the magnetic induction intensity within the magnetic gap.

Figure 43:
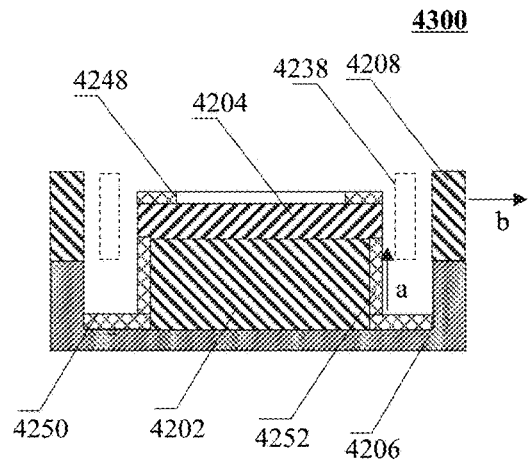
FIG. 43 is a schematic diagram illustrating a longitudinal sectional view of an exemplary magnetic system according to some embodiments of the present disclosure.

FIG. 43 is a schematic diagram illustrating a longitudinal sectional view of an exemplary magnetic system 4300 according to some embodiments of the present disclosure. As shown in FIG. 43, different from the magnetic system of the acoustic output apparatus 4200, the magnetic system 4300 may further include at least one electric conductive component (e.g., a first electric conductive component 4248, a second electric conductive component 4250, and a third electric conductive component 4252).

In some embodiments, an electric conductive component may include a metal material, a metal alloy material, an inorganic non-metallic material, or other conductive material. Exemplary metal material may include gold, silver, copper, aluminum, or the like. Exemplary metal alloy material may include an iron-based alloy material, an aluminum-based alloy material, a copper-based alloy material, a zinc-based alloy material, or the like. Exemplary inorganic non-metallic material may include graphite, or the like. An electric conductive component may have a shape of a sheet, a ring, a mesh, or the like. The first electric conductive component 4248 may be disposed on the upper surface of the first magnetic conductive component 4204. The second electric conductive component 4250 may be mechanically connected to the first magnetic component 4202 and the second magnetic conductive component 4206. The third electric conductive component 4252 may be mechanically connected to the side wall of the first magnetic component 4202. In some embodiments, the first magnetic conductive component 4204 may protrude from the first magnetic component 4202 to form a first recess at the right side of the first magnetic component 4202 as shown in FIG. 43. The third electric conductive component 4252 may be disposed at the first recess. In some embodiments, the first electric conductive component 4248, the second electric conductive component 4250, and the third electric conductive component 4252 may include the same or different conductive materials.

In some embodiments, a magnetic gap may be formed between the first magnetic component 4202, the first magnetic conductive component 4204, and the inner ring of the second magnetic component 4208. The voice coil 4238 may be disposed in the magnetic gap. The first magnetic component 4202, the first magnetic conductive component 4204, the second magnetic conductive component 4206, and the second magnetic component 4208 may form the magnetic system 4300. In some embodiments, the electric conductive components of the magnetic system 4300 may reduce an inductive reactance of the voice coil 4238. For example, if a first alternating current is applied to the voice coil 4238, a first alternating magnetic field may be generated near the voice coil 4238. Under the action of the magnetic field of the magnetic system 4300, the first alternating magnetic field may cause the voice coil 4238 to generate an inductive reactance and hinder the movement of the voice coil 4238. One or more electric conductive components (e.g., the first electric conductive component 4248, the second electric conductive component 4250, and the third electric conductive component 4252) disposed near the voice coil 4238 may induce a second alternating current under the action of the first alternating magnetic field. The second alternating current induced by the electric conductive component(s) may generate a second alternating induction magnetic field in its vicinity. The direction of the second alternating magnetic field may be opposite to that of the first alternating magnetic field, and the first alternating magnetic field may be weakened. The inductive reactance of the voice coil 4238 may be reduced, the current in the voice coil 4238 may be increased, and the sensitivity of the acoustic output apparatus may be improved.

Figure 44:
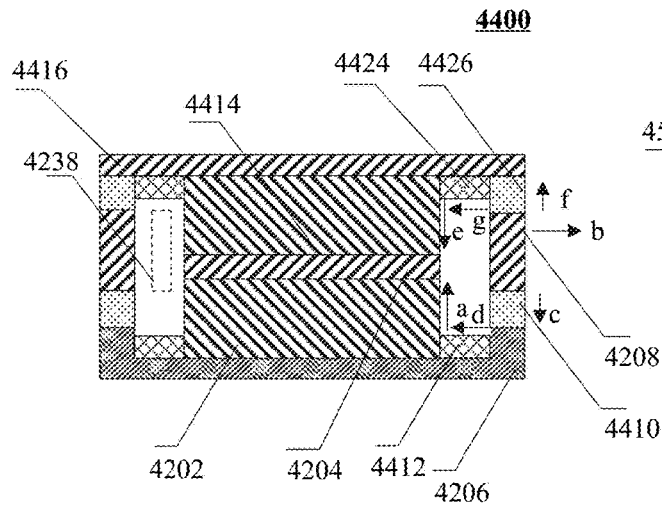
FIG. 44 is a schematic diagram illustrating a longitudinal sectional view of an exemplary magnetic system according to some embodiments of the present disclosure.

FIG. 44 is a schematic diagram illustrating a longitudinal sectional view of an exemplary magnetic system 4400 according to some embodiments of the present disclosure. As shown in FIG. 44, different from the magnetic system of the acoustic output apparatus 4200, the magnetic system 4400 may further include a third magnetic component 4410, a fourth magnetic component 4412, a fifth magnetic component 4414, a third magnetic conductive component 4416, a sixth magnetic component 4424, and a seventh magnetic component 4426. In some embodiments, the third magnetic component 4410, the fourth magnetic component 4412, the fifth magnetic component 4414, the third magnetic conductive component 4416, the sixth magnetic component 4424, and the seventh magnetic component 4426 may be coaxial circular cylinders.

In some embodiments, the upper surface of the second magnetic component 4208 may be mechanically connected to the seventh magnetic component 4426, and the lower surface of the second magnetic component 4208 may be mechanically connected to the third magnetic component 4410. The third magnetic component 4410 may be mechanically connected to the second magnetic conductive component 4206. An upper surface of the seventh magnetic component 4426 may be mechanically connected to the third magnetic conductive component 4416. The fourth magnetic component 4412 may be mechanically connected to the second magnetic conductive component 4206 and the first magnetic component 4202. The sixth magnetic component 4424 may be mechanically connected to the fifth magnetic component 4414, the third magnetic conductive component 4416, and the seventh magnetic component 4426. In some embodiments, the first magnetic component 4202, the first magnetic conductive component 4204, the second magnetic conductive component 4206, the second magnetic component 4208, the third magnetic component 4410, the fourth magnetic component 4412, the fifth magnetic component 4414, the third magnetic conductive component 4416, the sixth magnetic component 4424, and the seventh magnetic component 4426 may form a magnetic loop and a magnetic gap.

In some embodiments, an angle (denoted as A4) between the magnetization direction of the first magnetic component 4202 and the magnetization direction of the sixth magnetic component 4424 may be in a range from 0 degree to 180 degrees. For example, the angle A4 may be in a range from 45 degrees to 135 degrees. As another example, the angle A4 may be not greater than 90 degrees. In some embodiments, the magnetization direction of the first magnetic component 4202 may be parallel to an upward direction (as indicated by an arrow a in FIG. 44) that is perpendicular to the lower surface or the upper surface of the first magnetic component 4202. The magnetization direction of the sixth magnetic component 4424 may be parallel to a direction directed from the outer ring to the inner ring of the sixth magnetic component 4424 (as indicated by an arrow g in FIG. 44 that is on the right side of the first magnetic component 4202 after the magnetization direction of the first magnetic component 4202 rotates 270 degrees clockwise). In some embodiments, the magnetization direction of the sixth magnetic component 4424 may be the same as that of the fourth magnetic component 4412.

In some embodiments, at the position of the sixth magnetic component 4424, an angle (denoted as A5) between the direction of a magnetic field generated by the magnetic system 4400 and the magnetization direction of the sixth magnetic component 4424 may be not greater than 90 degrees. In some embodiments, at the position of the sixth magnetic component 4424, an angle (denoted as A6) between the direction of the magnetic field generated by the first magnetic component 4202 and the magnetization direction of the sixth magnetic component 4424 may be less than or equal to 90 degrees, such as 0 degree, 10 degrees, or 20 degrees.

In some embodiments, an angle (denoted as A7) between the magnetization direction of the first magnetic component 4202 and the magnetization direction of the seventh magnetic component 4426 may be in a range from 0 degree to 180 degrees. For example, the angle A7 may be in a range from 45 degrees to 135 degrees. As another example, the angle A7 may be not greater than 90 degrees. In some embodiments, the magnetization direction of the first magnetic component 4202 may be parallel to an upward direction (as indicated by an arrow a in FIG. 44) that is perpendicular to the lower surface or the upper surface of the first magnetic component 4202. The magnetization direction of the seventh magnetic component 4426 may be parallel to a direction directed from a lower surface to an upper surface of the seventh magnetic component 4426 (as indicated by an arrow fin FIG. 44 that is on the right side of the first magnetic component 4202 after the magnetization direction of the first magnetic component 4202 rotates 360 degrees clockwise). In some embodiments, the magnetization direction of the seventh magnetic component 4426 may be opposite to that of the third magnetic component 4410.

In some embodiments, at the seventh magnetic component 4426, an angle (denoted as A8) between the direction of the magnetic field generated by the magnetic system 4400 and the magnetization direction of the seventh magnetic component 4426 may be not greater than 90 degrees. In some embodiments, at the position of the seventh magnetic component 4426, an angle (denoted as A9) between the direction of the magnetic field generated by the first magnetic component 4202 and the magnetization direction of the seventh magnetic component 4426 may be less than or equal to 90 degrees, such as 0 degree, 10 degrees, or 20 degrees.

In the magnetic system 4400, the third magnetic conductive component 4416 may close the magnetic field loops generated by the magnetic system 4400, so that more magnetic induction lines may be concentrated in the magnetic gap. This may suppress the magnetic leakage, increase the magnetic induction intensity within the magnetic gap, and improve the sensitivity of the acoustic output apparatus.

Figure 45:
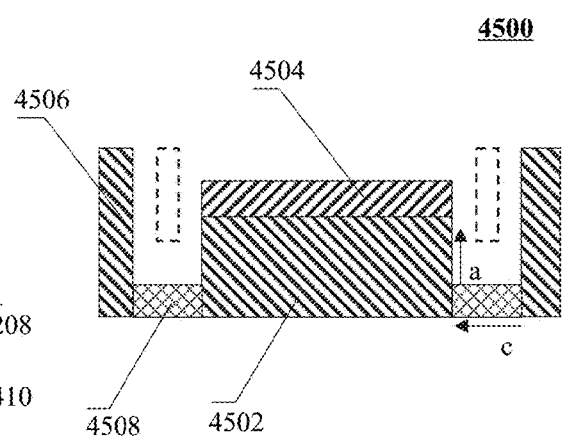
FIG. 45 is a schematic diagram illustrating a longitudinal sectional view of an exemplary magnetic system according to some embodiments of the present disclosure.

FIG. 45 is a schematic diagram illustrating a longitudinal sectional view of an exemplary magnetic system 4500 according to some embodiments of the present disclosure. As shown in FIG. 45, the magnetic system 4500 may include a first magnetic component 4502, a first magnetic conductive component 4504, a first magnetic field changing component 4506, and a second magnetic component 4508.

In some embodiments, an upper surface of the first magnetic component 4502 may be mechanically connected to the lower surface of the first magnetic conductive component 4504. The second magnetic component 4508 may be mechanically connected to the first magnetic component 4502 and the first magnetic field changing component 4506. Two or more of the first magnetic component 4502, the first magnetic conductive component 4504, the first magnetic field changing component 4506, and/or the second magnetic component 4508 may be connected to each other via a mechanical connection as described elsewhere in this disclosure (e.g., FIG. 42 and the relevant descriptions). In some embodiments, the first magnetic component 4502, the first magnetic conductive component 4504, the first magnetic field changing component 4506, and/or the second magnetic component 4508 may form a magnetic field loop and a magnetic gap.

In some embodiments, the magnetic system 4500 may generate a first total magnetic field, and the first magnetic component 4502 may generate a second magnetic field. The magnetic field intensity of the first total magnetic field within the magnetic gap may be greater than that of the second magnetic field within the magnetic gap. In some embodiments, the second magnetic component 4508 may generate a third magnetic field, and the third magnetic field may increase the intensity of the magnetic field of the second magnetic field at the magnetic gap.

In some embodiments, an angle (denoted as A10) between the magnetization direction of the first magnetic component 4502 and the magnetization direction of the second magnetic component 4508 may be in a range from 0 degree to 180 degrees. For example, the angle A10 may be in a range from 45 degrees to 135 degrees. As another example, the angle A10 may be not greater than 90 degrees.

In some embodiments, at the position of the second magnetic component 4508, an angle (denoted as A11) between the direction of the first total magnetic field and the magnetization direction of the second magnetic component 4508 may be not greater than 90 degrees. In some embodiments, at the position of the second magnetic component 4508, an angle (denoted as A12) between the direction of the second magnetic field generated by the first magnetic component 4502 and the magnetization direction of the second magnetic component 4508 may be less than or equal to 90 degrees, such as 0 degree, 10 degrees, and 20 degrees. In some embodiments, the magnetization direction of the first magnetic component 4502 may be parallel to an upward direction (as indicated by an arrow a in FIG. 45) that is perpendicular to the lower surface or the upper surface of the first magnetic component 4502. The magnetization direction of the second magnetic component 4508 may be parallel to a direction directed from the outer ring to the inner ring of the second magnetic component 4508 (as indicated by an arrow c in FIG. 45 that is on the right side of the first magnetic component 4502 after the magnetization direction of the first magnetic component 4502 rotates 90 degrees clockwise). Compared with a magnetic system with a single magnetic component, the first magnetic field changing component 4506 in the magnetic system 4500 may increase the total magnetic induction lines within the magnetic gap, thereby increasing the magnetic induction intensity within the magnetic gap. In addition, due to the first magnetic field changing component 4506, the originally scattered magnetic induction lines may be converged to the position of the magnetic gap, which may further increase the magnetic induction intensity within the magnetic gap.

Figure 46:
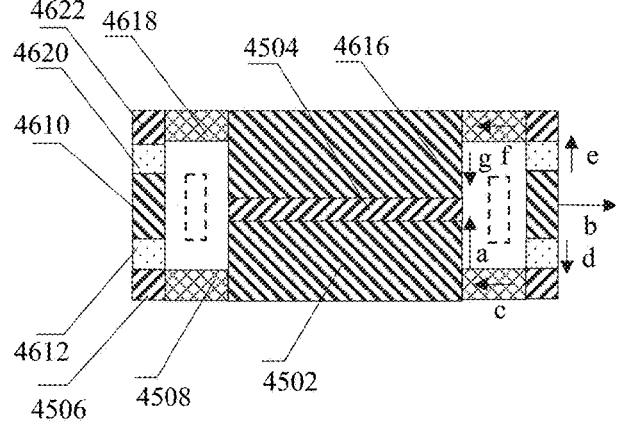
FIG. 46 is a schematic diagram illustrating a longitudinal sectional view of an exemplary magnetic system according to some embodiments of the present disclosure.

FIG. 46 is a schematic diagram illustrating a longitudinal sectional view of an exemplary magnetic system 4600 according to some embodiments of the present disclosure. As shown in FIG. 46, in some embodiments, the magnetic system 4600 may include a first magnetic component 4502, a first magnetic conductive component 4504, a first magnetic field changing component 4506, a second magnetic component 4508, a third magnetic component 4610, a fourth magnetic component 4612, a fifth magnetic component 4616, a sixth magnetic component 4618, a seventh magnetic component 4620, and a second ring component 4622. In some embodiments, the first magnetic field changing component 4506 and/or the second ring component 4622 may include a ring-shaped magnetic component or a ring-shaped magnetic conductive component.

A ring-shaped magnetic component may include any one or more magnetic materials as described elsewhere in this disclosure (e.g., FIG. 42 and the relevant descriptions). A ring-shaped magnetic conductive component may include any one or more magnetically conductive materials described in the present disclosure (e.g., FIG. 42 and the relevant descriptions).

In some embodiments, the sixth magnetic component 4618 may be mechanically connected to the fifth magnetic component 4616 and the second ring component 4622. The seventh magnetic component 4620 may be mechanically connected to the third magnetic component 4610 and the second ring component 4622. In some embodiments, one or more of the first magnetic component 4502, the fifth magnetic component 4616, the second magnetic component 4508, the third magnetic component 4610, the fourth magnetic component 4612, the sixth magnetic component 4618, the seventh magnetic component 4620, the first magnetic conductive component 4504, the first magnetic field changing component 4506, and the second ring component 4622 may form a magnetic field loop.

In some embodiments, an angle (denoted as A13) between the magnetization direction of the first magnetic component 4502 and the magnetization direction of the sixth magnetic component 4618 may be in a range from 0 degree and 180 degrees. For example, the angle A13 may be in a range from 45 degrees to 135 degrees. As another example, the angle A13 may be not greater than 90 degrees. In some embodiments, the magnetization direction of the first magnetic component 4502 may be parallel to an upward direction (as indicated by an arrow a in FIG. 46) that is perpendicular to the lower surface or the upper surface of the first magnetic component 4502. The magnetization direction of the sixth magnetic component 4618 may be parallel to a direction directed from the outer ring to the inner ring of the sixth magnetic component 4618 (as indicated by an arrow f in FIG. 46 that is on the right side of the first magnetic component 4502 after the magnetization direction of the first magnetic component 4202 rotates 270 degrees clockwise). In some embodiments, the magnetization direction of the sixth magnetic component 4618 may be the same as that of the second magnetic component 4508. The magnetization direction of the seventh magnetic component 4620 may be parallel to a direction directed from the lower surface to the upper surface of the seventh magnetic component 4620 (as indicated by an arrow e in FIG. 46 that is on the right side of the first magnetic component 4502 after the magnetization direction of the first magnetic component 4502 rotates 90 degrees clockwise). In some embodiments, the magnetization direction of the seventh magnetic component 4620 may be the same as that of the fourth magnetic component 4612.

In some embodiments, at the position of the sixth magnetic component 4618, an angle (denoted as A14) between the direction of the magnetic field generated by the magnetic system 4600 and the magnetization direction of the sixth magnetic component 4618 may be not greater than 90 degrees. In some embodiments, at the position of the sixth magnetic component 4618, an angle (denoted as A15) between the direction of the magnetic field generated by the first magnetic component 4502 and the magnetization direction of the sixth magnetic component 4618 may be less than or equal to 90 degrees, such as 0 degree, 10 degrees, and 20 degrees.

In some embodiments, an angle (denoted as A16) between the magnetization direction of the first magnetic component 4502 and the magnetization direction of the seventh magnetic component 4620 may be in a range from 0 degree and 180 degrees. For example, the angle A16 may be in a range from 45 degrees to 135 degrees. As another example, the angle A16 may be not greater than 90 degrees.

In some embodiments, at the position of the seventh magnetic component 4620, an angle (denoted as A17) between the direction of the magnetic field generated by the magnetic system 4600 and the magnetization direction of the seventh magnetic component 4620 may be not greater than 90 degrees. In some embodiments, at the position of the seventh magnetic component 4620, an angle (denoted as A18) between the direction of the magnetic field generated by the first magnetic component 4502 and the magnetization direction of the seventh magnetic component 4620 may be less than or equal to 90 degrees, such as 0 degree, 10 degrees, and 20 degrees.

In some embodiments, the first magnetic field changing component 4506 may be a ring-shaped magnetic component. The magnetization direction of the first magnetic field changing component 4506 may be the same as that of the second magnetic component 4508 or the fourth magnetic component 4612. For example, on the right side of the first magnetic component 4502, the magnetization direction of the first magnetic field changing component 4506 may be parallel to a direction directed from the outer ring to the inner ring of the first magnetic field changing component 4506. In some embodiments, the second ring component 4622 may be a ring-shaped magnetic component. The magnetization direction of the second ring component 4622 may be the same as that of the sixth magnetic component 4618 or the seventh magnetic component 4620. For example, on the right side of the first magnetic component 4502, the magnetization direction of the second ring component 4622 may be parallel to a direction directed from the outer ring to the inner ring of the second ring component 4622. In the magnetic system 4600, the plurality of magnetic components may increase the total magnetic induction lines, and different magnetic components may interact, which may suppress the leakage of the magnetic induction lines, increase the magnetic induction intensity within the magnetic gap, and improve the sensitivity of the acoustic output apparatus.

In some embodiments, the magnetic system 4600 may further include a magnetic conductive cover. The magnetic conductive cover may include one or more magnetic conductive materials (e.g., low carbon steel, silicon steel sheet, silicon steel sheet, ferrite, etc.) described in the present disclosure. For example, the magnetic conductive cover may be mechanically connected to the first magnetic component 4502, the first magnetic field changing component 4506, the second magnetic component 4508, the third magnetic component 4610, the fourth magnetic component 4612, the fifth magnetic component 4616, the sixth magnetic component 4618, the seventh magnetic component 4620, and the second ring component 4622. In some embodiments, the magnetic conductive cover may include at least one bottom plate and a side wall. The side wall may have a ring structure. The at least one bottom plate and the side wall may form an integral assembly. Alternatively, the at least one bottom plate may be mechanically connected to the side wall via one or more mechanical connections as described elsewhere in the present disclosure. For example, the magnetic conductive cover may include a first base plate, a second base plate, and a side wall. The first bottom plate and the side wall may form an integral assembly, and the second bottom plate may be mechanically connected to the side wall via one or more mechanical connections described elsewhere in the present disclosure.

In the magnetic system 4500, the magnetic conductive cover may close the magnetic field loops generated by the magnetic system 4500, so that more magnetic induction lines may be concentrated in the magnetic gap in the magnetic system 4500. This may suppress the magnetic leakage, increase the magnetic induction intensity at the magnetic gap, and improve the sensitivity of the acoustic output apparatus.

In some embodiments, the magnetic system 4500 may further include one or more electric conductive components (e.g., a first electric conductive component, a second electric conductive component, and a third electric conductive component). The one or more electric conductive components may be similar to the first electric conductive component 4248, the second electric conductive component 4250, and the third electric conductive component 4252 as described in connection with FIG. 43.

Figure 47:
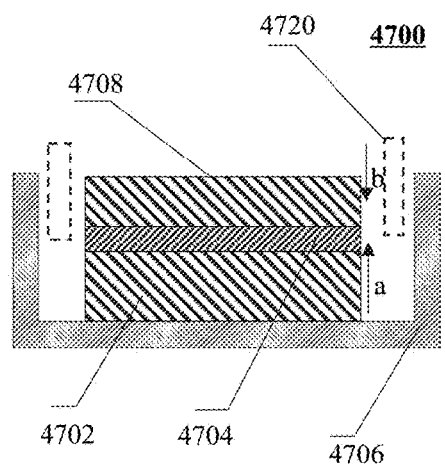
FIG. 47 is a schematic diagram illustrating a longitudinal sectional view of an exemplary magnetic system according to some embodiments of the present disclosure.

FIG. 47 is a schematic diagram illustrating a longitudinal sectional view of an exemplary magnetic system 4700 according to some embodiments of the present disclosure. As shown in FIG. 47, the magnetic system 4700 may include a first magnetic component 4702, a first magnetic conductive component 4704, a second magnetic conductive component 4706, and a second magnetic component 4708.

In some embodiments, the first magnetic component 4702 and/or the second magnetic component 4708 may include one or more of the magnets described in the present disclosure. In some embodiments, the first magnetic component 4702 may include a first magnet, and the second magnetic component 4708 may include a second magnet. The first magnet and the second magnet may be the same or different. The first magnetic conductive component 4704 and/or the second magnetic conductive component 4706 may include one or more magnetic conductive materials described in the present disclosure. The first magnetic conductive component 4704 and/or the second magnetic conductive component 4706 may be manufactured by one or more processing methods described in the present disclosure. In some embodiments, the first magnetic component 4702, the first magnetic conductive component 4704, and/or the second magnetic component 4708 may have an axisymmetric structure. For example, each of the first magnetic component 4702, the first magnetic conductive component 4704, and/or the second magnetic component 4708 may be a cylinder. In some embodiments, the first magnetic component 4702, the first magnetic conductive component 4704, and/or the second magnetic component 4708 may be coaxial cylinders containing the same or different diameters. The thickness of the first magnetic component 4702 may be greater than or equal to that of the second magnetic component 4708. In some embodiments, the second magnetic conductive component 4706 may have a groove-shaped structure. In some embodiments, the groove-shaped structure may include a U-shaped cross section. The groove-shaped second magnetic conductive component 4706 may include a bottom plate and a sidewall. In some embodiments, the bottom plate and the side wall may form an integral assembly. For example, the side wall may be formed by extending the bottom plate in a direction perpendicular to the bottom plate. In some embodiments, the bottom plate may be mechanically connected to the side wall via a mechanical connection as described elsewhere in this disclosure (e.g., FIG. 42 and the relevant descriptions). The second magnetic component 4708 may have a shape of a ring or a sheet. The shape of the second magnetic component 4708 may be similar to that of the second magnetic component 4208 as described in connection with FIG. 43. In some embodiments, the second magnetic component 4708 may be coaxial with the first magnetic component 4702 and/or the first magnetic conductive component 4704.

In some embodiments, an upper surface of the first magnetic component 4702 may be mechanically connected to a lower surface of the first magnetic conductive component 4704. A lower surface of the first magnetic component 4702 may be mechanically connected to the bottom plate of the second magnetic conductive component 4706. A lower surface of the second magnetic component 4708 may be mechanically connected to an upper surface of the first magnetic conductive component 4704. Two or more of the first magnetic component 4702, the first magnetic conductive component 4704, the second magnetic conductive component 4706, and/or the second magnetic component 4708 may be connected to each other via a mechanical connection as described elsewhere in this disclosure (e.g., FIG. 20 and the relevant descriptions).

In some embodiments, a magnetic gap may be formed between the first magnetic component 4702, the first magnetic conductive component 4704, the second magnetic component 4708 and a sidewall of the second magnetic conductive component 4706. A voice coil 4720 may be disposed in a magnetic gap. In some embodiments, the first magnetic component 4702, the first magnetic conductive component 4704, the second magnetic conductive component 4706, and the second magnetic component 4708 may form a magnetic field loop. In some embodiments, the magnetic system 4700 may generate a first total magnetic field, and the first magnetic component 4702 may generate a second magnetic field. The first total magnetic field may be formed by all magnetic fields generated by all components of the magnetic system 4700 (e.g., the first magnetic component 4702, the first magnetic conductive component 4704, the second magnetic conductive component 4706, and the second magnetic component 4708). The intensity of the magnetic field (or referred to as a magnetic induction intensity or a magnetic induction lines density) within the magnetic gap of the first total magnetic field may be greater than the intensity of the magnetic field within the magnetic gap of the second magnetic field. In some embodiments, the second magnetic component 4708 may generate a third magnetic field, and the third magnetic field may increase the intensity of the magnetic field of the second magnetic field within the magnetic gap.

In some embodiments, an angle (denoted as A19) between the magnetization direction of the second magnetic component 4708 and the magnetization direction of the first magnetic component 4702 may be in a range from 90 degrees and 180 degrees. For example, the angle A10 may be in a range from 150 degrees to 180 degrees. Merely by way of example, the magnetization direction of the second magnetic component 4708 (as indicated by an arrow b in FIG. 47) may be opposite to the magnetization direction of the first magnetic component 4702 (as indicated by an arrow a in FIG. 47).

Compared with the magnetic system with a single magnetic component, the magnetic system 4700 includes a second magnetic component 4708. The second magnetic component 4708 may have a magnetization direction opposite to that of the first magnetic component 4702, which may suppress the magnetic leakage of the first magnetic component 4702 in its magnetization direction, so that more magnetic induction lines generated by the first magnetic component 4702 may be concentrated in the magnetic gap, thereby increasing the magnetic induction intensity within the magnetic gap.

Figure 48:
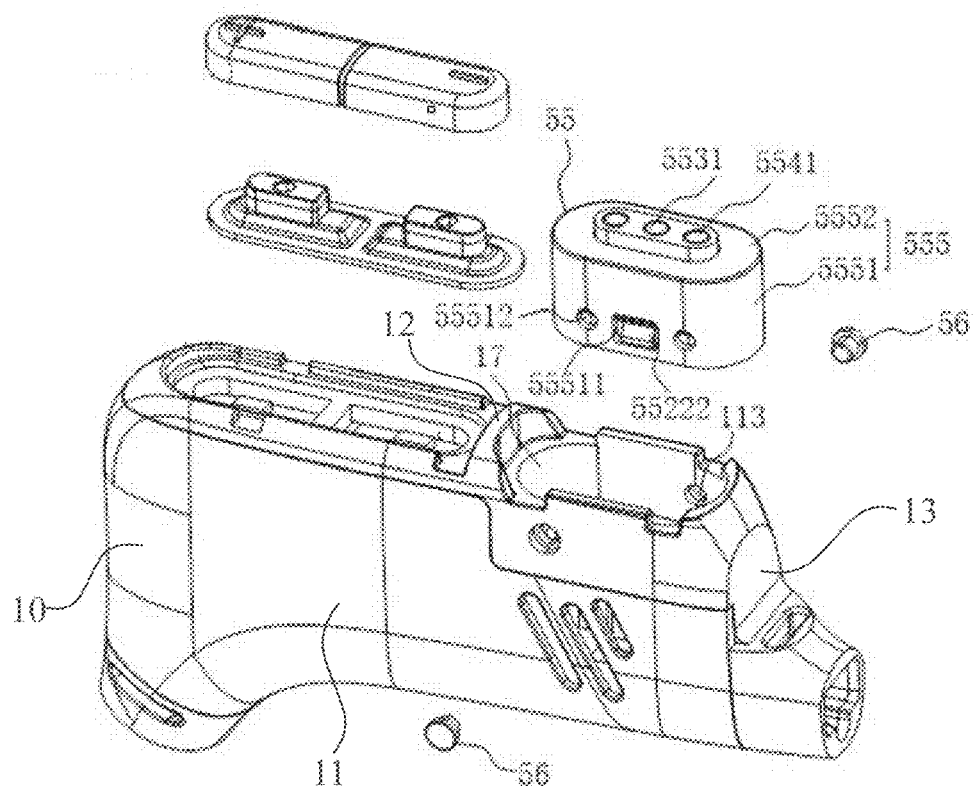
FIG. 48 illustrates an exploded view of a portion of an acoustic output apparatus according to some embodiments of the present disclosure.
Figure 49:
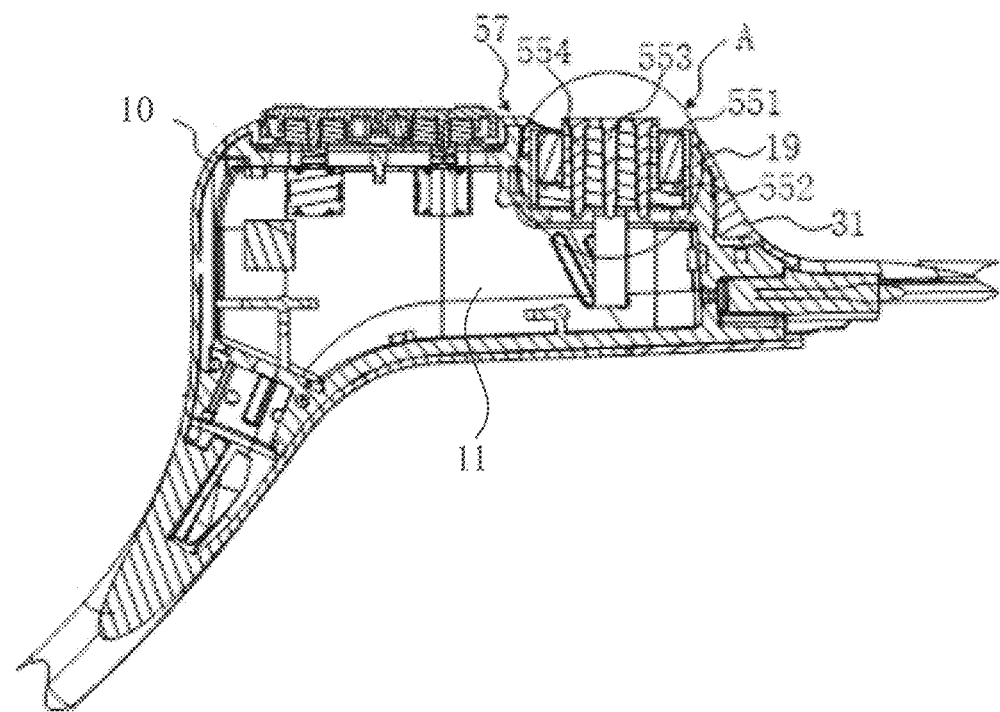
FIG. 49 illustrates a cross-sectional view of the portion of the acoustic output apparatus in FIG. 48 according to some embodiments of the present disclosure.

FIG. 48 illustrates an exploded view of a portion of an acoustic output apparatus according to some embodiments of the present disclosure. FIG. 49 illustrates a cross-sectional view of the portion of the acoustic output apparatus in FIG. 48 according to some embodiments of the present disclosure. As shown in FIG. 48 and FIG. 49, the acoustic output apparatus may include a magnetic connector 55. The magnetic connector 55 may be used together with a power interface of a charger to charge the acoustic output apparatus. For example, when charging the acoustic output apparatus, the magnetic connector 55 and the power interface of the charger may match each other and be adsorbed together to establish an electrical connection to charge the acoustic output apparatus. In some embodiments, the magnetic connector 55 may include a magnetic adsorption ring 551, an insulation base 552, and a plurality of terminals (e.g., a first terminal 553, and a second terminal 554).

The magnetic adsorption ring 551 may be a magnet, and the magnetic polarities of an outer end and an inner end may be different. As used herein, an outer end of a component of an acoustic output apparatus refers to an end that is closer to the environment of the acoustic output apparatus (e.g., exposed from the acoustic output apparatus), and an inner end of the component refers to an end that is further from the environment of the acoustic output apparatus (e.g., located inside the acoustic output apparatus). The power interface of the charger may have a magnetic adsorption structure that matches the magnetic adsorption ring 551. The magnetic adsorption structure may include one or more magnetic materials. For example, the magnetic adsorption structure may include iron and/or one or more other materials without polarity, which may be adsorbed with the magnetic adsorption ring 551 whether the outer end of the magnetic adsorption ring 551 is the south pole or the north pole. As another example, the magnetic adsorption structure may also include a magnet and/or one or more other materials with polarity. The magnetic adsorption ring 551 and the magnetic adsorption structure may be adsorbed together only when the magnetic polarity of the outer end of the magnetic adsorption structure and the magnetic polarity of the outer end of the magnetic adsorption ring 551 are opposite. When the magnetic connector 55 and the power interface are adsorbed with each other, a terminal of the magnetic connector 55 may contact a corresponding terminal of the power interface, and an electrical connection may be established between the magnetic connector 55 and the power interface.

The outer end of the magnetic adsorption ring 551 may have any suitable shape. For example, the outer end of the magnetic adsorption ring 551 may have a ring shape. The magnetic adsorption ring 551 and the magnetic adsorption structure of the power interface may be adsorbed together via the ring-shaped outer end. Due to the hollow design of the ring-shaped outer end, the magnetic adsorption ring 551 may be adsorbed with the power interface by magnetic forces in different directions. This may improve the stability of the electrical connection between the magnetic adsorption ring 551 and the power interface of the charger.

Figure 50:
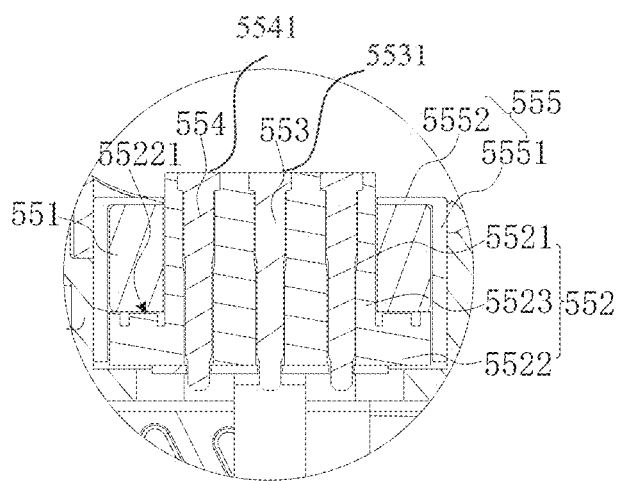
FIG. 50 illustrates a partially enlarged view of a portion A of the magnetic connector in FIG. 49 according to some embodiments of the present disclosure.

FIG. 50 illustrates a partial enlarged view of a portion A of the magnetic connector 55 in FIG. 49 according to some embodiments of the present disclosure. In some embodiments, at least part of the insulation base 552 may be inserted into the magnetic adsorption ring 551 to fix the magnetic adsorption ring 551. The insulation base 552 may include at least two accommodation holes 5521. The at least two accommodation holes 5521 may penetrate an outer end of the insulation base 552. In some embodiments, the insulation base 552 may include one or more insulating materials, such as PC or PVC.

A terminal of the magnetic connector 55 may have any suitable shape. For example, the first terminal 553 and the second terminal 554 may both have a shape of cylinder. The count of the terminals may be equal to the count of the accommodation holes 5521. Each of the terminals may be inserted into one of the accommodation holes 5521. An outer end of a terminal may be exposed from the top surface of the insulation base 552 through the corresponding accommodation hole 5521, that is, the outer end of the terminal may be visible seen from a direction facing the top surface of the insulation base 552. Optionally, the outer end of a terminal of the magnetic connector 55 may flush with the top surface of the insulation base 552 to form a contact surface. For example, as shown in FIG. 50, the first terminal 553 may form a first contact surface 5531 and the second terminal 554 may form a second contact surface 5541. The first terminal 553 and the second terminal 554 may correspond to the positive and negative terminals of the power interface, respectively. Correspondingly, the first contact surface 5531 and the second contact surface 5541 may contact with the power interface to establish an electrical connection.

In some embodiments, when the magnetic connector 55 and the power interface are adsorbed with each other, the magnetic connector 55 may be restricted by magnetic forces from different directions applied by the hollow ring-shaped magnetic adsorption ring 551. The first contact surface 5531 and the second contact surface 5541 may be accurately positioned and contact with the power interface to establish an electrical connection. This may improve the stability and accuracy of the electrical connection between the magnetic adsorption ring 551 and the power interface of the charger.

In some embodiments, the insulation base 552 may include a supporting member 5522 and an insertion member 5523. The supporting member 5522 and the insertion member 5523 may be located along a direction parallel to an axis of the accommodation hole 5521. A cross-section of the supporting member 5522 may be larger than that of the insertion member 5523, thereby forming a supporting table 55221 on the supporting member 5522 as shown in FIG. 50.

The outer side wall of the insertion member 5523 may match the inner side wall of the magnetic adsorption ring 551, such that the insertion member 5523 may be inserted into the magnetic adsorption ring 551 to fix the magnetic adsorption ring 551. An accommodation hole 5521 of the insulation base 552 may run through the insertion member 5523 and the supporting member 5522, such that the terminal accommodated in the accommodation hole 5521 may run through the entire insulation base 552. For example, the first terminal 553 may run through the entire insulation base 552. A first end of the first terminal 553 may be exposed from the outer end of the insertion member 5523 to form the first contact surface 5531. A second end of the first terminal 553 may be exposed from the inner end of the supporting member 5522 to connect with an internal circuit. Similarly, the second terminal 554 may run through the entire insulation base 552. A first end of the second terminal 554 may be exposed from the outer end of the insertion member 5523 to form the second contact surface 5541. A second end of the second terminal 554 may be exposed from the inner end of the supporting member 5522 to connect with an internal circuit.

In some embodiments, the insertion member 5523 may be inserted into the magnetic adsorption ring 551, and an inner end of the magnetic adsorption ring 551 may be supported by the support table 55221. The dimension of the magnetic adsorption ring 551 may match that of the supporting member 5522.

In some embodiments, the magnetic connector 55 may further include a housing 555. The housing 555 may be sleeved on the insulation base 552 and magnetic adsorption ring 551, so that the magnetic connector 55 may be assembled on the power interface of the acoustic output apparatus as a whole. The housing 555 may include one or more non-magnetic metal materials (e.g., copper, aluminum, and/or aluminum alloy), a plastic material, or the like, or any combination thereof.

The housing 555 may include a body 5551 and a flange 5552 located at the outer end of the body 5551. The outer end of the housing 555 may be partially open due to the flange 5552, and the inner end of the housing 555 may be a completely open. The inner surface of the body 5551 may match the outer surface of the magnetic member ring 551 and the supporting member 5522 of the insulation base 552.

The flange 5552 may cover the outer end of the magnetic adsorption ring 551. The first contact surface 5531 of the first terminal 553 and the second contact surface 5541 of the second terminal 554 may be exposed for establishing an electrical connection to the power interface.

In some embodiments, the outer end of the insertion member 5523 of the insulation base 552 may be protruded from the end of the magnetic adsorption ring 551 far from the supporting member 5522 as shown in FIG. 50. The shape of the partially opening end formed by the flange 5552 may match the shape of the periphery of the insertion member 5523, so that the end of the insertion member 5523 far from the supporting member 5522 may extend through the partially opening end of the housing 555 to the outside of the housing 555.

In some alternative embodiments, the outer end of the insertion member 5523 of the insulation base 552 may be sunken relative to the outer end of the flange 5552.

In some embodiments, the outer peripheral wall of the supporting member 5522 and the inner peripheral wall of the body 5551 may be mechanically connected to each other via a buckle connection. The buckle connection may improve the stability of the mechanical connection between the housing 555, the insulation base 552, and the magnetic adsorption ring 551, thereby improving the stability of the magnetic connector 55.

In some embodiments, two through grooves 55511 may be located on two opposite surfaces of the outer peripheral wall of the body 5551, respectively. The supporting member 5522 may include two buckles 55222 matching the two through grooves 55511. The housing 555 may be sleeved on the supporting member 5522 of the insulation base 552 via the buckle connections between the through grooves 55511 and the buckles 55222.

In some embodiments, the outer end of the magnetic adsorption ring 551 may be rotationally symmetrical with respect to a preset symmetry point (or referred to as a rotation center). When the magnetic adsorption ring 551 rotates, the first contact surface 5531 and the second contact surface 5541 may rotate together with the magnetic adsorption ring 551. The first contact surface 5531 and the second contact surface 5541 before rotating may at least partially overlap the first contact surface 5531 and the second contact surface 5541 after rotating. That is, the surface formed by the first contact surface 5531 and the second contact surface 5541 may be or close to rotationally symmetrical with respect to the same preset symmetry point. The shape of the outer end of the magnetic adsorption ring 551 and the angle of rotation symmetry may be determined based on the arrangement of the first contact surface 5531 and the second contact surface 5541. For example, the outer end of the magnetic adsorption ring 551 may have a shape of a circular ring, an elliptical ring, a rectangular ring, etc.

Due to the rotationally symmetrical shape of the outer end of the magnetic adsorption ring 551, the magnetic adsorption ring 551 may be moved back to its original position after a symmetrical rotation. The magnetic adsorption ring 551 may have at least two assembly positions relative to the first contact surface 5531 and the second contact surface 5541, and the magnetic connector 55 and the power interface may be adsorbed with each other at a plurality of rotation angles to establish an electrical connection.

Figure 51:
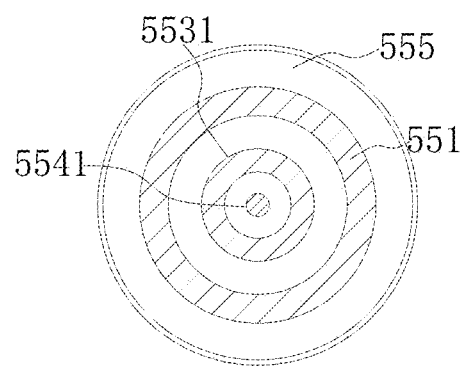
FIG. 51 is a schematic diagram illustrating a top view of an exemplary magnetic connector according to some embodiments of the present disclosure.

In some embodiments, as shown in FIG. 51, the outer end of the magnetic adsorption ring 551 may have a shape of a circular ring with the center as the symmetry point. The first contact surface 5531 and the second contact surface 5541 may respectively have a shape of a circular or a circular ring concentrically arranged with the magnetic adsorption ring 551. When the magnetic adsorption ring 551 rotates symmetrically at any angle with respect to the symmetry point, both the first contact surface 5531 and the second contact surface 5541 before rotating may completely overlap the first contact surface 5531 and the second contact surface 5541 after rotating. When the magnetic adsorption ring 551 absorbs a corresponding magnetic adsorption structure of the power interface, the first contact surface 5531 and the second contact surface 5541 may be corresponding to a positive terminal and a negative terminal of the power interface, respectively, and the magnetic connector 55 and the power interface may be adsorbed with each other without further calibration, which is convenient for users.

Figure 52:
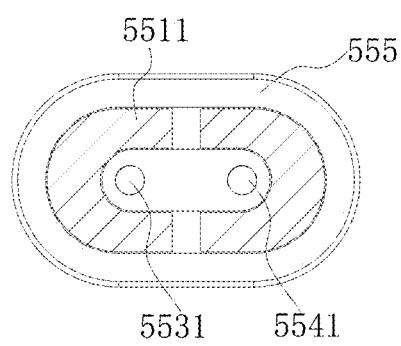

In some embodiments, as shown in FIG. 52, the count of the first contact surface 5531 may be one, and the count of the second contact surface 5541 may be one. The first contact surface 5531 and the second contact surface 5541 may be arranged in a 180 degrees rotationally symmetrical shape with respect to the symmetry point. When the magnetic adsorption ring 551 rotates 180 degrees, the first contact surface 5531 after rotating may completely overlap the second contact surface 5541 before rotating, and the second contact surface 5541 after rotating may completely overlap the first contact surface 5531 before rotating. The first contact surface 5531 and the second contact surface 5541 may be arranged side by side and corresponding to a positive terminal and a negative terminal of the power interface, respectively. The outer end of the magnetic adsorption ring 551 may have a 180 degrees rotationally symmetrical shape with respect to a symmetry point.

Figure 53:
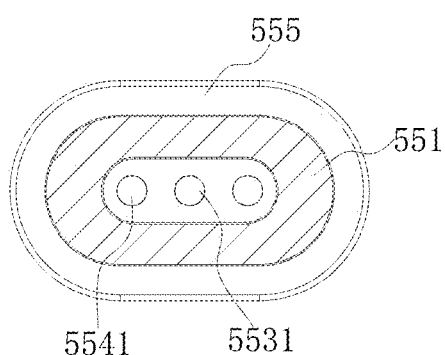
FIG. 53 is a schematic diagram illustrating a top view of another exemplary magnetic connector according to some embodiments of the present disclosure.

As shown in FIG. 53, the outer end of the magnetic adsorption ring 551 may have a 180 degrees rotationally symmetrical shape with respect to the symmetry point. When the magnetic adsorption ring 551 rotates 180 degrees, the first contact surface 5531 and the second contact surface 5541 before rotating may at least partially overlap the first contact surface 5531 and the second contact surface 5541 after rotating, respectively. The dimension of the magnetic adsorption ring 551 in a first direction may be different from that in a second direction perpendicular to the first direction. For example, the outer end of the magnetic adsorption ring 551 may have a shape of an elliptical ring, a rectangular ring, or the like.

In some embodiments, the dimension of the magnetic adsorption ring 551 in the first direction may be greater than that in the second direction. The count of the first contact surface 5531 may be one, and the first contact surface 5531 may be located at the symmetry point of the magnetic adsorption ring 551. The count of the second contact surface 5541 may be two, and the two second contact surfaces 5541 may be equidistantly located at both sides of the symmetry point of the magnetic adsorption ring 551 in the first direction. When the magnetic adsorption ring 551 rotates 180 degrees, the two second contact surfaces 5541 may swap positions with each other. The shape of the first contact surface 5531 may be the same as or different from that of the second contact surfaces 5541. The shapes of the two second contact surfaces 5541 may be the same. For example, the first contact surface 5531 and the second contact surfaces 5541 may both have a circular shape, or another shape that can be completely overlapped after being rotated 180 degrees around the symmetry point.

When the magnetic adsorption ring 551 rotates 180 degrees, the magnetic adsorption ring 551 may be in two opposite directions, and the first contact surface 5531 and the second contact surface(s) 5541 may at least partially overlap each other after 180-degrees rotation. In such cases, the magnetic adsorption ring 551 may have two assembly positions. At each of the two assembly positions, the magnetic adsorption ring 551 may be sleeved on the insertion member 5523 of the insulation base 552 which is provided with the first terminal 553 and the second terminal 554, and the magnetic connector 55 and the power interface may be adsorbed with each other to establish an electrical connection.

In some embodiments, the magnetic adsorption ring 551 may be divided into at least two ring sections 5511 in the circumferential direction. The outer ends of the adjacent ring sections 5511 may have different magnetic polarities. The division of ring section 5511 may be performed according to a certain rule. For example, if the outer end of the magnetic adsorption ring 551 has an annular shape, the magnetic adsorption ring 551 may be equally divided along its radial direction. Merely by way of example, the magnetic adsorption ring 551 may be quartered into four ring sections 5511 with the same shape. As another example, the magnetic adsorption ring 551 may be divided randomly. As another example, if the outer end of the magnetic adsorption ring 551 has a shape of a regular symmetrical ring such as an oval ring, a circle ring, or a rectangular ring, the magnetic adsorption ring 551 may be equally divided into two or more ring sections 5511 along at least one symmetry axis of the magnetic adsorption ring 551. If the outer end of the magnetic adsorption ring 551 has a shape of an irregular ring, the magnetic adsorption ring 551 may be divided into two or more asymmetrical ring sections 5511.

The magnetic polarity of the outer end of each ring section 5511 may be determined according to the connection between the contract contact surface(s) (e.g., the first contact surface 5531 and/or the second contact surface 5541) and the terminal(s) of the power interface. The connection between the contact surface(s) (e.g., the first contact surface 5531 and/or the second contact surface 5541) and the terminal(s) of the power interface may include a valid connection and an invalid connection. As used herein, a valid connection refers to a connection that the contact surface(s) (e.g., the first contact surface 5531 and/or the second contact surface 5541) may be adsorbed with the terminal(s) of the power interface, and the magnetic polarity of the outer end of each ring section 5511 may be opposite to that of the outer end of a corresponding magnetic adsorption structure of the power interface. An invalid connection refers to a connection that the contact surface(s) (e.g., the first contact surface 5531 and/or the second contact surface 5541) cannot be adsorbed with the terminal(s) of the power interface because the magnetic polarity of the outer end of each ring section 5511 may be the same as that of the outer end of a corresponding magnetic adsorption structure of the power interface. The valid connection may establish an electrical connection between the magnetic connector 55 and the power interface to charge the acoustic output apparatus. The invalid connection cannot establish an electrical connection between the magnetic connector 55 and the power interface to charge the acoustic output apparatus.

In some embodiments, the dimension of the magnetic adsorption ring 551 in a first direction may be different from that in a second direction perpendicular to the first direction. For example, the dimension of the magnetic adsorption ring 551 in the first direction may be greater than that in the second direction. Merely by way of example, the outer end of the magnetic adsorption ring 551 may have a shape of an elliptical ring. In some embodiments, the magnetic adsorption ring 551 may be divided into two ring sections 5511 arranged side by side along a symmetry axis of the elliptical ring in the first direction or the second direction. The magnetic polarity of the outer end face of one ring section 5511 may be N pole, and the magnetic polarity of the outer end face of the other ring section 5511 may be S pole. In some embodiments, the first contact surface 5531 and the second contact surface 5541 may be arranged in a 180 degrees rotationally symmetrical shape with respect to the symmetry point.

A shape and a count of the magnetic adsorption structure(s) of the power interface may be the same as that of the magnetic adsorption ring 551 of the magnetic connector 55. The magnetic polarity of the outer end of a magnetic adsorption structure of the power interface may be opposite to that of the outer end of a corresponding ring section 5511 of the magnetic adsorption ring 551. If a connection between the contact surface(s) (e.g., the first contact surface 5531 and/or the second contact surface 5541) and the terminal(s) of the power interface is a valid connection, a ring section 5511 of the magnetic adsorption ring 551 may be adsorbed with a corresponding magnetic adsorption structure of the power interface to establish an electrical connection to charge the acoustic output apparatus. If a connection between the contact surface(s) (e.g., the first contact surface 5531 and/or the second contact surface 5541) and the terminal(s) of the power interface is an invalid connection, a ring section 5511 of the magnetic adsorption ring 551 cannot be adsorbed with a corresponding magnetic adsorption structure of the power interface. This may avoid an invalid connection between the magnetic connector 55 and the power interface and is convenient for users.

The present disclosure may also provide a magnetic connector component, which includes two magnetic connectors 55 as described in the present disclosure. For example, the magnetic connector component may include a magnetic connector 55a and a magnetic connector 55b. A shape and a count of the ring section(s) 5511 of the magnetic adsorption ring 551 of the magnetic connector 55a may be the same as that of the magnetic connector 55b. A magnetic polarity of the ring section(s) 5511 of the magnetic adsorption ring 551 of the magnetic connector 55a may be opposite to that of the magnetic connector 55b. When the magnetic connectors 55a and 55b absorb each other, the contact surface(s) of the magnetic connector 55a may contact the contact surface(s) of the magnetic connector 55b. The connection between the magnetic connector 55a and the magnetic connector 55b may be the same as or similar to that between the magnetic connector 55 and the power interface as described in connection with FIGS. 51-53. For example, when a first contact surface 5531 and a second contact surface 5541 of the magnetic connector 55a contact with a first contact surface 5531 and a second contact surface 5541 of the magnetic connector 55b, the magnetic connector 55a and the magnetic connector 55b may be adsorbed together to establish a valid connection if their ring sections have opposite magnetic polarities. When the first contact surface 5531 and the second contact surface 5541 of the magnetic connector 55a contact with the first contact surface 5531 and the second contact surface 5541 of the magnetic connector 55b, the magnetic connector 55a and the magnetic connector 55b cannot be adsorbed together if their ring sections have the magnetic polarity. This may avoid an invalid connection between the magnetic connector 55a and the magnetic connector 55b and is convenient for users.

In some embodiments, as shown in FIG. 48 and FIG. 49, the magnetic connector 55 may be mounted in a circuit housing 10. The circuit housing 10 may include two main side walls 11 spaced from each other and at least one end wall 13. An inner surface of at least one main side wall 11 may include two blocking walls 19 spaced from each other. The two blocking walls 19 may be arranged in parallel with an end wall 13 of the circuit housing 10. The two main side walls 11 and the two blocking walls 19 may form an accommodating space near a secondary side wall 12, and the magnetic connector 55 may be located in the accommodating space.

In some embodiments, each of the two main side walls 11 may further include a mounting hole 113. The acoustic output apparatus may further include two fixing components 56. The two fixing components 56 may be inserted into the mounting holes 113 of the two main side walls 11, respectively, and fix the magnetic connector 55. The count of the mounting holes 113 and the count of the fixing components 56 may be the same. Merely by way of example, a fixing component 56 may be a screw. An end of the screw may pass through a mounting hole 113 of a main side wall 11 to abut against the outer side wall of the magnetic connector 55, and the other end of the screw may be fixed in the mounting hole 113.

In some embodiments, each of the opposite sides of the magnetic connector 55 may include two mounting holes 55512 for receiving the fixing components 56. The magnetic connector 55 may have a 180 degrees rotationally symmetrical structure with respect to a symmetry axis parallel to a direction the magnetic connector 55 along which it is inserted into the accommodating space. After the magnetic connector 55 is inserted into the accommodating space, at least one of the two mounting holes 55512 of each of the opposite sides of the magnetic connector 55 may be aligned with a mounting hole 113. The mounting hole 113 may be configured to receive an outer end of a fixing component 56. The mounting hole 55512 may be configured to receive an inner end of the fixing component 56. The two ends of the fixing component 56 may run through the mounting hole 113 and the mounting hole 55512, respectively, to fix the magnetic connector 55 in the accommodating space. In some embodiments, the magnetic connector 55 may have 180 degrees rotationally symmetrical shape, and include two mounting holes 55512 on its side surface as shown in FIG. 48 and two mounting holes 55512 on a surface opposite to the side surface. In this way, there are two mounting holes matching the mounting holes 113 no matter whether the magnetic connector 55 is rotated or not, which may facilitate the mounting of the magnetic connector 55.

A first housing protective casing 21 and/or a second housing protective casing 31 may cover the mounting hole(s) 113 of the main side wall 11. The first housing protective casing 21 and/or the second housing protective casing 31 may include an exposing hole 57 for the magnetic connector 55 to be exposed, which may facilitate the use of the acoustic output apparatus.

What is claimed is:

1. An acoustic output apparatus, comprising:
    an acoustic output component; and
    a supporting structure for supporting the acoustic output component proximate to a user's ear, the supporting structure forming an acoustically open structure that allows the acoustic output component to acoustically communicate with surroundings, wherein the supporting structure comprises:
        a plurality of first sound guiding holes including a pair of first sound guiding holes that are spaced apart from each other by a first distance; and
        a plurality of second sound guiding hole including a pair of second sound guiding holes that are spaced apart from each other by a second distance, wherein the first distance is greater than the second distance; and
    the acoustic output component comprises:
        a plurality of acoustic drivers each of which is configured to output a sound with a frequency range, frequency ranges of sounds outputted by different acoustic dividers are different, wherein at least one of the plurality of acoustic drivers includes:
            a magnetic system for generating a first magnetic field, the magnetic system comprising:
                a first magnetic component for generating a second magnetic field; and
                at least one second magnetic component surrounding the first magnetic component, wherein a magnetic gap is formed between the first magnetic component and the at least one second magnetic component, and a magnetic field intensity of the first magnetic field in the magnetic gap is greater than a magnetic field intensity of the second magnetic field in the magnetic gap.

2. The acoustic output apparatus of claim 1, wherein the supporting structure comprises an ear hook for hanging the acoustic output component on the user's ear or a headband placed over a head of the user when the acoustic output apparatus is worn by the user.

3. The acoustic output apparatus of claim 1, wherein
    the supporting structure comprises a fixing component configured to fix the acoustic output component near an opening of an ear canal of the user, and
    the fixing component is placed into the ear canal without blocking the ear canal.

4. The acoustic output apparatus of claim 1, wherein the plurality of acoustic drivers include:
    a first acoustic driver configured to output a first sound with a first frequency range; and
    a second acoustic driver configured to output a second sound with a second frequency range, the second frequency range including frequencies higher than the first frequency range.

5. The acoustic output apparatus of claim 4, wherein:
    the first sound is outputted from the plurality of first sound guiding holes, and
    the second sound is outputted from the plurality of second sound guiding holes.

6. The acoustic output apparatus of claim 4, further comprising:
    a first acoustic route between the first acoustic driver and the plurality of first sound guiding holes, and
    a second acoustic route between the second acoustic driver and the plurality of second sound guiding holes, wherein the first acoustic route and the second acoustic route have different frequency selection characteristics.

7. The acoustic output apparatus of claim 1, wherein
    the supporting structure comprises a first housing for accommodating the first acoustic driver and a second housing for accommodating the second acoustic driver,
    the first housing includes a first chamber and a second chamber located on either side of the first acoustic driver, the first chamber being acoustically coupled to one of the pair of first sound guiding holes, the second chamber being acoustically coupled to other one of the pair of first sound guiding holes, and the second housing includes a third chamber and a fourth chamber located on either side of the second acoustic driver, the third chamber being acoustically coupled to one of the pair of second sound guiding holes, the fourth chamber being acoustically coupled to other one of the pair of second sound guiding holes.

8. The acoustic output apparatus of claim 4, wherein the first sound includes a first portion outputted from one of the pair of first sound guiding holes and a second portion outputted from other one of the pair of first sound guiding holes, and
the first portion has an inversed phase with respect to the second portion.

9. The acoustic output apparatus of claim 1, wherein the magnetic system further comprises:
a first magnetic conductive component mechanically connected to a first surface of the first magnetic component.

10. The acoustic output apparatus of claim 9, further comprising:
a second magnetic conductive component mechanically connected to a second surface of the first magnetic component, the second surface being opposite to the first surface of the first magnetic component; and
at least one third magnetic component, wherein the at least one third magnetic component is mechanically connected to each of the second magnetic conductive component and the at least one second magnetic component.

11. The acoustic output apparatus of claim 10, further comprising at least one fourth magnetic component placed within the magnetic gap and mechanically connected to each of the first magnetic component and the second magnetic conductive component.

12. The acoustic output apparatus of claim 10, further comprising at east one electric conductive component mechanically connected to at least one of the first magnetic component, the first magnetic conductive component, or the second magnetic conductive component.

13. The acoustic output apparatus of claim 9, further comprising at least one of fifth magnetic component mechanically connected to the first magnetic conductive component, wherein the at least one fifth magnetic component and the first magnetic component are located at opposite sides of the first magnetic conductive component.

14. The acoustic output apparatus of claim 13, further comprising a third magnetic conductive component for suppressing a magnetic field leakage of the first magnetic field, wherein
the third magnetic conductive component is mechanically connected to the fifth magnetic component, and
the third magnetic conductive component and the first magnetic conductive component are located at opposite sides of the fifth magnetic component.

15. The acoustic output apparatus of claim 1, further comprising a magnetic connector configured to charge the acoustic output apparatus when the magnetic connector absorbs a charging interface of an external power source.

16. The acoustic output apparatus of claim 15, wherein the magnetic connector comprises:
a magnetic adsorption ring;
an insulation base including a plurality of accommodation holes, at least part of the insulation base being inserted into the magnetic adsorption ring; and
a plurality of terminals each of which is accommodated in one of the plurality of accommodation holes.

17. The acoustic output apparatus of claim 16, wherein the insulation base comprises a supporting member and an insertion member,
a cross section of the supporting member is greater than that of the insertion member, and
the magnetic adsorption ring is inserted into an accommodation space formed by the supporting member and the insertion member.

18. The acoustic output apparatus of claim 17, further comprising a housing for accommodating the magnetic adsorption ring and the insulation base, wherein the housing comprises:
a body that is sleeved on the insulation base and the magnetic adsorption ring, an outer circumference wall of the supporting member and an inner circumference wall of the body being mechanically connected via a buckle connection; and
a flange at an end of the body, the flange covering an end of the magnetic adsorption ring.

19. The acoustic output apparatus of claim 16, wherein the magnetic adsorption ring has a shape of a circle, and each of the plurality of terminals has a contact surface that is concentric with the magnetic adsorption ring.

* * * * *